(12) United States Patent
Gururajan et al.

(10) Patent No.: US 10,853,743 B2
(45) Date of Patent: *Dec. 1, 2020

(54) SYSTEMS, DEVICES, AND METHODS FOR SEARCHING AND BOOKING RIDE-SHARED TRIPS

(71) Applicant: TRANSIT LABS INC., Waterloo (CA)

(72) Inventors: Prem Gururajan, Kitchener (CA); Simon Parent, Kitchener (CA); Alexander Bailey, Kitchener (CA); Darren Maki, Kitchener (CA)

(73) Assignee: TRANSIT LABS INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,365

(22) Filed: Feb. 22, 2019

(65) Prior Publication Data

US 2019/0188608 A1 Jun. 20, 2019

Related U.S. Application Data

(63) Continuation of application No. 15/406,178, filed on Jan. 13, 2017, now Pat. No. 10,248,913.

(60) Provisional application No. 62/353,817, filed on Jun. 23, 2016, provisional application No. 62/278,222, filed on Jan. 13, 2016.

(51) Int. Cl.
G06Q 10/00 (2012.01)
G06Q 10/02 (2012.01)
G06Q 50/30 (2012.01)

(52) U.S. Cl.
CPC ............ *G06Q 10/02* (2013.01); *G06Q 50/30* (2013.01)

(58) Field of Classification Search
CPC .................................. G06F 17/30067
USPC .............................................. 705/5
See application file for complete search history.

(56) References Cited

U.S. PATENT DOCUMENTS

| | | | | |
|---|---|---|---|---|
| 4,959,808 A * | 9/1990 | Neuffer | ............... | B66B 1/285 700/302 |
| 5,191,523 A * | 3/1993 | Whitesage | ............ | G06Q 10/02 705/6 |
| 6,377,932 B1 * | 4/2002 | DeMarcken | ............ | G06Q 10/02 705/1.1 |
| 2008/0091633 A1 * | 4/2008 | Rappaport | ............ | G06N 5/022 706/50 |
| 2009/0216746 A1 * | 8/2009 | Aubin | .................. | G06Q 50/14 |
| 2009/0287596 A1 * | 11/2009 | Torrenegra | ............ | G06Q 30/06 705/37 |
| 2009/0299629 A1 * | 12/2009 | Grigsby | ............ | G01C 21/3484 701/469 |
| 2010/0332131 A1 * | 12/2010 | Horvitz | ............ | G01C 21/3484 701/414 |
| 2012/0185793 A1 * | 7/2012 | Binsztok | ............. | G06Q 10/02 715/772 |
| 2013/0060468 A1 * | 3/2013 | Delling | ............... | G06Q 10/047 701/527 |

(Continued)

*Primary Examiner* — Tonya Joseph
(74) *Attorney, Agent, or Firm* — Norton Rose Fulbright Canada LLP

(57) ABSTRACT

Embodiments relate to systems and methods for electronically booking ride share trips. The systems and methods can involve a data storage device storing ride sharing records with itineraries including a plurality of legs. The systems and methods can involve at least one processor configured to receive a trip booking request for a passenger, the trip booking request defining passenger constraints including a desired pickup time or drop off time.

26 Claims, 24 Drawing Sheets

(56) References Cited

U.S. PATENT DOCUMENTS

| | | | |
|---|---|---|---|
| 2013/0158861 A1* | 6/2013 | Lerenc | G01C 21/3438 |
| | | | 701/410 |
| 2014/0108370 A1* | 4/2014 | Andri | G06Q 30/0267 |
| | | | 707/706 |
| 2014/0359523 A1* | 12/2014 | Jang | H04M 1/72561 |
| | | | 715/781 |
| 2016/0123748 A1* | 5/2016 | Chidlovskii | G01C 21/3453 |
| | | | 701/410 |
| 2016/0364823 A1* | 12/2016 | Cao | G06Q 50/30 |

\* cited by examiner

FIG. 4

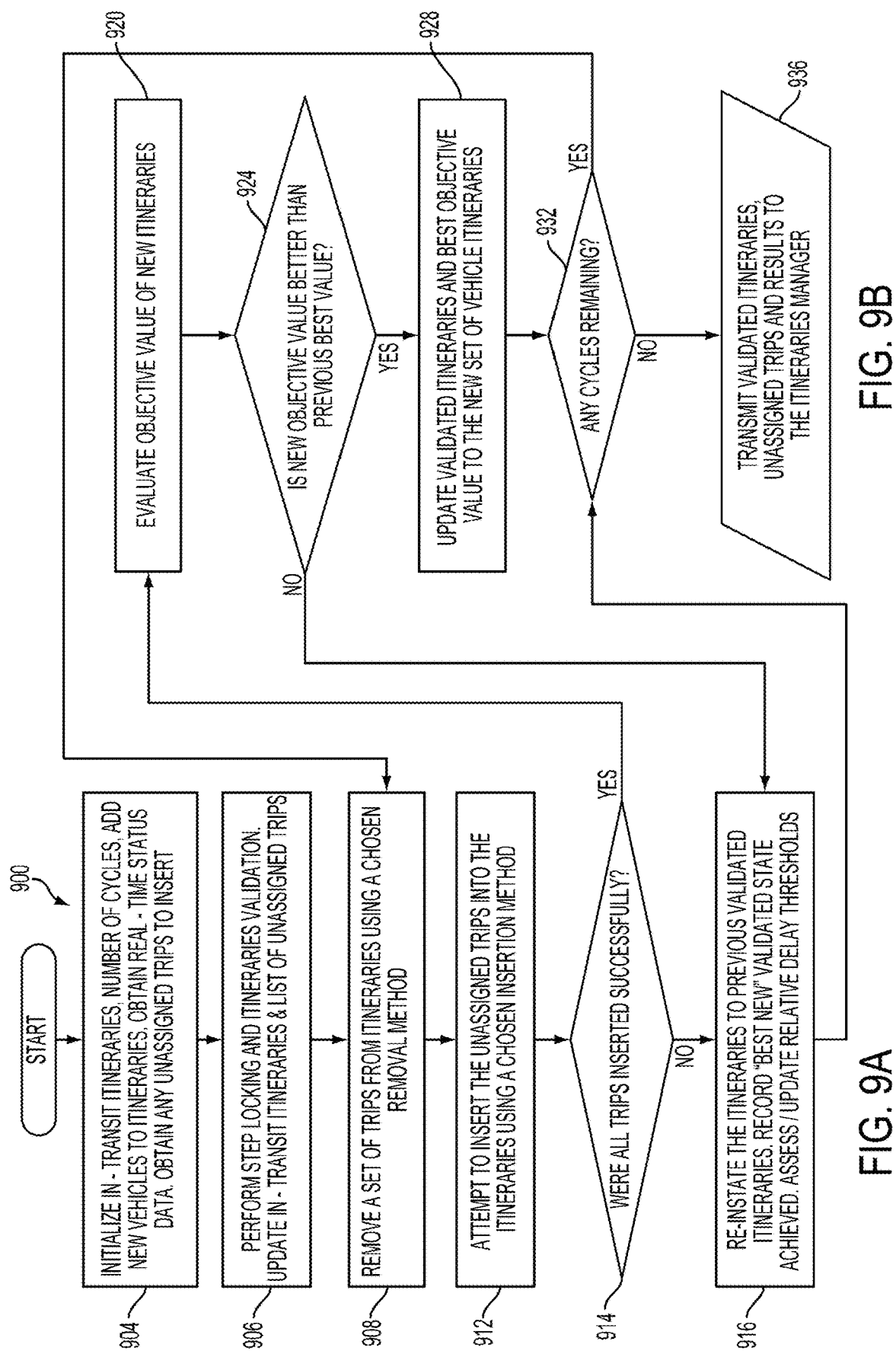

SYSTEMS, DEVICES, AND METHODS FOR SEARCHING AND BOOKING RIDE-SHARED TRIPS

CROSS REFERENCE TO RELATED APPLICATIONS

This application is a continuation of U.S. application Ser. No. 15/406,178, filed Jan. 13, 2017, entitled "SYSTEMS, DEVICES, AND METHODS FOR SEARCHING AND BOOKING RIDE-SHARED TRIPS", which claims the benefit of and priority to U.S. Provisional Application No. 62/278,222 filed Jan. 13, 2016 and U.S. Provisional Application No. 62/353,817 filed Jun. 23, 2016, the entire contents of which are hereby incorporated by reference.

FIELD

This disclosure relates to transportation of passengers. More specifically, this disclosure relates to systems, methods, devices for facilitating vehicle ride-sharing amongst passengers.

BACKGROUND

Systems allow passengers (also referred to as customers) to book trips having arrival and departure times that are pre-determined by a transportation service provider. Systems allow passengers to book trips having pre-determined origin and destination locations. Systems may book passengers into vehicles (e.g., buses, airplanes) having static capacities (e.g., a fixed number of seats available), and/or static stops and routes. For example, carpooling may have a fixed start and stop locations (e.g. to and from work) along with fixed travel times (e.g. in the morning and evening). The driver in a carpooling scenario may only pass by a given location at a fixed travel time (e.g. morning or evening). It may be desirable to have dynamic or virtual start and stop locations and various travel time options. The start and stop locations may also be referred to as pick up or drop off locations. There may be multiple vehicles for transporting multiple passengers, e.g., to provide numerous ride-shared trip options. It is desirable to provide a flexible, dynamic system that works with multiple vehicles and passengers.

SUMMARY

In an aspect, embodiments described herein provide a system for electronically booking ride share trips. The system includes a data storage device storing ride sharing records with itineraries including a plurality of legs. The system includes a processor configured to receive a trip booking request for a passenger at a processor, the trip booking request defining passenger constraints. The processor is configured to generate trip booking options from the ride sharing itineraries, each trip booking option including a leg that satisfies the passenger constraints of the trip booking request. The processor is configured to compute objective values for the trip booking options, each trip booking option temporarily assigned to a vehicle to compute a corresponding objective value. Vehicles are temporarily assigned to different trip booking options in order to compute the objective values, as the assigned vehicle may impact the objective value. The objective values provide a change in one or more of level of ride share or efficiency, violation of passenger(s) targeted pickup time, violation of passenger(s) targeted arrive-before time, route deviation, vehicle operating cost, in-transit operating cost, vehicle itinerary and vehicle distance travelled, and time travelled. The processor is configured to generate one or more retained trip booking options by removing at least one trip booking option from the generated trip booking options based on a comparison of its objective value and temporal proximity to at least one other trip booking option. For example, a first trip booking option may have a first objective value and a first pickup time, and a second trip booking option may have a second objective value and a second pickup time. The first pickup time and the second pickup time may be the same or similar within a time window. The first objective value may be better than the second objective value. In order to generate a reduced set of trip booking options, the processor is configured to remove the second trip booking option given. The reduced set of trip booking options will still include a pickup time that is the same or proximate to the second pickup time. The processor is configured to transmit the one or more retained trip booking options for display on an interface application of an electronic device using computed display configurations to receive a confirmed trip booking option. In some embodiments, the processor is configured to provide one or more retained trip booking options for to receive a selected are confirmed trip booking option from a user. In some embodiments, the processor is configured to automatically select a trip booking option from the set of retained trip booking options for confirmation by user. In some embodiments, the processor is configured to assign a vehicle to fulfil the confirmed trip booking option. This vehicle may be different than the vehicle temporarily assigned to the trip booking option at this stage of computing the objective values. In making the final assignment, the processor is configured to compute an objective value for the confirmed trip booking option and the vehicle to fulfil the confirmed trip booking option in order to select an optimal vehicle. In some embodiments, the processor is configured to dynamically update an itinerary for the vehicle assigned to fulfil the confirmed trip booking option in order by adding the confirmed trip booking option to the itinerary. The processor is configured to transmit a portion of the itinerary to the vehicle assigned to fulfil the trip booking option. Only a portion of the itinerary may be transmitted to allow further dynamic updates to other portions of the itinerary. In some embodiments, the processor is further configured to receive a cancellation of the confirmed trip booking option. The processor is configured to dynamically update the itinerary for the vehicle based on the cancellation to remove the confirmed trip booking option from the itinerary. In some embodiments, the processor is further configured to receive a cancellation from a vehicle assigned to the confirmed trip booking option. The processor is configured to re-compute an objective value for the confirmed trip booking option to be fulfilled by another vehicle and assign the other vehicle to the confirmed trip booking option based on the recomputed objective value. The processor is configured to dynamically update an itinerary for the new vehicle assigned to the confirmed trip booking option by adding the confirmed trip booking option to the itinerary. The processor is further configured to dynamically update the itinerary for the vehicle previously assigned to the trip booking option by removing the confirmed trip booking option from the itinerary and response the cancellation.

In some embodiments, the display configurations may be part of a passenger profile. In some embodiments, the display configurations can be generated by the processor upon detection or determination of device constraints, such as the size of a display screen. The display configurations can indicate a number of trip booking options that can be presented to the passenger for confirmation. The display configurations can indicate a formatting for displaying the trip booking options, including the type of data or attributes of the trip booking options to display (e.g. price, pickup time, drop off time, pickup location, drop off location, route map). The display configurations can be dynamically updated by the processor or user configurations.

In some embodiments, the passenger constraints include one or more ranges or metrics for a requested trip price, a requested pickup time, a requested drop off time, a requested pick up location, a requested drop off location, and a relative delay.

In some embodiments, the processor is further configured to determine that the requested pickup time of the trip booking request is for the present time. The processor is further configured to compare objective values of at least two trip options having a pickup time within a time window of the present time. The processor is further configured to retain the trip option that is at a later time in order to increase the likelihood of improving the objective value through an improvement in one or more of level of ride share or efficiency, route deviation, vehicle operating cost, vehicle distance travelled, and time travelled.

In some embodiments the processor is further configured to compare objective values of at least two trip options that are within a time window of each other, determine that one trip option's objective value is worse than another trip booking option's objective value, and remove the said trip option with a worse objective value. The processor is configured to generate the reduced set of trip booking options by filtering out those with worse objective values than the trip booking options retained in the reduced set.

In some embodiments, the processor is further configured to implement a two pass scan based on the trip booking request time, such that trip booking options that are closer to the trip booking request time are favoured.

In some embodiments, each trip booking option indicates a pickup time based on a time interval or time frequency, wherein the trip booking options provide different pick up times that differ based on the time interval or the time frequency, wherein the trip booking options provide the different pick up times across a time range.

In some embodiments, each trip booking option has a corresponding trip length duration. The processor is further configured to vary the time interval or the time frequency as a factor of the trip length of duration, a shorter trip length of duration indicating a shorter time interval or time frequency, a longer trip length of duration indicating a longer time interval or time frequency.

In some embodiments, processor is configured to initialize model and default parameters, the model and default parameters define one or more objective functions used to compute the objective values for the trip booking options In some embodiments, a ride sharing record includes one or more ranges or metrics for trip time, trip location, and (temporary) vehicle itineraries.

In some embodiments, the processor is configured to compute and aggregate a set of metrics to compute a combined objective value In some embodiments, the level of ride share or efficiency indicates multiple unrelated passengers in the vehicle assigned to the trip booking option for at least part of the trip.

In some embodiments, the passenger constraints include a desired pickup time, wherein the violation of passenger(s) desired pickup time is a difference between an estimated pickup time for a given trip booking option and the desired pickup time. The passenger constraints may be stored as part of a passenger profile so that they do not need to be inputted by the passenger each time a trip booking is requested.

In some embodiments, the passenger constraints included desired arrive before time, wherein the violation of passenger(s) desired arrive-before time is a difference between an estimated arrival time for a given trip booking option and the desired arrive before time.

In some embodiments, the vehicle operating cost is a cost of operation of one or more vehicles that are impacted by a given trip booking option, the cost of operation based on an operating fee that includes at least one of mileage and an operating time and by the one or more vehicles that are impacted by a given trip booking option.

In some embodiments, the in-transit operating cost is an estimated cost for one or more vehicles that are impacted by a given trip booking option to complete pickups and drop-offs and excluding any idle time of one or more vehicles that are impacted by a given trip booking option.

In some embodiments, the processor is configured to generate or update a vehicle itinerary, the vehicle itinerary being a set of pick up times, pickup locations, drop-off times, and drop off locations.

In some embodiments, the vehicle distance travelled includes a distance travelled by one or more vehicles that are impacted by a given trip booking option.

In some embodiments, the time travelled includes an amount of time for one or more vehicles that are impacted by a given trip booking option to complete pickups and drop-offs for the trip booking option.

In some embodiments, the temporal proximity of the at least one trip booking option to the at least one other trip booking option is a time difference between a pickup time or a drop off time of the at least one trip booking option and pickup time or a drop-off time of the at least one other trip booking option.

In some embodiments, the objective value is computed based on a metric of relative delay caused by ride-sharing, the relative delay being based on a travel delay that is a difference between an estimated travel time for a given trip booking option and an estimated travel time between a pick up location and a drop off location based on a more direct route.

In some embodiments, the processor is further configured to compute an objective value for the confirmed trip booking option based on a temporary assignment to a first vehicle, re-compute an objective value for the confirmed trip booking option based on a second vehicle, assign the second vehicle to fulfill the confirmed trip booking option based on the re-computed objective value, and trigger transmission of a notification of the confirmed trip booking option to a device linked to the second vehicle, wherein the second vehicle may be different than the first vehicle. In some embodiments, re-computing the objective value can result in a new vehicle being assigned to fulfill the trip or a new itinerary for the confirmed trip booking option. For example, an initial itinerary can have involve picking up passenger 1 at time 1 and passenger 2 at time 2 and an updated itinerary can have involve picking up passenger 3 at time 1, passenger 1 at time 2, and passenger 2 at time 3.

In some embodiments, the processor is further configured to dynamically update an itinerary of a route of stop locations and stop times for the second vehicle, and trigger transmission of at least a portion of the itinerary to the device linked to the second vehicle.

In another aspect, embodiments described herein provide a method for electronically booking ride share trips. The method involves storing ride sharing records with itineraries including a plurality of legs on a data storage device. The method involves receiving a trip booking request for a passenger at a processor. The method involves generating trip booking options and objective values from the ride sharing itineraries, each trip booking option including a leg that satisfies the trip booking request, each trip booking option temporarily assigned to a vehicle to compute a corresponding objective value. The objective values provide a change in one or more of level of ride share or efficiency, violation of passenger(s) targeted pickup time, violation of passenger(s) targeted arrive-before time, route deviation, vehicle operating cost, in-transit operating cost, vehicle itinerary and vehicle distance/time travelled. The method involves generating one or more retained trip booking options by removing at least one trip booking option from the generated trip booking options based on the at least one trip booking option's objective value and temporal proximity to at least one other trip booking option. The method involves transmitting the one or more retained trip booking options for display on an interface application of an electronic device using computed display configurations. The method involves confirming a trip booking option of the retained trip booking options.

In some embodiments, the trip booking request includes a desired pickup time. The method involves determining that the desired pickup time of the trip booking request is for a present time; comparing objective values of at least two trip options within a time window of the present time; and retaining the trip option that is at a later time in order to increase the likelihood of improving the objective value.

In some embodiments, the method involves comparing objective values of at least two trip options that are within a specific time of each other; determining that one trip option's objective value is worse than another; and removing the said trip option with a worse objective value.

In some embodiments, the method involves completing a two pass scan based on the trip booking request time, such that trip booking options that are closer to the trip booking request time are favoured.

In another aspect, embodiments described herein provide a system for electronically booking ride share trips. The system includes a data storage device storing ride sharing records with itineraries including a plurality of legs. The system includes a processor configured to receive a trip booking request for a passenger, the trip booking request defining passenger constraints including a desired pickup time or drop off time. The processor is configured to generate trip booking options from the subset of ride sharing itineraries, each trip booking option including a leg that satisfies the passenger constraints of the trip booking request, each trip booking option temporarily assigned to a vehicle, the trip booking options providing a set of pick up times that differ by a time frequency to cover a time range based on the desired pickup time or drop off time. The processor is configured to compute objective values for the trip booking options, each trip booking option temporarily assigned to a vehicle to compute a corresponding objective value, the objective values indicating a level of ride share or efficiency. The processor is configured to remove at least one trip booking option based on a comparison of its objective value and temporal proximity to at least one other trip booking option. The processor is configured to transmit the retained trip booking options for display on an interface application of an electronic device using computed display configurations. The processor is configured to confirm a trip booking option. The processor is configured to re-compute an objective value for the confirmed trip booking option based on a different vehicle assignment or updated itinerary, for example. The processor is configured to assign a vehicle (which may be different than the temporarily assigned vehicle) to fulfill the confirmed trip booking option based on the re-computed objective value. The processor is configured to dynamically update an itinerary for the vehicle assigned to fulfill the confirmedtrip booking option to add the confirmed trip booking option to the itinerary. The processor is configured to trigger transmission of a notification of the confirmed trip booking option and a portion of the itinerary to a device linked to the vehicle assigned to fulfill the confirmedtrip booking option.

In some embodiments, the processor is further configured to receive a cancellation of the confirmed trip booking option, dynamically update the itinerary to remove the confirmed trip booking option from the itinerary, trigger transmission of a notification of the cancellation and a portion of the itinerary to the device.

In accordance with an aspect, there is provided a system for booking ride-shared trips. The system includes: memory storing a plurality of ride-sharing itineraries, the itineraries including a plurality of legs; and at least one processor in communication with the memory. The at least one processor is configured to: receive a trip booking request for a passenger; and process the trip booking request to generate a plurality of potential ride-sharing itineraries, each including a leg that satisfies the trip booking request, the plurality of potential ride-sharing itineraries providing at least one of: (i) a plurality of different pick-up times for the passenger; and (ii) a plurality of different pick-up locations for the passenger. The generating includes modifying at least one of the stored ride-sharing itineraries by adding a leg that satisfies the trip booking request, the modified ride-sharing itinerary including legs for multiple passengers in a vehicle. A subset of said plurality of ride-sharing itineraries are presented to the user as ride options available for booking, wherein said subset of trip options is determined based on analyzing at least one measure of efficiency score and one measure of temporal proximity between trip options.

In accordance with another aspect, there is provided a computer-implemented method for booking ride-shared trips. The method includes: storing in a data storage device ride sharing records with itineraries including a plurality of legs, receiving trip booking request for a passenger at a processor, generating trip booking options and objective values from the ride sharing itineraries, each trip booking option including a leg that satisfies the trip booking request, said objective values provide a change in one or more of level of ride share or efficiency, route deviation, number of stops, vehicle operating cost, vehicle itinerary and vehicle distance/time travelled; analyzing at least one trip booking option's objective value and temporal proximity to at least one other trip booking option; removing at least one trip booking option based on said analyzing; and transmitting the retained trip booking options for display on an interface application of an electronic device using computed display configurations.

Many further features and combinations thereof concerning embodiments described herein will appear to those skilled in the art following a reading of the instant disclosure.

DESCRIPTION OF THE FIGURES

In the figures,

FIG. 4 is a screenshot of an example passenger-facing website, according to an embodiment.

FIGS. 9A and 9B is a flowchart illustrating an example method that may be performed by the real-time optimizer module of FIG. 2, according to an embodiment.

DETAILED DESCRIPTION

Figure 1:
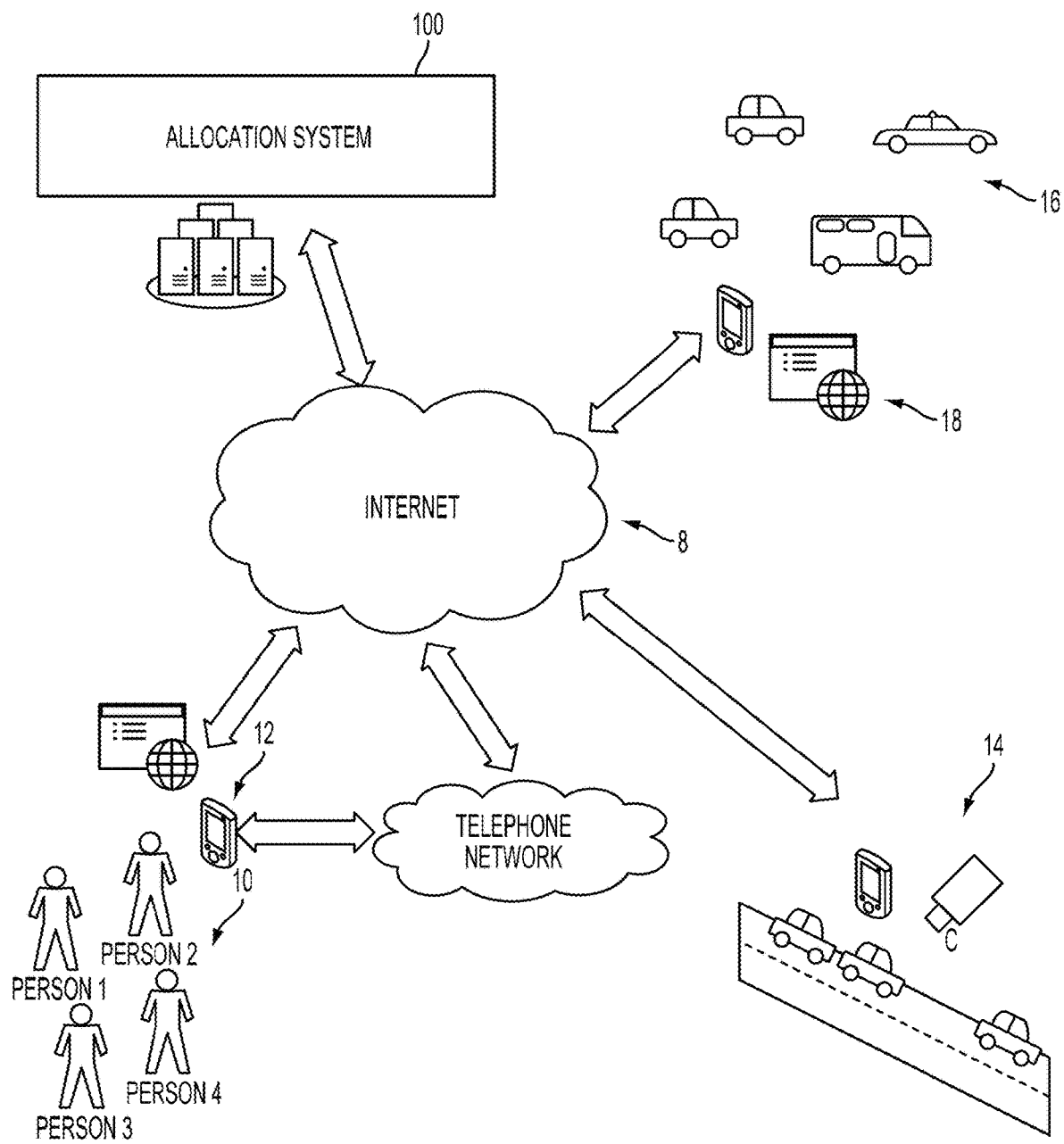
FIG. 1 is a schematic diagram of an example architecture for facilitating transportation using a transportation resource allocation system, according to an embodiment.

FIG. 1 illustrates an example transportation resource allocation system 100, exemplary of an embodiment. As detailed herein, allocation system 100 is configured to allocate transportation resources to meet transportation requirements of a plurality of passengers 10. Allocation system 100 provides flexibility to passengers 10, e.g., allowing passengers to specify desired travel times, and desired origin and destination locations.

Allocation system 100 generates itineraries to meet requirements specified in a passenger's booking request. As used herein, an itinerary refers to a series of passenger pick-ups and drop-offs, and may include passenger information, locations and times.

Allocation system 100 may provide the passenger with a range of travel options that satisfy the passenger's travel requirements. For example, in response to a booking request, allocation system 100 may generate a plurality of different potential itineraries, each having at least one of (i) a plurality of different pick-up times for the passenger; (ii) a plurality of different drop-off times for the passenger (iii) a plurality of different pick-up locations for the passenger; and (iv) a plurality of different drop-off locations for the passenger. The passenger may select one of these potential itineraries for booking. As will be detailed herein, a potential itinerary may be generated by modifying one or more stored ride-sharing itineraries, e.g., as previously generated for other passengers in a shared vehicle.

Conveniently, in an embodiment, travel times may be dictated by a passenger's travel requirements rather than by schedules defined by transportation service providers. Further, pick-up and drop-off locations may be dictated by the passenger's travel requirements. For example, in an embodiment, door-to-door transportation may be provided to passengers. Door-to-hub or hub-to-door or hub-to-hub transportation may be provided to passengers, depending on their travel requirements.

Allocation system 100 promotes transportation efficiency by satisfying passenger travel requirements using vehicles that concurrently service multiple passengers (e.g., buses, shuttles, vans, sedans or the like), thereby allowing costs to be shared amongst passengers. A trip in which a passenger must share a vehicle with at least one other unrelated passenger for at least part of the trip may be referred to as a ride-shared trip. Allocation system 100 enables a driver of a vehicle to dynamically generate an itinerary that defines a route of stop locations for passengers with different stop times based on booked passenger trips. The itinerary may be updated dynamically and continuously (eg: every 30 seconds) to accommodate new passenger trips, commitments to existing passenger trips, traffic conditions, vehicle locations, and vehicle travel times. A bus route has fixed stop locations and a static itinerary. Embodiments described herein can generate a dynamic itinerary for a vehicle that includes dynamic and varied stop locations to provide a dynamic route depending on passenger requests. The itinerary can be more flexible than a bus route given the dynamic locations. This may also provide a more efficient system as a vehicle may only pass by a particular stop location based on passenger requests and will not pass by a particular stop only because it is part of a fixed route or itinerary. In a carpooling scenario, the carpool route has fixed stop locations based on a fixed route of the driver. Each fixed stop location is often associated with only one pickup time, such as a time that the driver travels to work, for example. In the traditional carpooling scenario passengers requesting a trip must conform to the fixed stop location and fixed pickup times of the fixed carpool route. In the traditional carpooling scenario, a vehicle's itinerary may not be updated dynamically and continuously to fulfill a series of passenger trips which may be confirmed or cancelled in real-time. Furthermore, in the traditional carpooling scenario, the entire itinerary is usually known to the driver.

Conveniently, allocation system 100 is configured to simultaneously satisfy disparate travel requirements of each of those multiple customers. For example multiple passengers sharing a vehicle may have different travel times, different origin locations, different destination locations, different tolerances for trip duration, etc.

In an embodiment, allocation system 100 is configured to take into account various additional factors such as, e.g., a travel delay for passengers caused by ride-sharing, which may be referred to herein as a "relative" delay. As detailed below, this relative delay may include a delay between an estimated transit time or distance for the passenger driving alone (e.g., directly from origin to destination without stopping to pickup or drop-off additional passengers), and an estimated transit time or distance for the passenger according to a generated ride-sharing itinerary (which may include additional stops or route deviations to pickup or drop-off passengers).

In an embodiment, allocation system 100 may take into account this relative delay by determining a metric of relative delay, e.g., from an estimated travel (time or distance) for the passenger according to a ride-shared itinerary and from an estimated travel time (or distance) for the passenger traveling alone via a direct route or specified route.

In an embodiment, allocation system 100 may take into account the relative delay by defining a travel window for the passenger. The travel window may, for example, be bounded by a departure time (also referred to as a pick-up time) and an arrival time (also referred to as a drop-off time). The departure time may, for example, be specified as a depart-after time (earliest departure time). The arrival time may, for example, be specified as an arrive-before time (latest arrival time). As the travel window may exceed an estimated travel time for the passenger traveling alone (directly or along a specified path from his/her origin to destination), relative delay may be accounted for (and controlled) by way of the travel window. This travel window may be user defined, or determined automatically through user-specified travel requirements.

Relative delay may be minimized using various optimizers described below (e.g., by minimizing a metric of relative delay, or by minimizing the span of a travel window).

In these ways, allocation system 100 may balance trade-offs between cost-saving provided by ride-shared trips with any travel delay caused by ride-sharing due to additional stops or route deviations (for picking up or dropping off passengers).

In an embodiment, allocation system 100 is configured to dynamically modify itineraries, e.g., in response to booking inquiries, or in response to new bookings, or in response to real-time road conditions. Such modifications may occur before or during travel.

In some embodiments, allocation system 100 includes a data storage device storing ride sharing records with itineraries including a plurality of legs. Allocation system 100 has a processor configured to initialize model and default parameters. The model and default parameters can be used as variables or constants in one or more objective functions that are used to compute objective values for different trip booking options. The allocation system 100 is configured to receive a trip booking request for a passenger. The trip booking request defines passenger constraints including a desired pickup time, a desired arrive before time, a pick up location, and a drop off location. The allocation system 100 generates trip booking options from the ride sharing itineraries, each trip booking option including a leg that satisfies the passenger constraints of the trip booking request.

The allocation system 100 is configured to compute objective values for the trip booking options. The objective values indicate a change in one or more of level of ride share or efficiency, violation of passenger(s) targeted pickup time, violation of passenger(s) targeted arrive-before time, route deviation, vehicle operating cost, in-transit operating cost, vehicle itinerary and vehicle distance travelled, and time travelled. Each trip booking option temporarily assigned to a vehicle to compute a corresponding objective value. The allocation system 100 temporarily assigns a vehicle to the trip booking option in order to compute the objective value as one or more metrics used to compute the objective value may depend on data related to one or more vehicles that are impacted by the trip booking option. The vehicle temporarily assigned to a trip booking option may not actually complete the trip booking option if it is selected or confirmed by the user. In some embodiments, the allocation system 100 may automatically select one trip booking option based on the objective value, and the confirmed trip booking option is displayed to the user for confirmation. A final assignment of a vehicle to the confirmed trip booking option is made proximate to the trip.

The allocation system 100 is configured to remove at least one trip booking option based on a comparison of its objective value and temporal proximity to at least one other trip booking option.

The allocation system 100 is configured to transmit the retained trip booking options for display on an interface application of an electronic device using computed display configurations to receive a confirmedtrip booking option. The allocation system 100 is configured to receive a confirmed trip booking option. The allocation system 100 may automatically select one of the retained trip booking options and provide confirmation to the end user of the confirmed trip booking option. The allocation system 100 is configured to receive the confirmed trip booking option in response. Prior to completion of the confirmedtrip booking, the allocation system 100 is configured to make a final assignment of a vehicle to the confirmedtrip booking option. The allocation system 100 is configured to trigger transmission of a notification to a device linked to the vehicle assigned to fulfill the confirmed trip booking option. This provides flexibility is different vehicles may become available or may no longer be available closer to the actual trip time for the confirmedtrip booking option. The allocation system 100 is configured to re-compute objective values for the confirmed trip booking option when making the final assignment of the vehicle to the confirmed trip booking option in order to select an optimal vehicle to fulfill the confirmedtrip booking option.

The interface application for the electronic device displays the trip booking options. The display of the electronic device may have a constraint or limited size. There may be a large amount of possible trip booking options that may be presented to the user in response to their trip request. However it would may be overwhelming to a user to display such a large number of possible trip booking options. Accordingly the objective values provide a mechanism to filter and reduce the trip booking options to display only a subset of trip booking options from all possible trip booking options. Further, the objective values provide a mechanism for the allocation system 100 to select a vehicle to actually fulfill the confirmedtrip booking option closer to the actual trip time. The allocation system 100 is also operable to filter or reduce the set of trip booking options based on the temporal proximity of one trip booking option to another trip booking option. The allocation system 100 is operable to provide trip booking options that cover a range of times by removing one or more trip booking options that are enclosed temporal proximity to another trip booking option. For example, the allocation system 100 is operable to generate a set of one or more retained trip booking options by removing one trip booking option with the pickup time of 10 AM if there is another trip booking option with the pickup time of 10:05 AM (e.g. same or similar time) and a better or improved objective value. The allocation system 100 can then present a set of trip booking options that include a trip booking option with the pickup time of 9:45 AM, a trip booking option with the pickup time of 10:05 AM, a trip booking option with the pickup time of 10:15 AM, and a trip booking option with the pickup time of 10:30 AM to cover a time range of 9:45 AM to 10:30 AM. This provides a range of options for the user and attempts to reduce the number of trip booking options by removing temporally redundant or overlapping times. This improvement provides a technical solution to the technical problem of having a constraint or limited size display.

Referring to FIG. 1, allocation system 100 may be configured to interoperate with various other elements such as, e.g., passenger communication devices 12, external systems 14 (e.g., sensors and data sources providing traffic data, road data, event data), physical transportation resources 16 (e.g., drivers, transportation vehicles, pick up/drop off zones), and driver communication devices 18. Allocation system 100 cooperates with one or more of such other elements to satisfy transportation requirements of passengers 10, in manners detailed below.

Passengers 10 may include various individuals who utilize, have utilized and/or intend to utilize transportation vehicles for travel. So, passengers 10 may include current passengers, prospective passengers, past passengers, etc. Passengers 10 may be associated with various communication devices 12, such as telephones, mobile phones, smart phones, computing devices (e.g., a laptop), tablets, smart watches, etc.

Passengers 10 may operate these communication devices 12 to interact with allocation system 100, for example, to make a booking request, to establish pick-up/drop-off points, to specify delay tolerances, to specify travel windows (depart-after time and arrive—before time), to provide reviews of the service, to modify bookings, to modify/cancel bookings, etc.

A booking request may, for example, include one or more of the following elements: pick-up time, drop-off time, pick-up location, drop-off location, number of passengers, one-way or return trip, desired transit time, desired cost, the passenger's tolerance to delay caused by ride-sharing, and/or person's current location. For example, a passenger 10 may utilize a website or smart phone application accessed at communication device 12 to send the booking request to allocation system 100 and then review and select from trip options returned by allocation system 100. The pick-up time may, for example, be specified as a depart-after time (earliest departure time) or a pick-up window. The arrival time may, for example, be specified as an arrive-before time (latest arrival time), or an arrival window.

In an embodiment, allocation system 100 may be configured to communicate information to the passengers' communication devices 12, such as, e.g., reservation confirmations, vehicle identification, driver identification, arrival notifications, delay notifications, cancellation notifications, messages related to alternative ride-sharing itineraries, promotions, etc.

A passenger 10 may be able to interact with allocation system 100 by way of a suitable communication network 8 interconnecting communication device 12 and allocation system 100.

Network 8 may be any network capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

Where network 8 is a telephone network, a passenger 10 may interact with allocation system 100 using, e.g., SMS messages, touchtone codes, IVR systems, etc.

In an embodiment, allocation system 100 may be configured to retrieve data from a GPS or Wi-Fi based location tracker at a communication device 12 to determine the current location of the passenger.

The transportation of passengers may be facilitated by one or more drivers (i.e., operators) operating their vehicles 16 according to one or more ride-sharing itineraries provided by allocation system 100. For example, there may be an itinerary where a number of passengers are picked up and dropped off along various points. Each itinerary may include a plurality of "legs". A leg of the itinerary may be defined as a segment of the overall journey that may include transportation from one point to another. A leg may be associated with a set of instructions for indicating to a driver the starting point and ending point of the leg. In an embodiment, the particular route may be provided to the driver, e.g., overlaid on a map. An itinerary or a particular leg thereof may be associated with a specific type of vehicle required, with attributes such as seat capacity, handicapped accessibility, vehicle size or class, etc.

In an embodiment, allocation system 100 may respond to booking requests by generating itineraries with legs allocated to virtual vehicles, each having a pre-defined virtual capacity. Itineraries may then be matched later to physical vehicles, e.g., in cooperation with vehicle providers. Conveniently, in this embodiment, itineraries need not be matched to physical vehicles until time of travel (or shortly before), allowing for flexible adjustment to itineraries (e.g., without involving vehicle providers) until time of travel.

Drivers operating vehicles 16 may utilize communication devices 18 to interact with allocation system 100, to receive itineraries (and updates thereto), scheduling information, route information, etc., and to provide notification to system 100 of passenger pick-ups and drop-offs (and failures thereto). Communication devices 18 may include personal computers, tablet devices and smart-phones, among others. Communication between devices 18 and allocation system 100 may be by way of network 8.

In an embodiment, allocation system 100 may be configured to communicate entire itineraries to devices 18 in advance of a vehicle being dispatched to implement the itineraries. In an embodiment, allocation system 100 may be configured to communicate itinerary information to devices 18 in a just-in-time manner, e.g., such that instructions for the next leg(s) are provided to drivers as required.

For example, in an embodiment, itineraries are subject to dynamic adjustment, and drivers are provided with instructions only for the next leg(s) so that allocation system 100 may adapt and/or modify itineraries legs beyond the next leg(s) in a manner that is transparent to the drivers. For example, a passenger may cancel or modify a booking, causing the shifting of itineraries by inserting, modifying and/or deleting legs, etc. Legs may also be adjusted in response to real-time road conditions and/or actual locations of vehicles.

In an embodiment, allocation system 100 may be configured to retrieve data from a GPS or Wi-Fi based location tracker at a communication device 18 to determine the current location of an associated vehicle, e.g., to detect travel delays, to verify that drivers are adhering to a prescribed route, etc.

In an embodiment, communication devices 18 may be capable of collecting current vehicle supply and occupancy data (how many seats are occupied) and transmitting the occupancy information to allocation system 100.

In an embodiment, allocation system 100 is configured to interact with vehicle providers, who may be the same or different than vehicle operators. For example, vehicle providers may include various dispatch services, fleet rental service, etc. The vehicle providers may have one or more associated computing systems that may be capable of communication with allocation system 100.

In an embodiment, a website or smart phone application can be provided to the vehicle provider in order to notify them of various types of vehicle-related information that might be needed in the future. Such needs may include, for example, how many vehicles, type of vehicle, fuel requirements, additional considerations, vehicle conditions, vehicle capabilities (e.g., accessibility devices, videotape players, wireless connections, cellular connections). This information may be provided in respect of various future timeframes. For example, allocation system 100, through a web interface, may be configured to indicate to the vehicle provider that 4 sedans, 2 vans, and 1 shuttle are required next Thursday between 7:00 am to 11:00 am.

In an embodiment, allocation system 100 may be configured such that vehicle providers may enter their available supply of vehicles (in real-time as well as for specific dates and times in the future) into allocation system 100 through an interface, such as a webpage.

Allocation system 100 may be interconnected with various external systems 14. These external systems 14 may provide various information, such as event information, meteorological information, road information, traffic conditions, accident information, traffic forecasting information, travel time forecasting information, and so on.

External systems 14 may include traffic data sensors that are configured to collect information relating to traffic conditions on various routes and transmit them to allocation system 100. Examples of such sensors include cameras and smart phones.

In one example, cameras may be positioned in locations overseeing roads and computer vision algorithms may be utilized to process the images and/or video from the cameras in order to determine how fast or slow traffic is moving at a specific time.

In another example, vehicles on the road may be associated with smart-phones or tablet computing devices that transmit location information to allocation system 100 via various interfaces. The location information can be analyzed to determine the speed of movement of vehicles on the road.

In an embodiment, a third-party service can be utilized to transmit traffic information and/or travel time information to allocation system 100. Examples of third-party services include Google Maps™, Bing Maps™, Inrix Traffic™ and Waze™.

Various data associated with the itineraries, including, for example, driver data, vehicle data, passenger data, capacity data, traffic data, forecast data, meteorological data, current road conditions, current location of a vehicle implementing one of the itineraries, a current speed of a vehicle implementing one of the itineraries, an estimated travel time of a vehicle implementing one of the itineraries, trip cancellations by passengers, etc., may be considered "status" data. Such status data may be used at allocation system 100 for various purposes, such as generating estimates of itinerary times, modifying itinerary legs, etc. For example, a traffic congestion causing longer travel times may be detected, and a leg of one or more itineraries may be adjusted to adapt to the detected longer travel times.

Figure 2:
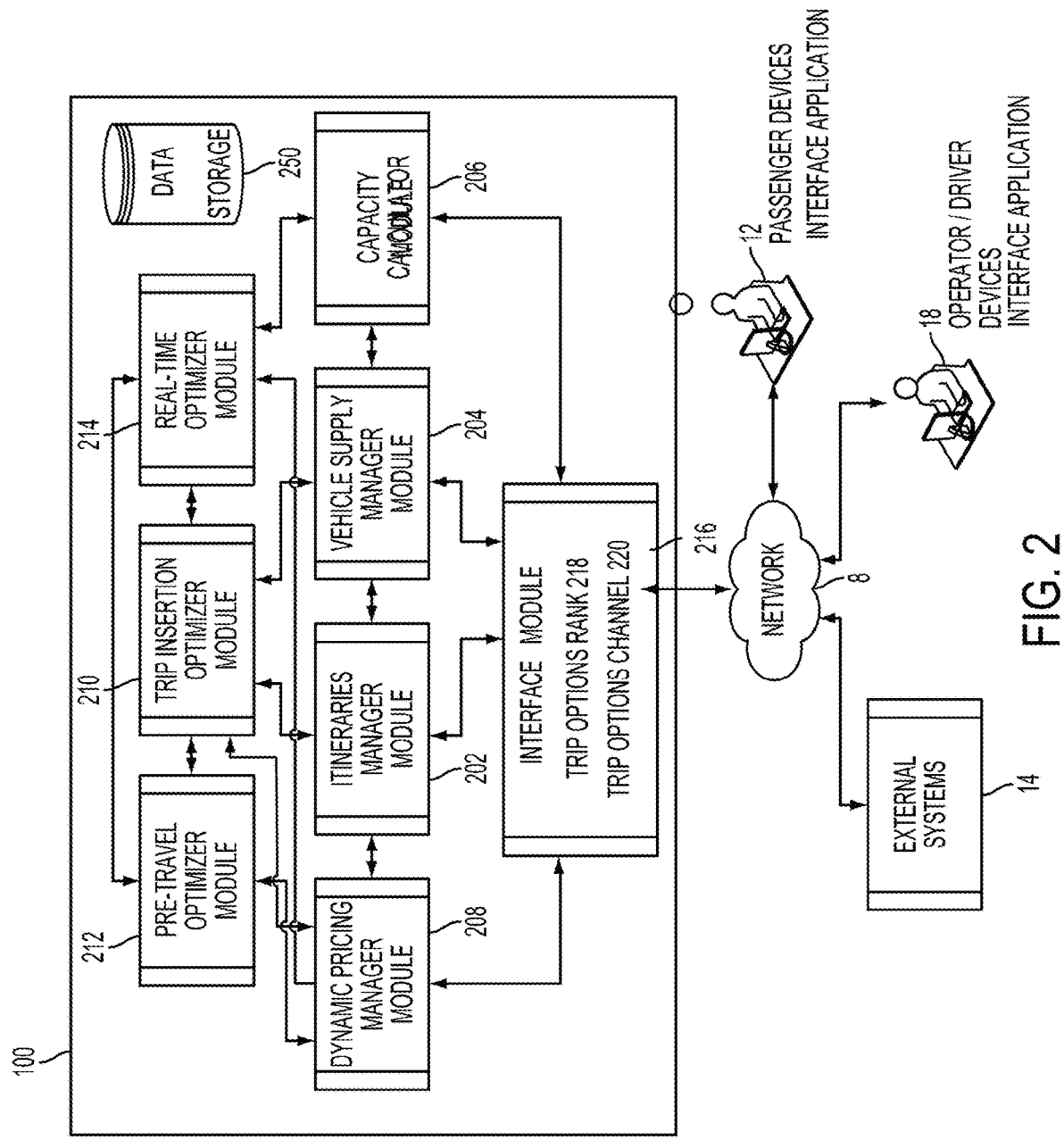
FIG. 2 is a schematic diagram illustrating exemplary modules of the allocation system of FIG. 1.

FIG. 2 is a schematic diagram illustrating modules of allocation system 100, exemplary of an embodiment. In various embodiments, there may be more, different, fewer, or modified functional modules, and the depicted modules are provided by way of example.

As depicted, allocation system 100 includes an itineraries manager module 202, a vehicle supply manager module 204, a capacity calculator module 206, a dynamic pricing manager module 208, a trip insertion optimizer module 210, a pre-travel optimizer module 212, a real-time optimizer module 214, an interface module 216, a trip options frequency and efficiency channeling sub-module 220, a trip options ranking sub-module 218, and a database 250.

Itineraries manager module 202 may be configured to maintain (e.g., in data storage 250) a list of ride-sharing itineraries, a list of vehicles scheduled to operate (or are in operation), and for each vehicle, a specific order of passenger pick-ups and drop-offs, along with their respective locations and times.

Itineraries manager module 202 may have two modes of operation—planning and real-time. The planning mode may be configured to schedule vehicles/itineraries for the future (usually days in the future), while the real-time mode may be configured for use when itineraries are in progress and adjustments may be made to itineraries to account for disruptions such as traffic or vehicle failure or vehicle delay.

For example, in planning mode, itineraries manager module 202 may invoke the pre-travel optimizer module 212 to optimize itineraries for increased resource-consumption efficiency, increased vehicle sharing and reduced cost to the passenger.

For example, in real-time mode, itineraries manager module 202 may invoke real-time optimizer module 212 to adjust itineraries that are in-transit. For example, as detailed below, real-time optimizer module 212 may be configured to receive status data for a plurality of itineraries, process the status data to identify legs that are adjustable and to generate estimates of itinerary times (e.g., pick-up and drop-off) for those legs, and modify adjustable legs identified to minimize delays between the estimated itinerary times and scheduled itinerary times.

In an embodiment, pre-travel optimizer module 212 may be configured to modify the legs such that relative delay caused by ride-sharing for each of the passengers associated with the legs is within the tolerances for such delay. In an embodiment, the tolerances for such delay are defined through a travel windows (pick-up after and drop-off before times), which may be manually specified by the passenger or specified by automatically by allocation system 100. In an embodiment, the modification of legs may comprise attempting a plurality of trip insertions and removals within the plurality of itineraries, in manners detailed below.

Vehicle supply manager module 204 may be configured to determine the supply (number and type) of vehicles required to service a given set of trip booking requests received from passengers. In an embodiment, vehicle supply manager module 204 may be configured such that an operator can manually allocate vehicle supply (virtual or physical) for a given day(s) and period of time. Vehicle supply manager module 204 may receive itinerary data from itineraries manager module 202. Vehicle supply manager module 204 may receive vehicle supply data from one or more vehicle providers. Such data may be received, for example, on a periodic basis, on a push basis, on a pull basis and/or on an asynchronous basis.

Vehicle supply manager module 204 may be configured to invoke capacity calculator module 206 to determine which geographic areas (or routes) and time periods require more vehicles, and may be configured to cause changes to the vehicle supply (virtual or physical) in order to service the trip booking requests.

Vehicle supply manager module 204 may cause the addition and/or removal add or remove vehicles into service depending on demand, and the updated information may be communicated by itineraries manager module 202 (e.g., which may be operating in "real-time mode") which may invoke real-time optimizer module 214.

Calculated vehicle supply information or changes to it, may be sent to itineraries manager module 202. Vehicle supply manager module 204 may be configured for various modes of operation, such as "planning" and "real-time". The "planning mode" may be active when scheduling vehicles/itineraries for the future (for example, days in the future), while a "real-time mode" may be active when itineraries may be in progress and adjustments may be made to the vehicle supply to account for disruptions such as traffic or vehicle failure. Vehicle supply manager module 204 may be configured to work with virtual vehicles and/or physical vehicles.

Capacity calculator module 206 may be configured to receive a desired trip booking (e.g., a "seed trip") and generate one or more variations of that "seed trip", where various parameters may be modified.

For example, a passenger may provide a trip booking request wherein the passenger sets out various parameters, such as the origin location, the destination location, a desired departure/arrival time, a tolerance for delay caused by ride-sharing (e.g., relative to the passenger driving alone directly from origin to destination), among others. Capacity calculator module 206 may be configured to generate a number of variants, such as variant trip booking requests having different origin locations, destination locations, departure/arrival times, different tolerances for delay caused by ride-sharing (e.g., 20 minutes, 30 minutes, or 0.4 delay ratio, 0.5 delay ratio), etc.

In generating "seed trips" and variant trips, capacity calculator module 206 may be configured to receive a trip booking request including at least one of a requested pick-up time and a requested drop-off time. In an embodiment, the requested pick-up time is used to reflect an earliest time desired by the passenger for pick-up (i.e., a depart-after time). In an embodiment, the requested drop-off time reflects a latest time desired by the passenger for drop-off (i.e., an arrive-before time). In these embodiments, one of the pick-up and drop-off times may be used as a variable for determining variations of the trip. Variations are generated based on estimates of travel time of a passenger driving alone, and the passenger's tolerance for relative delay. So, variations that would exceed the passenger's tolerance are not presented. The passenger's relative delay tolerance for a booking request may be configured as a default system parameter or a user specified parameter As an example, if the desired trip ("seed trip") is for pick-up at Point A and drop-off at Point B, arriving by 10:00 am at Point B, and maximum trip duration of 1 hour, then capacity calculator module 206 may be configured to generate variants, invoke the trip insertion optimizer module 210 for each variant, and return the results for each variant as outputs:

Point A to Point B, arrive by 10:00 am, duration of 1 hour: Remaining capacity of 0.

Point A to Point B, arrive by 10:20 am, duration of 1 hour: Remaining capacity of 2.

Point A to Point B, arrive by 10:45 am, duration of 1 hour & 10 minutes: Remaining capacity of 4.

Point A to Point B, arrive by 9:30 am, duration of 50 minutes: Remaining capacity of 6.

Point A1 to Point B, arrive by 10:00 am, duration of 1 hour: Remaining capacity of 1.
   Where A1 is a location within 5 miles of A Point A to Point B1, arrive by 10:00 am, duration of 1 hour: Remaining capacity of 3.
   Where B1 is a location within 3 miles of B Point A2 to Point B1, arrive by 10:00 am, duration of 1 hour: Remaining capacity of 8.
   Where B1 is a location within 3 miles of B and A2 is within 4 miles of A So, plurality of potential ride-sharing itineraries are generated, each having a leg that satisfies the passenger's trip booking request. As shown in the above example results, these itineraries may include a plurality of different pick-up times for the passenger, a plurality of different drop-off times for the passenger, a plurality of different pick-up locations for the passenger (e.g., A, A1, etc.), and/or a plurality of different drop-off locations for the passenger (e.g., B, B1, etc.) In particular, the variants may include drop-off and pick-up times proximate the times requested by the passenger, and may include drop-off and pick-up locations proximate the locations requested by the passenger.

In an embodiment, capacity calculator module 206 invokes trip insertion optimizer module 210 to determine whether it is likely to be possible to fit the seed trip and each of the variants, before returning them as outputs. Thus, only plausible/possible trip options are presented to the passenger for selection. Interface module 216 has a trip options frequency and efficiency channeling sub-module 220 that evaluates efficiency scores and desired departure frequency, for plausible trip options and retains specific trip options to show to the passenger. Interface module 216 has a trip options ranking sub-module 218 that calculates scores for plausible trip options and orders them by priority to show to the passenger. A user selection for one of the trip options (corresponding to one of the potential ride-sharing itineraries) may be received, e.g., by way of interface module 216. Once one of the trip options has been selected, allocation system 100 may provide a confirmation to the passenger of acceptance of the trip booking request. The allocation system 100 may generate and transmit notification messages regarding the trip booking request to notify the driver linked to the vehicle assigned to the confirmedtrip booking option. The allocation system 100 is configured dynamically update or generate an itinerary with a dynamic route for the driver. The dynamic route includes multiple stop locations and stop times in response to passenger confirmedtrip booking options. Each stop location and stop time may be associated with the passenger that has confirmed a trip booking options.

As trip booking options are confirmed, allocation system 100 is configured to automatically and dynamically update, in real-time, the dynamic route of the itinerary for the driver to add to the additional stop locations and stop times associated with the new accepted trip booking requests. The allocation system 100 is configured to generate and transmit notifications of the updated itinerary to a device associate with the driver of the vehicle. In some embodiments, only a subset of the itinerary may be communicated to the vehicle, in order to allow future dynamic updates to the vehicle itinerary. The driver can access interface using its device to view portions of the updated itinerary or route in real-time. Accordingly, this may provide an efficient system as the vehicle only travels the dynamic route that is generated in response to passenger requests and set up a fixed route that may not have any passengers requesting pickup.

Capacity calculator module 206 may be configured to generate a usable estimate of available capacity in the system (vehicles and/or drivers and their associated itineraries) for the desired trip, or variations of the desired trip. The available capacity relates to available vehicles and itineraries that can be used for trip booking options to satisfy the trip booking request. The available capacity can be based on the trip price, pickup time, drop-off time, pickup location, drop-off location, and so on.

The output of capacity calculator module 206 may be provided to several other modules. For example, vehicle supply manager module 204 may be configured to utilize the output to determine whether to add more vehicles to the itineraries, and if so, how many and for which areas or routes or time periods.

Dynamic pricing manager module 208 may be configured to determine one or more trip prices for one or more trip booking requests based on trip characteristics and/or other factors, such as available capacity, amount of vehicle sharing, peak/off-peak periods, trip operating cost, relative delay metrics, etc. Trip prices may also be determined for "seed trips" and variations of seed trips, e.g., for alternate pick-up locations, alternate drop-off locations, alternate pick-up times, alternate drop-off times, alternate relative delay tolerances, etc.

Various factors (e.g., days remaining to trip date, length/duration of trip, popularity of a pick-up or drop-off location, amount of delay caused by ride-sharing, objective value of the newly generated ride-sharing itineraries, as detailed below) may also be considered in determining which prices to attach to a ride option.

In an embodiment, a trip options frequency and efficiency channeling sub-module 220 takes as inputs (i) trip booking request (ii) trip booking options from the capacity calculator module 206, that satisfy the trip booking request, and for each trip booking option (iii) its efficiency score. From the various trip booking options, it analyzes the efficiency score, and their temporal proximity to each other and to the trip booking request, and desired departure frequency. It removes specific trip booking options that are less efficient and sends the retained list of trip booking options to trip options ranking sub-module 218 and/or to interface module 216. The retained list of trip booking options are (i) channeled in order to improve the efficiency of a ride-share itinerary, and (ii) presented in a certain time frequency (eg: every 15 minutes) that facilitates better planning for the end user. The retained list of trip booking options provide different pickup time options that span a time range. The different pickup times can differ based on a time frequency. For example a first pickup time can be T1, a second pickup time can be T2 equal to T1 plus the time frequency, a third pickup time can be T3 equal to T2 plus the time frequency, and so on. In an embodiment, the time frequency can be a factor of the trip length of duration. The trip length of duration relates to the distance or length between the pickup location and drop off location of the trip booking request. In some embodiments, a shorter trip length of duration can define a shorter time frequency between the different pick up time options of the trip booking options. For example, a person requesting a short 2-mile trip may be presented trip booking options with different pick up time options that differ by a time frequency of every 10-minutes, while a person requesting a longer 30-mile trip may be presented trip booking options with different pick up time options that differ by a time frequency of every 30 minutes. Varying the time frequency allows the sub-module 220 to further improve efficiency by channeling trips across a wider time range. This may increase ride-sharing options for passengers, for example. Providing different pickup time options that differ by a dynamic time frequency may improve efficiency by providing opportunity for more passengers in the vehicle due to the different time windows. In a traditional carpool scenario, a driver wishing to carpool with passengers travels from a starting location to an end location often at a set time such as before work and after work, for example. The driver will have a set pickup time and set pickup location (e.g. based on the route between the driver's start location and end location) that is offered to other passengers that might want to carpool with the driver. In contrast, embodiments described herein provide a dynamic range of pickup times (e.g. that differ by the trip frequency) for a dynamic range of pickup locations as the drivers of the vehicles are not restricted to a carpool scenario with a set time for a pickup location. For example, the driver may provide a shuttle service that continually moves between different locations at different times without having route and time constraints.

The objective value includes measures of efficiency which may be referred to as an efficiency score. The efficiency scores for feasible trip options use at least one measure of the following—ride share level, hange in vehicle itinerary, change in vehicle operating cost, change in vehicle distance/time traveled, or route deviation that would be incurred in order to incorporate the trip option into a ride-share itinerary. An objective function can be used to compute the objective values. For example, an objective function can include one or more objective values that relate or measure efficiency.

In an embodiment, a trip options ranking sub-module 218 computes relevance scores for trip options using at least one measure of the following—change in objective value, change in vehicle itinerary, change in vehicle operating cost, change in vehicle distance/time traveled. Trip options ranking sub-module 218 retains and orders trip options based on the computed relevance scores, and said ordering is utilized in displaying trip options to the user.

Trip insertion optimizer module 210 may be configured to receive a given set of ride-sharing itineraries and a set of desired ride-sharing trips that may need to be assigned to the ride-sharing itineraries. Assignment of ride-sharing trips to the ride-sharing itineraries may include, for example, inserting the ride-sharing trip into feasible positions in the ride-sharing itineraries, adjusting other ride-sharing trips provided for in the ride-sharing itineraries, etc.

As noted, during a booking process, trip insertion optimizer module 210 may be configured to perform a preliminary determination as to whether the desired trips can be assigned to (inserted into) the existing vehicle itineraries and bookings. For example, such a preliminary determination may be performed by conducting only a subset of the optimization activities conducted by pre-travel optimizer module 212.

In an embodiment, trip insertion optimizer module 210 may be configured to have a relatively faster response time as the trip insertion optimizer module 210 may be invoked in response to a booking inquiry made, for example, by a passenger.

In an embodiment, trip insertion optimizer module 210 may be configured to generate an alert when an attempt to insert a one or more new trips into the itineraries fails.

Trip insertion optimizer module 210 may be configured to return results responsively (e.g., within a certain threshold of time) back to the passenger. For example, it may be important to ensure that a customer's attention is not lost by a slow or unresponsive system. Trip insertion optimizer module 210 may be configured to use various techniques and/or processes to determine possible/plausible ride-sharing itineraries for the purposes of determining whether a booking is likely to be accepted by allocation system 100.

For example, a passenger may wish to check whether a trip between the passenger's home and the train station may be available during a particularly busy period of time. The passenger may input a trip booking request in allocation system 100 including various characteristics about the desired trip booking. Allocation system 100 may invoke trip insertion optimizer module 210 to determine whether the passenger's desired trip booking can be accepted.

Trip insertion optimizer module 210 may conduct a determination of whether it would be possible and/or plausible to fit the trip booking request in view of existing ride-sharing itineraries. In an embodiment, the ride-sharing itineraries may not yet be assigned to actual vehicles, and the trip insertion optimizer module 210 may utilize information related to one or more virtual vehicles. Accordingly, each ride-sharing itinerary may be assigned to a vehicle, the vehicle being an actual vehicle or a virtual vehicle.

Pre-travel optimizer module 212 may be configured to receive a set (or sets) of ride-sharing itineraries (e.g., stored in data storage 250), and booked ride-shared trips for assignment to various ride-sharing itineraries. As detailed below, pre-travel optimizer module 212 optimizes itineraries after booking, e.g., after confirmation of a booking has been provided to a passenger. For example, pre-travel optimizer module 212 may optimize itineraries by further modifying the itineraries, e.g., by various insertions/removals of legs.

Pre-travel optimizer module 212 may be configured to determine one or more optimal ride-sharing itineraries for each vehicle, where each itinerary may include various information, such as the vehicle's time in operation (e.g., 7:00 AM-11:00 AM), the specific order of pick-ups and drop-offs, the specific legs of itineraries, and the associated passengers, locations and times, so as to minimize (or maximize) an objective value (e.g., various metrics).

There may be one or more metrics that may be used as an objective value. In an embodiment, pre-travel optimizer module 212 may be configured to determine and/or apply, as an objective value, a metric of relative delay caused by ride-sharing, wherein the metric of relative delay is calculated from an estimated transit time (or distance) for the passenger in a ride-share compared to an estimated transit time (or distance) for the passenger driving alone (directly from his origin to destination).

In one example, the metric of relative delay may be calculated as a ratio of the estimated transit time for the passenger according to the further ride-sharing itinerary and the estimated transit time for the passenger driving alone. In another example, the metric of relative delay caused by ride-sharing is calculated as a difference between the estimated transit time for the passenger according to the further ride-sharing itinerary and the estimated transit time for the passenger driving alone. In another example, the metric of relative delay may be calculated using a combination of the noted ratio and difference. In another example, the ratio may be used for longer trips exceeding a certain travel time, while the difference may be used for shorter trips.

In another example, the metric of relative delay may be calculated as a ratio of the estimated transit distance (kilometers or miles) for the passenger according to the further ride-sharing itinerary and the estimated transit distance for the passenger driving alone. In yet another example, the metric of relative delay caused by ride-sharing is calculated as a difference between the estimated transit distance for the passenger according to the further ride-sharing itinerary and the estimated transit distance for the passenger driving alone. In another example, the metric of relative delay may be calculated using a combination of the noted ratio and difference. In another example, the ratio may be used for longer trips exceeding a certain travel distance, while the difference may be used for shorter trips. An advantage of utilizing transit time, instead of transit distance, is that time incurred by a vehicle stopping along a route (without any route deviations) to pickup or drop off additional passengers is captured and can be utilized, whereas transit distance may only capture delays caused by route deviations. The transit time may in turn impact cost as an idle vehicle may still incur operating costs such as gas, and so on.

A passenger may be able to indicate a tolerance threshold for relative delay when establishing a trip booking request. A passenger may be able to incorporate the tolerance threshold as part of a travel window (depart after and arrive before times) included with the trip booking request.

In some embodiments, the metric of relative delay may be calculated on an aggregate level, calculating a metric of relative delay for multiple passengers.

In some embodiments, allocation system 100 may be configured to store a plurality of relative delay tolerance metrics, each reflective of tolerance for delay caused by ride-sharing of a particular passenger. The ride-sharing itineraries may be optimized such that the relative delay for each passenger is within an acceptable tolerance of that passenger.

Examples of objective values may include, number of passengers/trip requests included in the itineraries, cost per passenger kilometer, total vehicle time, total vehicle kilometers, vehicle "in-transit" time, vehicle "in-transit" operating cost, aggregate vehicle utilization, aggregate vehicle kilometers divided by aggregate passenger kilometers, a metric of relative delay for a passenger, a metric of relative delay for multiple passengers, a metric of violation of passenger(s) targeted pickup time, a metric of violation of passenger(s) targeted arrive-before time.

Aggregate (or total) passenger kilometers can be the sum of direct distances for all passengers. This represents the total distance traveled if each passenger independently drove directly or along a specified path in his/her own vehicle directly from his/her respective origin to destination without stopping for picking up or dropping off other passengers.

Total (or aggregate) vehicle kilometers can be the sum of vehicle travel distances in all vehicle ride-sharing itineraries.

Violation of passenger(s) targeted pickup time can be the difference between the estimated pickup time and the targeted pickup time. For example, a passenger's trip booking may have a pickup time of 9:00 to 9:05, whereas based on traffic conditions or delays by other passengers, the estimated or real pickup time may be 9:10, which would result in a pickup time violation of 5 minutes.

Summed pickup time violation can be the sum of each trip and/or individual's violation of pickup time in a vehicle ride-sharing itinerary or across all vehicle ride-sharing itineraries.

Violation of passenger(s) targeted arrive-before time can be the difference between the estimated drop-off time and the targeted arrive-before time. For example, a passenger's trip booking may have an arrive-before time of 9:00, whereas based on traffic conditions or delays by other passengers, the estimated or real drop-off time may be 9:10, which would result in a drop-off time violation of 10 minutes. Summed drop-off time violation is defined as the sum of each trip/individual's violation of drop-off time in a vehicle ride-sharing itinerary or across all vehicle ride-sharing itineraries.

Vehicle "in-transit" operating cost can be the estimated cost for a vehicle to complete the trip pickups and drop-offs in an itinerary, but excluding any idle time. For example, an itinerary for 2 hours may have 1 hour and 15 minutes of activity that includes driving to passengers' pickup locations, waiting for a passenger(s) to enter or leave the vehicle, and driving to passengers' drop-off locations. These activities might incur 20 miles of driving by the vehicle. The remaining 45 minutes may be idle time. The vehicle's "in-transit" operating cost is calculated based on a time and distance rate for the 1 hour and 15 minutes of driving for 20 miles, and may be $43.00.

Summed vehicle "in-transit" operating cost can be the sum of vehicle "in-transit" operating costs in all vehicle ride-sharing itineraries.

In an embodiment, an objective value combines multiple metrics such as summed relative delay for all passengers ("SRD") and summed vehicle "in-transit" operating cost.

In one embodiment, the objective value equals the sum of 0.6 multiplied by the summed vehicle "in-transit" operating cost and 0.2 multiplied by SRD and 0.1 multiplied by summed pickup time violation, and summed drop-off time violation raised to the exponent of 2, said objective value here-in referred to as "Combined Objective Value". An advantage of applying an exponent to one of the components of the Combined Objective Value is to give it more importance as it increases in value. For example, if certain passenger(s) are incurring significant drop-off time violations because of ride-sharing then the system needs to prioritize dropping off the passenger in arranging the ride-sharing itineraries. The application of an exponent is optional however, and instead a linear multiplier can also be utilized. An objective function is used to compute the objective values. Referring to the example noted above, an objective function may be of the form:

$$P1*ITOC+P2*SRD+P3*PV+DV^2$$

where P1 is a first parameter value, P2 is a second parameter value, P3 is ⅓ parameter value, ITOC is summed "in-transit" operating cost, SRD is a summed relative delay, PV is a summed pickup time violation, and DV is a summed drop-off time violation. The parameter values may be 0.6, 0.2, and 0.1 based on the above example.

In one embodiment average relative delay may be used as a metric of relative delay, where said average relative delay is calculated as the average of each passenger's relative delay.

In one embodiment summed relative delay (SRD) may be used as a metric of relative delay.

Pre-travel optimizer module 212 may be configured to optimize ride-sharing itineraries while respecting one or more of each passenger's constraints (or requirements) such as maximum travel time, pick-up time window, drop-off time window, travel window, pick-up location and drop-off location, tolerance for relative delay, etc.

Pre-travel optimizer module 212 may also be configured to also perform various optimization activities while respecting each vehicle and/or driver constraints, such as operating hours, size/class, maximum seat capacity, maximum time in operation, minimum time in operation, minimum cost, requirement to return to its home base, etc.

Pre-travel optimizer module 212 may be configured to provide an optimized set of itineraries that minimize (or maximize) one or more objective values while respecting some or all the passengers' and vehicles' constraints/requirements.

The optimization may include the classification of the one or more objective values as primary, secondary, etc., and each of the objective values may have differing weights associated for optimization. For example, the total number of passengers/trip requests served may be a primary objective value, while a metric of vehicle "in-transit" operating cost may be a secondary consideration, and a metric of relative delay may be a tertiary consideration.

In an embodiment, the total number of passengers/trip requests served is a primary objective value, and Combined Objective Value (as defined above) is a secondary objective value. When the optimization method evaluates two potential sets of itineraries "states", the state with the better primary objective value is chosen first. When both states have the same primary objective value, the secondary objective value is considered to break the tie.

So, in an embodiment, the metric of relative delay or a metric of summed relative delay over multiple (e.g., all) passengers may be optimized as a non-primary criterion.

In an embodiment, one or more of these objective values can be combined in order to arrive at a new objective value.

In an embodiment, one or more of these objective values may be a weighted score calculated using a metric of relative delay for multiple passengers, such as described above with the Combined Objective Value.

In an embodiment, pre-travel optimizer module 212 may be configured for use in planning, and may be run in advance of the travel provided for in the ride-sharing itineraries. For example, pre-travel optimizer module 212 may be run a day or more in advance of travel, or on a continuous basis until the day before the ride-sharing itineraries.

Real-time optimizer module 214 may be configured for the optimization or adjustment of ride-sharing itineraries that are currently in-transit, e.g., being implemented by assigned vehicles. Real-time optimizer module 214 may be configured to conduct various optimization activities in making adjustments to active ride-sharing itineraries in response to various factors, such as disruptions caused by traffic and/or vehicle failures. Other types of factors may include delays due to traffic or weather or road conditions, passenger no-shows or emergencies, driver emergencies, passenger cancellations, new bookings, modified bookings, etc. For example, the real-time optimizer module 214 may be configured to adjust one or more legs of one or more itineraries based on data received.

In an embodiment, the optimization activities conducted by real-time optimizer module 214 may be a subset of the optimization activities conducted by the pre-travel optimizer module 212.

In an embodiment, various heuristic, statistical and/or probabilistic methods may be utilized. Real-time optimizer module 214 may be configured to receive real or near-real-time information, such as information regarding each vehicle's current location, travel speed, projected itinerary times, current seat utilization, traffic conditions, event conditions, road conditions, etc., and real-time optimizer module 214 may be configured to perform optimization adjustments to the itineraries of vehicles in transit (or soon to be in transit). For example, a specific passenger that is due to be picked up an hour from now may be transferred to another vehicle's itinerary because the original vehicle is delayed due to traffic.

In an embodiment, real-time optimizer module 214 may be configured to utilize status data that comprises data reflective of at least one of a current traffic condition, a current location of a vehicle implementing one of the itineraries, a current speed of a vehicle implementing one of the itineraries, an estimated speed of a vehicle implementing one of the itineraries, an estimated transit time for each leg of a vehicle implementing one of the itineraries, and a trip cancellation or no-show by one of the passengers.

In an embodiment, a modification is made to minimize a metric of relative delay caused by ride-sharing for the passengers associated with the legs. The metric of summed relative delay may be minimized as a non-primary minimization criterion.

In an embodiment, a modification is made to minimize a metric of pickup time and/or drop-off time violations caused by ride-sharing for the passengers associated with the legs. The metric of pickup/drop-off time violations may be minimized as a non-primary minimization criterion.

In an embodiment, modifications use relative delay tolerance metrics, each reflective of tolerance for delay caused by ride-sharing of a particular passenger. So, modifications may be performed such that relative delay caused by ride-sharing for each of the passengers associated with the legs is within the tolerances for delay caused by ride-sharing of that passenger. In an embodiment, modifications may be performed after adjusting at least one of the relative delay tolerance metrics for at least one of the trips (e.g., to increase the tolerance to accommodate a greater delay).

In an embodiment, real-time optimizer module 214 is configured to perform modifications by attempting a plurality of trip insertions and removals within the plurality of itineraries, in manners detailed below. Such attempts may include adjusting at least one of the relative delay tolerance metrics.

In an embodiment, real-time optimizer module 214 is configured to insert a new trip into an in-transit itinerary in response to a new booking request from a passenger.

In an embodiment, real-time optimizer module 214 is configured to modify a trip in response to a change to a booking request from a passenger (e.g., changed pick-up time, or drop-off time).

In an embodiment, real-time optimizer module 214 is configured to process status data to identify legs of the plurality of itineraries that are unlikely to meet at least one of the scheduled itinerary times. Real-time optimizer module 214 may modify these legs to improve the likelihood that they meet the scheduled itinerary times. For example, a leg may be removed from its current itinerary and inserted into another itinerary. A leg may also be modified by adjusting one or more of the scheduled itinerary times (e.g., drop-off or pick-up). Such adjustment may be performed taking into account the relative delay tolerances metrics for passengers, e.g., to ensure that such tolerances are not exceeded. In an embodiment, real-time optimizer module 214 may adjust one or more of such tolerance, e.g., to increase the tolerance to accommodate a greater delay.

In an embodiment, real-time optimizer module 214 is configured to generate an alert when an attempt to insert a passenger trip request (e.g., for a new trip or an existing scheduled trip that has been removed) into the itineraries fails.

Interface module 216 may be configured to provide various interfaces that may be used for communication and/or interaction with allocation system 100. For example, the interface module 216 may be configured to provide a web interface (e.g., a web page, a mobile-enabled web page), a text interface (e.g., SMS message notification and/or parsing system), an interactive voice response (IVR) interface, a human representative interface and/or a telephony interface.

Various interfaces may be used in conjunction with interactions with various entities. For example, there may be an interface adapted for use with drivers, and there may be another interface adapted for use with passengers (e.g., passengers setting up profiles, making bookings, requesting information, sending out notifications). There may be interfaces adapted for interactions with external systems and/or fleet management and/or dispatch services.

The interfaces may be adapted to operate over one or more networks, such as point-to-point networks, cellular networks, the Internet, intranets, plain old telephone service (POTS), etc. The interfaces may be implemented using various techniques and/or technologies, such as application programming interfaces (APIs), RESTful services, SOAP-based web services, etc.

Database 250 may be comprised of non-transitory computer-readable media storing various elements of information, such as passenger profiles, itinerary information, constraints, heuristic information, ride sharing requests, historical data, analytic data, event data, sensory data, etc. The information may be stored in various formats, such as flat files, database records, spreadsheets, etc. Database 250 may be a relational database.

In an embodiment, allocation system 100 may include a customer billing module and/or one or more non-transitory computer readable media storing customer profiles/accounts that may be associated with booking requests.

In an embodiment, allocation system 100 may include a notification and tracking module that may provide passengers with notifications associated with the ride-sharing itinerary (e.g., that the vehicle is about to arrive to pick them up and/or real-time vehicle location viewing).

For example, allocation system 100 may be configured to communicate an SMS notification to the passenger's mobile phone when the vehicle is approaching the passenger (e.g., the vehicle is 15 minutes away from picking up the passenger), as may be tracked by the GPS device on the vehicle.

As another example, allocation system 100 may be configured to show the vehicle's current location (as tracked by the GPS device on the vehicle) on the passenger's smartphone or other computing device along with an expected time of arrival (ETA).

As another example, as a safety measure, allocation system 100 may be configured with the ability to enable passengers to share the location of the vehicle to friends/family while the passengers are riding in the vehicle.

In an embodiment, allocation system 100 may be implemented using one or more computing devices. The computing devices may be the same or different types of devices. The computing device may include, for example, at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, embedded device, personal computer, or any other computing device capable of being configured to carry out the methods described herein.

Figure 3:
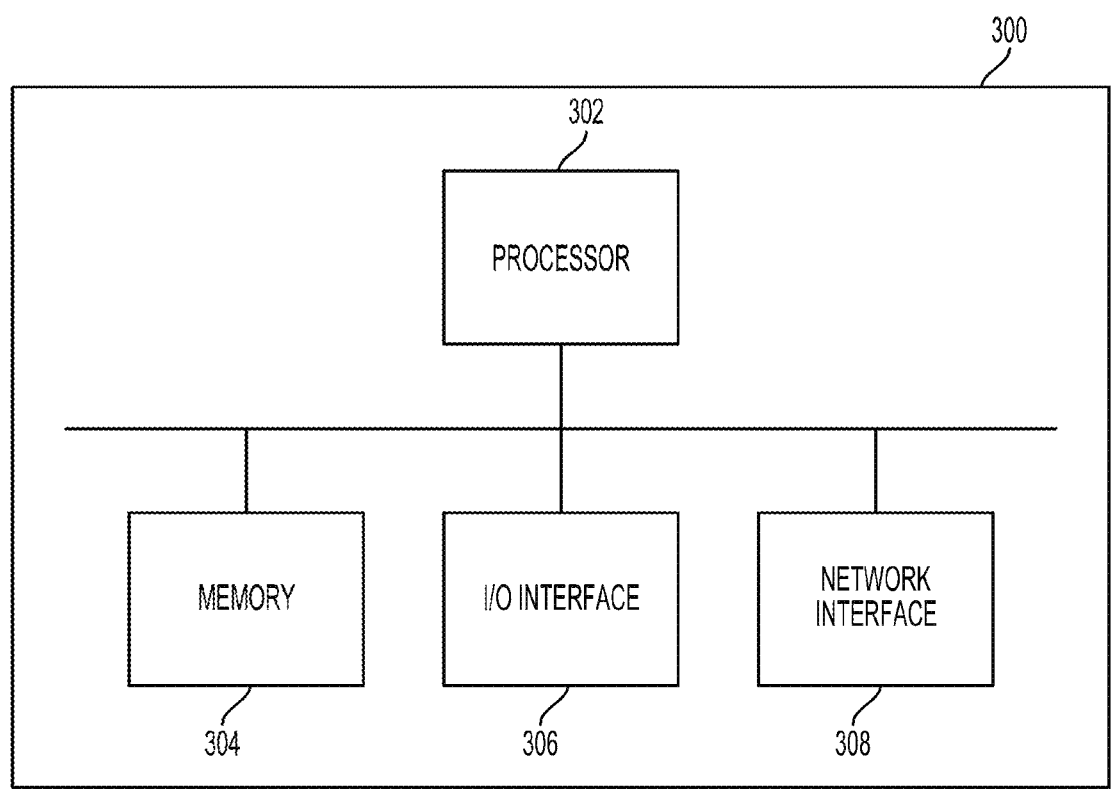
FIG. 3 is a schematic diagram of a computing device that may be used to implement the allocation system of FIG. 1, according to an embodiment.

FIG. 3 is a schematic diagram of an example computing device 300 that may be used to implement allocation system 100, exemplary of an embodiment. As depicted, computing device 300 includes at least one processor 302, memory 304, at least one I/O interface 306, and at least one network interface 308.

Each processor 302 may be, for example, any type of general-purpose microprocessor or microcontroller, a digital signal processing (DSP) processor, an integrated circuit, a field programmable gate array (FPGA), a reconfigurable processor, or any combination thereof.

Memory 304 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables device 300 to interconnect with one or more input devices, such as a keyboard, mouse, camera, touch screen and a microphone, or with one or more output devices such as a display screen and a speaker.

Each network interface 308 enables device 300 to communicate with other components, to exchange data with other components, to access and connect to network resources, to serve applications, and perform other computing applications by connecting to a network (or multiple networks) capable of carrying data, e.g., one more networks 8.

In an embodiment, allocation system 100 may be implemented as a physical or virtual instance using various distributed-resource technologies, such as "cloud computing". Potential benefits to "cloud computing" include ease of adding/removing resources, load balancing, etc.

In an embodiment, allocation system 100 may be configured to utilize a distributed queuing and parallel processing system in order to distribute the workload, improve efficiency and enhance the responsiveness of the allocation system.

Figure 4:
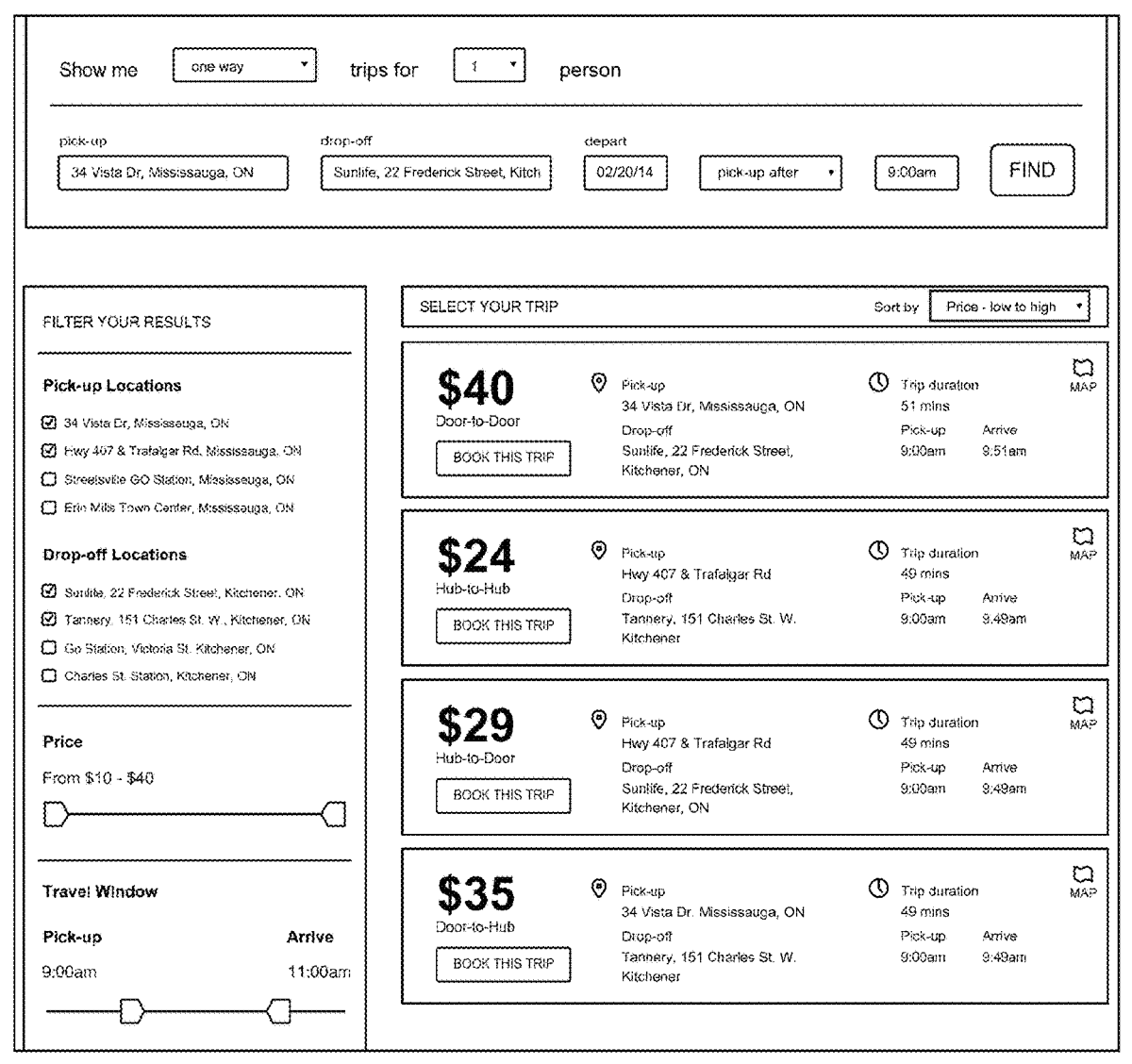
Figure 4A:
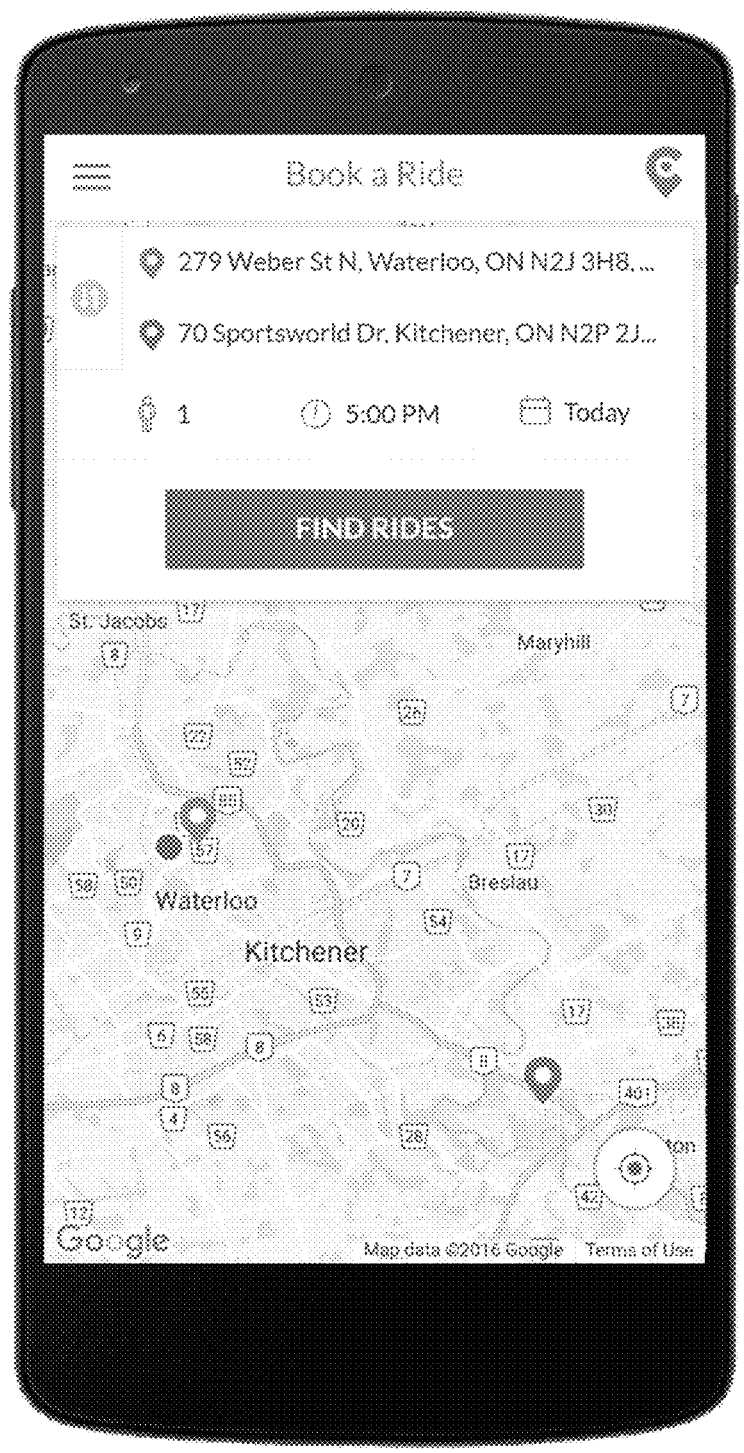
FIG. 4A is a screenshot of an example passenger facing mobile interface application, according to an embodiment.

FIG. 4 is a screenshot of an example passenger facing website, exemplary of an embodiment. The passenger facing website may, for example, be an interface through which passengers may interact directly or indirectly with allocation system 100. The customer facing website may communicate, for example, through a network 8. The various modules of allocation system 100 may be configured to process various interactions with the passenger, such as information requests, decision support, trip booking requests, trip cancellations, trip modifications, etc. Allocation system 100 may be configured to provide information relating to available trips that match or may be similar in specifications to the ride request and the associated prices for each trip option.

The interface may be configured to receive payment information.

The screenshot provided is an example, and a passenger may utilize the interface in various ways, and to engage in various activities, such as research, booking, requesting options, inputting trip booking characteristics, setting thresholds, reviewing prices, etc.

For example, a passenger can specify his or her desired travel requirements such as the date of travel, the arrival time or pick-up time, the locations for pick-up and drop-off, the number of passengers and whether it is a one-way, return or multi-leg trip, tolerance for relative delay, etc.

In an embodiment, a passenger may be able to specify various elements of flexibility into a potential trip booking request. These elements of flexibility may be determined as ranges, alternatives, etc. For example, a passenger may indicate that there is flexibility in pick up location, drop off location, tolerance for relative delay, etc.

In an embodiment, allocation system 100 may be configured to allow a passenger to specify one of a "pick-up after" or a "drop-off before" time. For example, a passenger seeking transportation to his/her workplace may specify that the passenger should be dropped off prior to 9:00 AM. The latest "drop-off" time may not be flexible, but there may be flexibility in when the passenger could be "picked-up". In this example, potential ride-sharing itineraries that may fit this passenger's needs may include itineraries where the passenger is picked up at 8:30 AM and dropped off at 8:55 AM, picked up at 8:15 AM and dropped off at 8:57 AM, etc.

In an embodiment, the interface may be configured to provide one or more options and/or elements of information that may aid in supporting the decision of a passenger. For example, the interface may be configured to provide worst case travel times, exact trip time, etc.

In an embodiment, the interface may be configured to associate a passenger with a passenger profile, which may store various elements of information related to that passenger's preferences and/or historical trips.

In an embodiment, the passenger may specify a tolerance for relative delay. This tolerance may be stored at allocation system 100, e.g., in association with that passenger's profile.

In FIG. 4, the passenger's desired ride request is displayed along with the associated price for a door-to-door trip. Other trip options may be shown that may be variants of the trip booking request, as discussed below.

For example, possible ride-sharing options may be shown for slightly varying times (e.g., 30 minutes later) and/or for slightly varying pick-up or drop-off locations that are within a few miles of the specified pick-up/drop-off locations. Different prices may be associated with each trip option, as may be determined by dynamic pricing manager module 208.

As depicted, on the left panel, filters may be available to aid the passenger in viewing only the options that he/she may be interested in. The passenger may click on the "book this trip" button to select a specific option, provide payment details and book the trip. A trip that is booked may then be communicated to allocation system 100 as a trip-booking request and queued for insertion into a ride-sharing itinerary by the itineraries manager module 202.

Figure 5A:
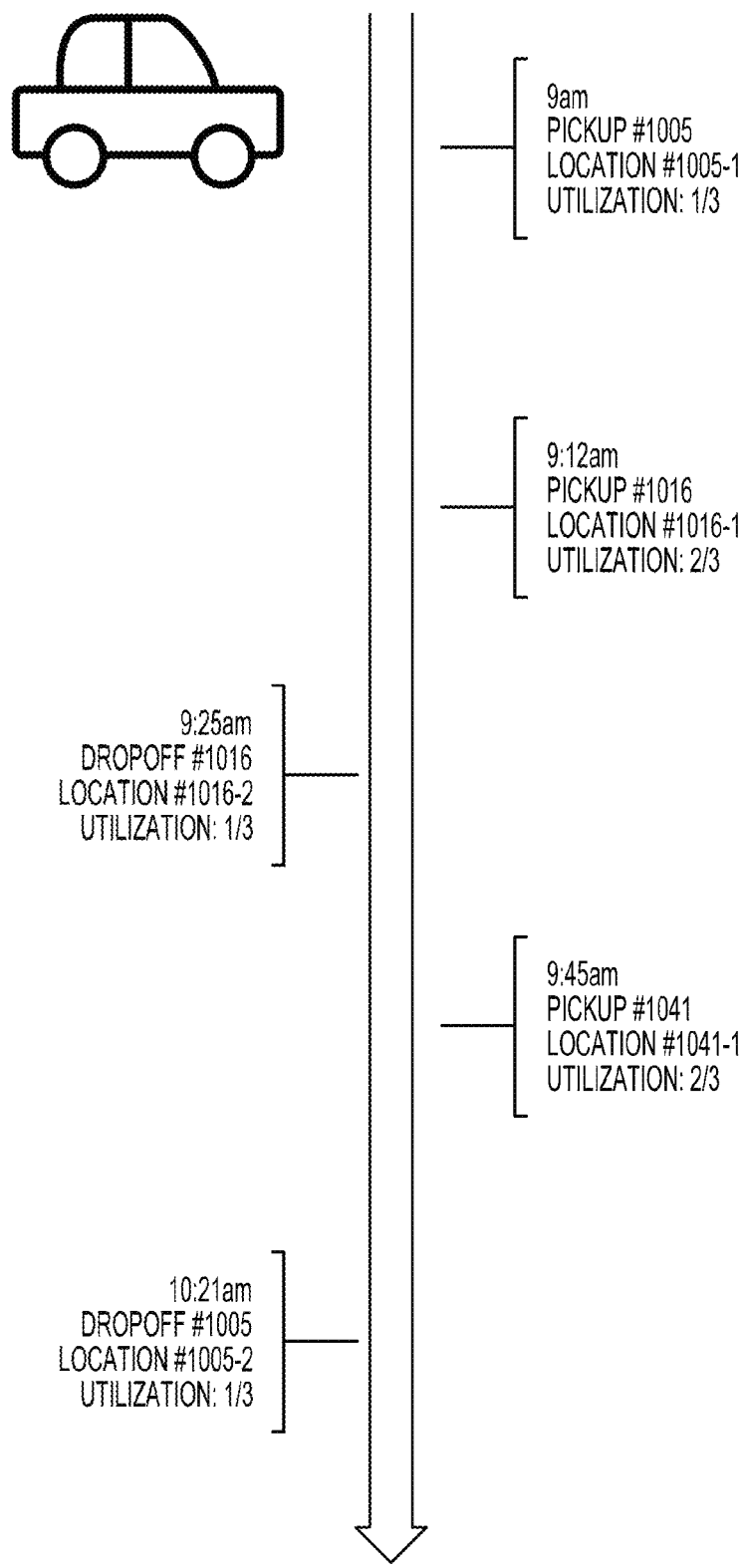
FIG. 5A illustrates an example vehicle itinerary, according to an embodiment.

FIG. 5A illustrates an example vehicle itinerary, exemplary of an embodiment. The itinerary is provided as an example, and there may be more, fewer, different characteristics. A number of different pick-up and drop-offs are scheduled, utilization is tracked, across a time period from 9:00 AM-10:21 AM.

Figure 5B:
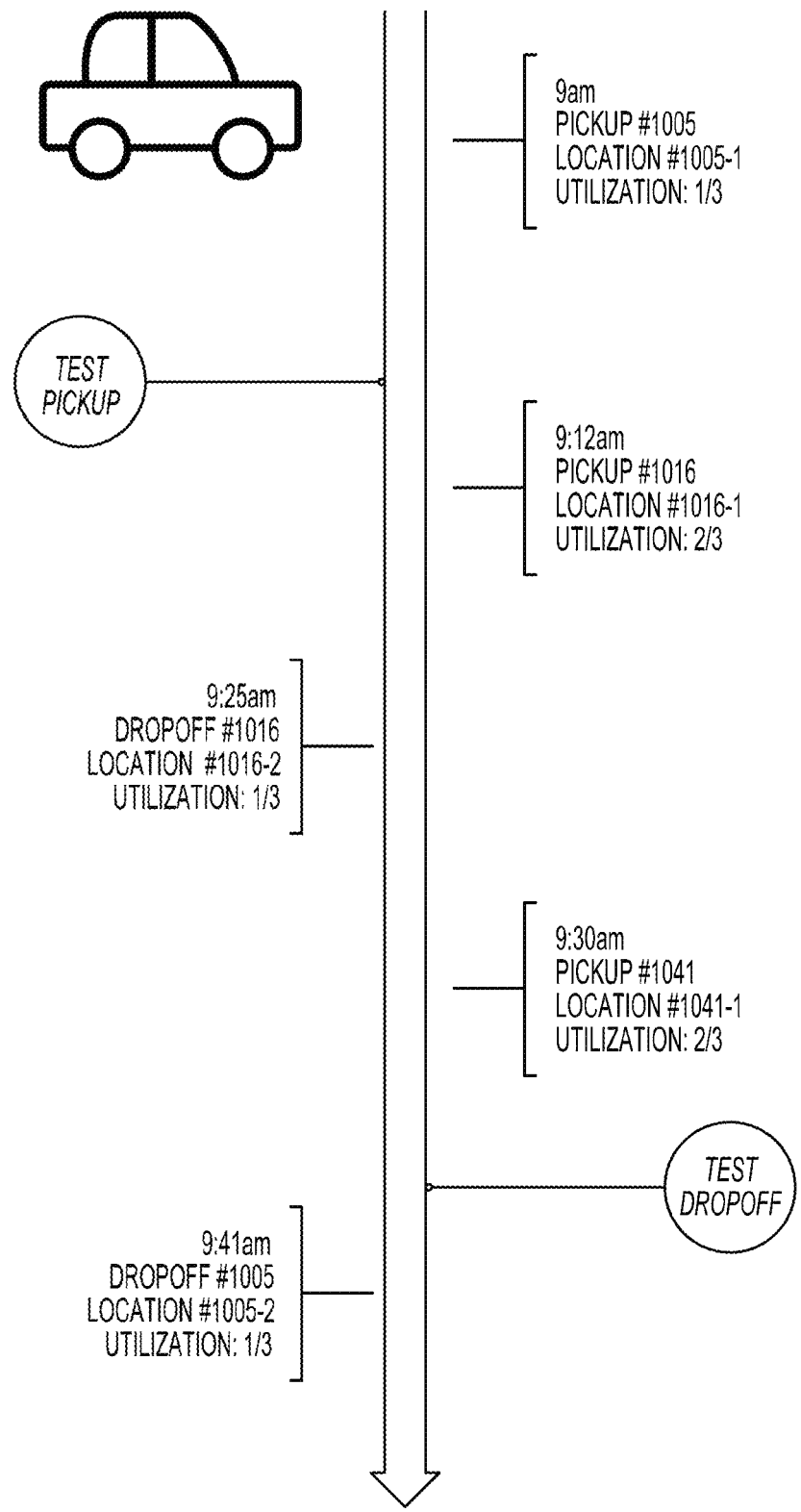
FIG. 5B illustrates an example test trip insertion to the itinerary of FIG. 5A, according to an embodiment.

FIG. 5B is an example flowchart illustrating a test trip insertion, exemplary of an embodiment. Other, different, additional, fewer steps may be provided. Further, some steps may be combined.

In this flowchart, an insertion heuristic attempts to insert the new trip's pick-up ("test pick-up") after pick-up #1005 at 9:00 am. If the test pick-up causes the vehicle to be delayed and makes it infeasible to make it to pick-up #1016 by its specific pick-up time window or drop-off #1016 by its specific drop-off time window or any subsequent scheduled trips in the itinerary, then it may be discarded as an infeasible pick-up spot, and the next spot may be attempted.

In the event that the test pick-up may be feasible without violating any constraints, the next insertion that may be attempted is the test drop-off.

A test drop-off is illustrated after pick-up #1041. If this test drop-off causes sufficient delay so as to make it infeasible to drop-off #1005 by its specific drop-off time window or make it infeasible to preserve the scheduled time windows for subsequent trips in the itinerary, then the test drop-off may be discarded as an infeasible drop-off spot, and the next spot may be attempted. If the test drop-off is added at the end of the itinerary, then the vehicle's operating time may be extended, and its time of return to home-base (if required) may be appropriately adjusted. Every test pick-up and/or test drop-off may be performed in combination with a validation function to ensure that the test does not violate any constraints for any of the other scheduled trips or any constraints of the vehicle (e.g., capacity, operating time etc.).

In an embodiment, these changes may be checked against the vehicle/operator's vehicle availability constraints to ensure they are not violated.

In an embodiment, an insertion attempt can fail altogether at first, or in other words it was not possible to insert the trip request (pick-up/drop-off) into any vehicle itinerary while maintaining the constraints of all the passengers and vehicles. Although an insertion may have failed, it does not necessarily mean that it is impossible. In a subsequent cycle of trip removals and trip insertions, it may be possible that the trips have been re-arranged such that it is now feasible to insert the trip request successfully into an itinerary without violating constraints. Accordingly, failed insertions may be attempted again at a later time.

In an embodiment, there may be multiple cycles of trip removals and insertions. For example, different orderings of the trip pick-ups/drop-offs in the ride-sharing itineraries may be attempted to explore and discover versions of itinerary sets that accommodate the trips.

In an embodiment, a greedy insertion heuristic may be utilized. The greedy insertion heuristic may attempt to insert trips in the order and specific locations that causes the smallest increase in the objective function value. Examples of objective function values include Combined Objective Value (as defined above), total vehicle operating cost, total vehicle kilometers, amongst others as discussed earlier.

A greedy insertion heuristic may, for example, include the following steps:

Step 1: Take a next trip (not previously attempted) from the list of removed trips or new trip booking requests:
 Choose a next vehicle itinerary (not previously attempted)
  Attempt to insert the trip's pick-up location at the next possible spot (not previously attempted) in the itinerary.

If no feasible next possible spot exists, return to step 1(a). Otherwise, update the itinerary for all following pick-ups & drop-offs and determine if it breaks any constraints.
 (a) If it breaks constraints then return to step 1(a)(i), otherwise continue
 (b) Attempt to insert the trip's drop-off location at the next possible spot (not previously attempted) in the itinerary.
 (c) If no feasible next possible spot exists, return to step 1(a)(i). Otherwise, update the itinerary for all following pick-ups & drop-offs and determine if it breaks any constraints.
  (i) If it breaks constraints then return to step 1(a)(ii)(2), otherwise continue
  (ii) Now that we have a feasible trip insertion (pick-up & drop-off), record the increase in the objective function value attributed to this specific feasible trip insertion. Store the result. Restore the itinerary back to its state before the drop-off insertion was done, and return to step 1(a)(ii)(2)

If no more vehicle itineraries remain (not previously attempted), then return to step (1).

Step 2: If no more next trips (not previously attempted) remain, allocation system 100 has tried to insert each trip in the list of removed trips into the itineraries, in all feasible locations, and recorded the resulting increase in objective function value.

If no feasible trip insertions were found for any trip, record the failed insertion and exit the insertion heuristic method Otherwise, if feasible trip insertions were found, identify the trip insertion (specific trip, specific itinerary and specific pick-up/drop-off order in the itinerary) that produced the lowest increase in objective function value, and label this as the "best trip insertion"

Apply that best trip insertion, which means remove the specific trip from the list of removed trips or trip booking requests, insert it into the specific itinerary/location as per the best trip insertion. Update the itineraries. Return to step 1.

Other types of heuristics may be utilized. Numerous removal and insertion heuristics are known in the field of meta-heuristics optimization processes, and may be included in allocation system 100. Additional non-limiting examples of additional removal/insertion heuristics include random removal, cluster removal, regret insertion and regret-k based insertion. Allocation system 100 may include a suitable combination of such heuristics, and may use different heuristics for different deletion/insertion cycles.

The choice of the specific heuristics to use for each cycle can be determined randomly, or can be determined dynamically. In an embodiment, heuristics may be dynamically chosen by way of a learning algorithm that may utilize the outcome of each cycle and adjusts an internal model accordingly so as to choose the better performing combination of removal/insertion heuristics. There may some performance benefits in including various elements of randomness and/or adaptation to the choice of removal/insertion heuristics.

The operation of the modules of allocation system 100 may be further described with reference to the flowcharts of FIG. 6 through FIG. 11.

Figure 6:
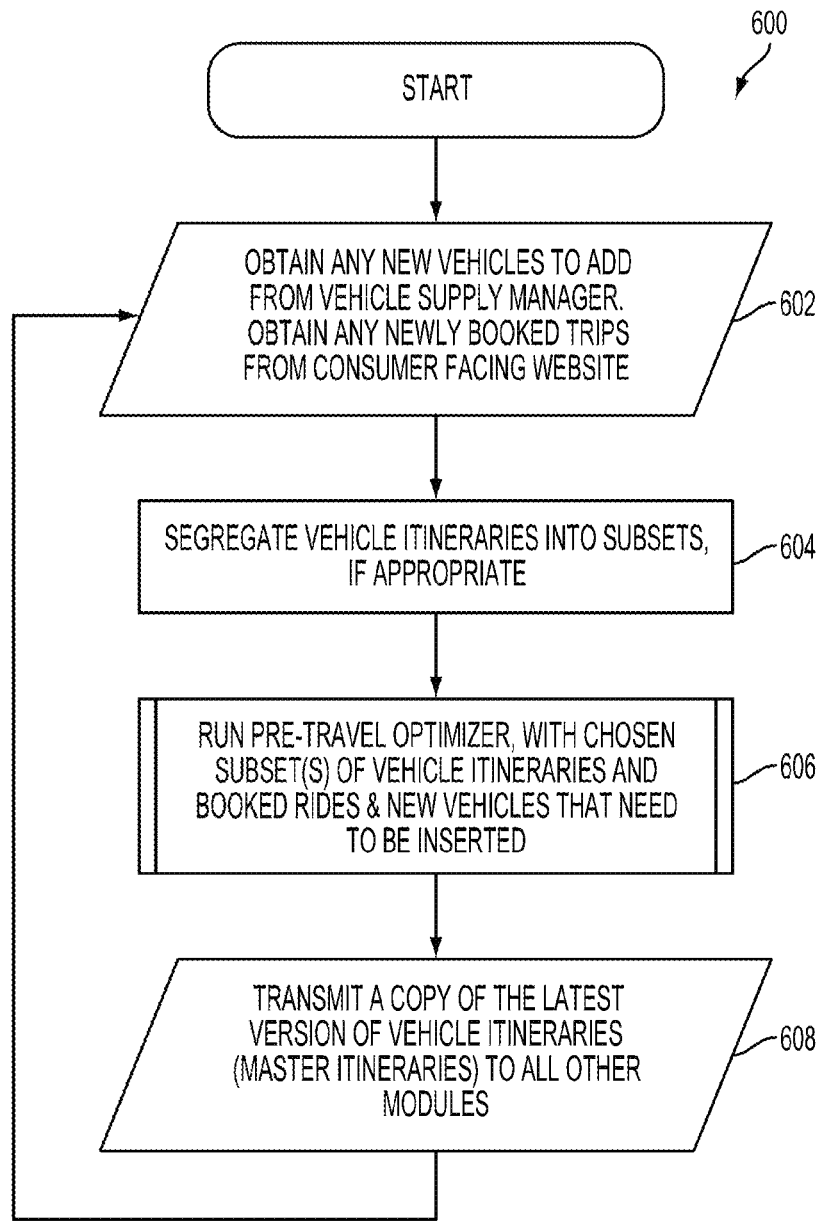
FIG. 6 is a flowchart illustrating an example method that may be performed by the itineraries manager module of FIG. 2, according to an embodiment.

FIG. 6 is a flowchart illustrating an example method that may be performed by itineraries manager module 202, exemplary of an embodiment. Other, different, additional, fewer steps may be performed in other embodiments. Further, some steps may be combined.

In an embodiment, the method may contemplate a base supply of vehicles that are initially allocated by the vehicle supply manager module 204 prior to accepting any ride bookings. These vehicles may have empty itineraries. As trip booking requests are received from passengers, trip bookings may be processed and itineraries manager module 202 may insert the trips into the appropriate ride-sharing itineraries. These vehicles may be virtual vehicles or physical vehicles.

Itineraries manager module 202 may be configured to maintain a pool of new ride bookings for insertion (or assignment) to vehicle itineraries.

In an embodiment, vehicle supply manager module 204 may be configured to monitor the itineraries and add/remove/modify vehicles associated with the itineraries, as needed. For example, virtual vehicles may be added so that new ride bookings can be fulfilled and assigned to a ride-sharing itinerary. In an embodiment, vehicle supply manager module 204 may be configured to manage the supply of vehicles such that the relative delay metrics associated with the passengers on one or more itineraries may be below a particular threshold. In an embodiment, the summed relative delay may be used as the relative delay metric.

At 602, itineraries manager module 202 may be configured to maintain a current list of ride-sharing itineraries, containing the list of vehicles scheduled to operate (or in operation), and for each vehicle the specific order of passenger pick-ups and drop-offs, along with their respective locations and times.

If new trip-booking requests have been made or new vehicles need to be added, it receives those inputs from interface module 216 and vehicle supply manager module 204 respectively.

At 604, itineraries manager module 202 may be configured to optionally segregate the vehicle itineraries into subsets. In an embodiment, the subsets may be used to enable parallel processing of sets of ride-sharing itineraries, which may provide for faster completion of the optimization.

In an embodiment, ride-sharing itineraries may be grouped into subsets based on a similarity match. For example, for every itinerary a closeness match may be calculated for every other itinerary. A closeness match may utilize inputs various elements of information, such as the day of the itinerary, itinerary start time, start location, itinerary end time, end location, and a subset of the trips in each itinerary, etc., which may be used to calculate a closeness value. Itineraries with high closeness values may be grouped into the same or similar subsets. In another embodiment, ride-sharing itineraries may be grouped into subsets based on set routes or route groups. A vehicle (such as a shuttle, for example) may be pre-assigned or dynamically linked to a specific route or set of routes. The vehicle may have multiple pickup times for a specific location along the route assigned or linked to the vehicle. The multiple pickup times may differ by a time frequency, such as every 30 minutes or 1 hour, for example. Creating the subsets of itineraries may be beneficial in that vehicles in the same area, similar routes, or having similar itineraries may be more suitable for optimization by re-ordering or swapping the passenger pick-ups/drop-offs, and the optimization process may be restricted to similar ride-sharing itineraries in order to increase speed of processing. The smaller subset of itineraries may be processed faster than a larger set of itineraries.

At 606, itineraries manager module 202 may be configured to provide as inputs, the subsets of itineraries, booked trips needing to be assigned to an itinerary, and any newly added vehicles, to pre-travel optimizer module 212. Pre-travel optimizer module 212 may be configured to perform ride-sharing itinerary optimization.

For example, optimization may be performed by determining the optimal itineraries for a given set of trip requests and vehicles, so as to minimize (or maximize) an objective value.

In an embodiment, cost per passenger kilometer is the objective value that is minimized.

In an embodiment, pre-travel optimizer module 212 may be configured to perform the optimization while respecting each passenger's constraints (or requirements) as well as each vehicle/operator's constraints.

In an embodiment, parallel processing may be utilized. For example, a separate process (or thread or CPU core) may be utilized to perform the optimization method on each subset of ride-sharing itineraries. After completing the optimization(s), one or more optimized sets of ride-sharing itineraries may be output.

At 608, the one or more optimized sets of ride-sharing itineraries may be transmitted to the other modules of allocation system 100, particularly vehicle supply manager module 204 and capacity calculator module 206. After transmitting the ride-sharing itineraries, itineraries manager module 202 may be configured to wait for new data relating to new booked ride-shared trips and/or new vehicles/operators.

Figures 7A, 7B:
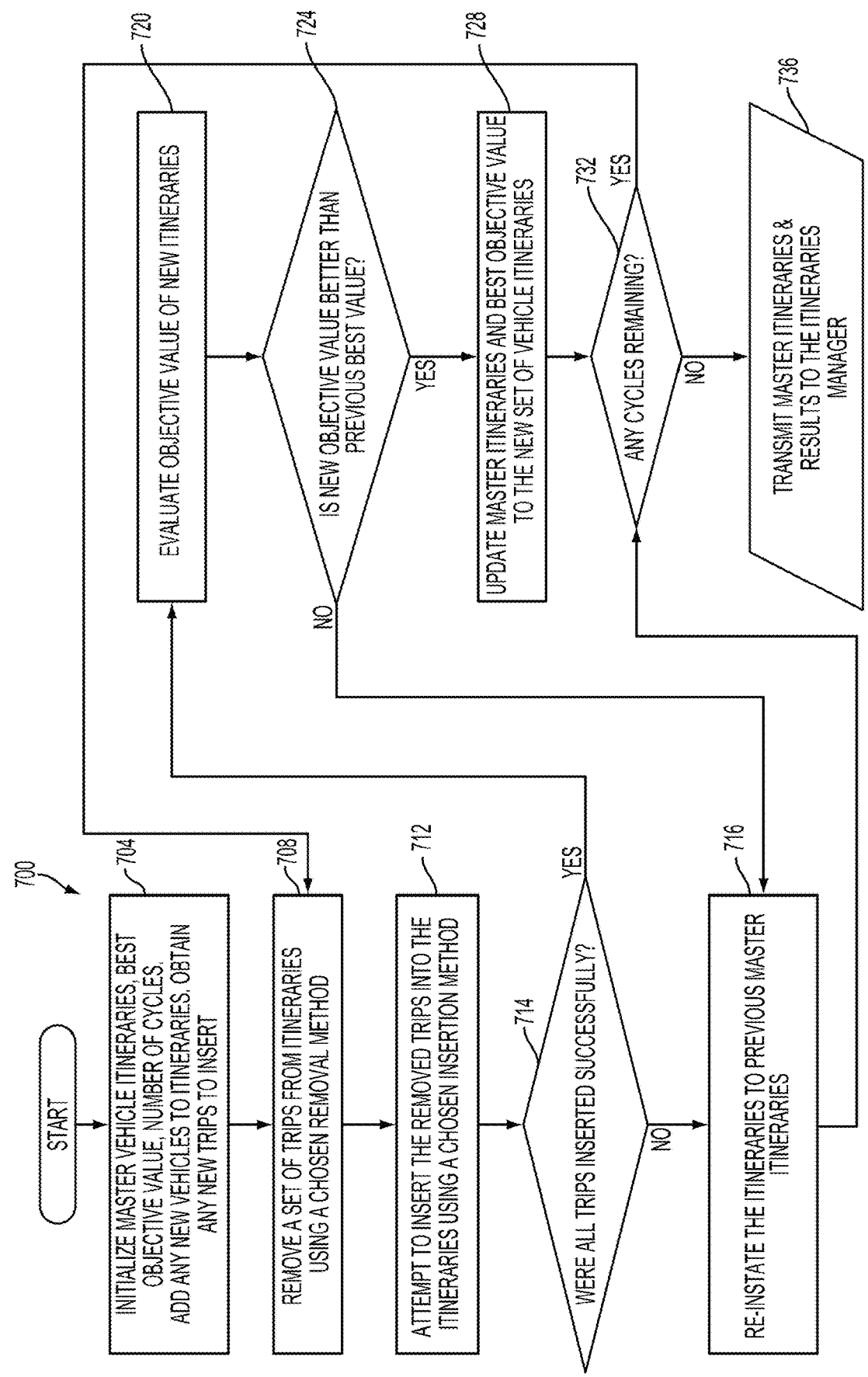
FIGS. 7A and 7B is a flowchart illustrating an example method that may be performed by the pre-travel optimizer module of FIG. 2, according to an embodiment.

FIGS. 7A and 7B is a flowchart illustrating an example method that may be performed by pre-travel optimizer module 212, exemplary of an embodiment. Other, different, additional, fewer steps may be performed in other embodiments. Further, some steps may be combined.

Pre-travel optimizer module 212 may be configured to receive a given set (or sets) of existing itineraries, and booked trips that need to be assigned to itineraries. Pre-travel optimizer module 212 may then utilize various optimization processes to minimize (or maximize) a specific objective value for the given set of itineraries and trips.

Examples of objective values may include total vehicle time, total vehicle operating cost, aggregate vehicle utilization, cost per passenger kilometer, vehicle kilometers, and relative delay. In an embodiment, Combined Objective Value (as described earlier) is the primary objective value that will be minimized. In another embodiment, total vehicle operating cost is the primary objective value that will be minimized, and summed relative delay may be a secondary objective value that is minimized.

For example, total vehicle operating cost may be defined as the sum of each vehicle's cost of operation for its entire itinerary, for a given set of vehicle itineraries. In an embodiment, the vehicle operator may be paid a flat hourly fee and each vehicle operator may be paid a different hourly fee (due to different types of vehicles or different times of operation). The total vehicle operating cost may be the sum of each vehicle's operating time (driver present and not idle) multiplied by its respective hourly rate/fee. By minimizing the cost of operating the vehicles, the cost of travel may be reduced for the passengers.

The optimization processes may, for example, seek to determine routes and specific order of passenger pick-ups and drop-offs such that the total vehicle operating cost is minimized, in aggregate, across a number of ride-sharing itineraries. Relative delay for a given passenger may be defined as the ratio of the given passenger's travel delay divided by the travel time if the passenger were to drive directly from her respective origin to destination.

Travel delay may be the difference between the actual travel time for the passenger and the travel time if the passenger were to drive directly from her respective origin to destination. Relative delay may be the delay incurred by a passenger by participating in ride sharing instead of driving directly from origin to destination.

Relative delay may, for example, be incurred because the vehicle may have other passengers to pick-up/drop-off during the passenger's travel in the vehicle. In an embodiment, relative delay may be normalized by dividing the travel delay by the direct travel time.

Total relative delay (or aggregate relative delay) may be calculated by adding all the travel delay values (for each passenger) and dividing that by the sum of all direct travel times (for each passenger). This ratio of sum of delays for the passengers and sum of direct travel times for the passengers represents an aggregate "relative delay" for the passengers in ride-sharing itineraries (e.g., the "inconvenience" to ride share).

Summed Relative Delay may be calculated by adding all the individual relative delay values (for each passenger). An advantage of Summed Relative Delay over the Aggregate Relative Delay (or Total Relative Delay) may be that it allows each itinerary's specific summed relative delay to be computed independently of other itineraries, and each itinerary's summed relative delay can be added up to arrive at the system's Summed Relative Delay. Using Summed Relative Delay may be advantageous for efficient computation and parallelized computation.

Average relative delay may be calculated by adding all the relative delay values (for each passenger) and dividing by the number of passengers.

Relative delay may be expressed as a ratio or as an absolute value respective of the passenger's travel time if the passenger were to drive directly from her respective origin to destination.

For example, for a passenger whose direct trip time would have been 30 minutes, if the actual trip time on the vehicle (with ride sharing) were 40 minutes, the passenger's relative delay may be 0.33. For example, a relative delay of under 0.25 may be considered to be excellent and a relative delay of over 1 is considered to be too high/poor.

For example, a travel delay of 15 minutes for a passenger whose direct trip time would have been 60 minutes may be considered to be good, while the same travel delay for 15 minutes may be considered to be poor if the direct trip time would have been 10 minutes.

Relative delay in essence captures this notion of travel delay relative to the passenger's direct trip time. Relative delay may be expressed as a ratio or as absolute values respective to the passenger's potential direct trip times.

One purpose of measuring relative delay may be to maintain the relative delay within an acceptable level. A higher relative delay worsens passenger inconvenience and thus lowers the likelihood that the passenger will take ride-sharing. Although it is important to minimize the total vehicle operating costs (and travel cost to the consumer), it is just as important to ensure that ride sharing occurs within relative delay value acceptable to the passengers. In one embodiment of the invention, keeping the average relative delay under 0.5 is a constraint that is respected by the optimization process. In one embodiment, a relative delay tolerance is associated with each passenger. The relative delay tolerance may be a combination of a relative delay metric and actual travel delay metrics. In one embodiment the passenger tolerance for relative delay is no more than 0.5, and the tolerance for travel delay is bound by an upper and lower threshold such as 15 minutes and 30 minutes.

One purpose of measuring the pickup and/or drop-off time violations may be to maintain the violations within an acceptable level. A higher time violation in the pickups or drop-offs worsens passenger inconvenience and thus lowers the likelihood that the passenger will take ride-sharing. In one embodiment, the processor may be configured with a constraint for the pickup time violation and drop-off time violation to under a threshold value (such as for example, 10 minutes) for each trip booking. That is constraint may be respected by the optimization process.

There may be various optimization processes that may be suitable. Example processes include branch and bound, branch and price, genetic algorithms, ant colony optimization, and meta-heuristics, Tabu search, or the like.

By way of example, meta-heuristics may be applied as an optimization process. In an embodiment, a process may operate by performing multiple cycles of trip removals and trip insertions. Each cycle may constitute a removal of a certain number of trips from the ride-sharing itineraries and an attempt to re-insert those removed trips (and potentially other trips not originally present in the itineraries) back into the ride-sharing itineraries. Different heuristics may be used for determining which trips to remove and how to insert the trips back into the ride-sharing itineraries. The specific number of trips to remove may be predetermined or determined dynamically for each cycle.

In an embodiment, two removal heuristics may be used—worst removal and match removal, and one insertion heuristic is used—greedy insertion. The worst removal heuristic may attempt to remove the trips that cause the largest improvement in the objective value. Example steps include: Add any booked trips that currently do not have an itinerary to the list of removed trips; remove one trip from the set of ride-sharing itineraries and record the improvement in objective value; iterate for each trip in the set of ride-sharing itineraries; note the trip that produced the largest improvement in objective value, remove that trip and put the trip into the removed trips list; if the number of trips in the removed trips list has reached a desired number of removed trips then stop, otherwise loop back and remove the next trip.

A match removal heuristic may attempt to remove trips that most closely "match" a "seed trip". If there is a recently booked trip that may need to be assigned to an itinerary then the booked trip request can be used as the seed trip. In an embodiment, alternatively, a random trip can be removed from the ride-sharing itineraries and that random trip can be considered as the seed trip. The match score calculation between two trips may receive as inputs various information, such as pick-up time (or travel window), pick-up location, drop-off time (or travel window) and/or drop-off location and the match score calculate may then calculate a closeness value.

Example steps included in a match removal heuristic may include: add any booked trips that currently do not have an ride-sharing itinerary to the list of removed trips; in the absence of any booked trips, remove a random trip from the ride-sharing itineraries and add it to the list of removed trips; calculate a "match" score for every trip left in the ride-sharing itineraries to the group of trips in the list of removed trips; remove the trip with the closest match score and put it into the removed trips list; update the route/schedule for the itinerary from which the trip was removed; and if the number of trips in the removed trips list has reached our desired number then stop, otherwise repeat the removal process in order to remove the next trip.

In an embodiment, the insertion heuristics may, for each trip from the removed trips list attempt various possible pick-up and drop-off combinations. The feasibility, as well as changes in the overall objective value score may be recorded, and the trip with the best (lowest in the case of vehicle operating cost) change in the objective value score may be inserted in the specific locations and specific ride-sharing itinerary that produces the best objective value change. The insertion may be repeated for each trip in the removed trips list until all trips have been inserted into a ride-sharing itinerary or, in an embodiment, a maximum number attempts have been attempted.

The insertion heuristics may be configured to ensure that the trips' or vehicles' constraints are not violated when inserting trips into ride-sharing itineraries.

Examples of passenger's constraints (or requirements) include maximum travel time, pick-up time window, drop-off time window, travel window, pick-up location, drop-off location, and relative delay tolerance. Examples of vehicles constraints include maximum seat capacity, maximum time in operation, minimum time in operation, requirement to return to its home base etc.

At 704, pre-travel optimizer module 212 may be configured to be provided the most current set of vehicle ride-sharing itineraries, a number of cycles to attempt (100 cycles in this example), a current objective value (total vehicle operating cost in this example) for the ride-sharing itineraries (e.g., $1200), and/or any newly booked trips that need to be inserted into a ride-sharing itinerary. Any new vehicles (virtual or physical) assigned to the vehicle supply can be added as an empty/blank itinerary to the set of vehicle ride-sharing itineraries. In an embodiment, the maximum number of trips to be placed in the removed trips list may also be provided. In an embodiment, 30% of all trips in the given ride-sharing itineraries may be the maximum number of trips to be placed in the removed trips list.

At 708, pre-travel optimizer module 212 may be configured to select a trip removal heuristic (e.g., worst removal or match removal or random removal) to apply for the cycle. The choice of the specific heuristic to use for each cycle may be determined dynamically, or randomly. The trip removal heuristic may be applied, placing removed trips in the removed trips list.

At 712, pre-travel optimizer module 212 may be configured to choose a trip insertion heuristic (e.g., a greedy insertion) and may attempt to insert all trips in the removed trips list using the insertion heuristic.

At 714, pre-travel optimizer module 212 may be configured to evaluate whether all trips from the removed trips list were successfully inserted back into the ride-sharing itineraries. If one or more trips were not inserted successfully then the pre-travel optimizer module 212 may be configured to re-instate the previous state of ride-sharing itineraries and at 732, determine if another cycle can be run.

For example, if 50 cycles have been attempted and the maximum number of cycles is 100, then pre-travel optimizer module 212 may be configured to provide an affirmative response in relation to 732, and then returns to 708 in order to attempt another cycle.

Attempting multiple cycles may be advantageous as it may be possible for an insertion to fail during one cycle and succeed during a subsequent cycle.

At 714, if all the trips were successfully inserted back into the ride-sharing itineraries, then at 720 the objective value may be calculated (e.g., total vehicle operating costs). At 724, pre-travel optimizer module 212 may be configured to determine if the new objective value may be better than the objective value from the last complete and best ride-sharing itineraries set. If it is not better, pre-travel optimizer module 212 may return to 716. If the new objective value is better from the previous one, then pre-travel optimizer module 212 may move on to 728.

At 728, pre-travel optimizer module 212 may have determined a set of ride-sharing itineraries that have a better objective value (e.g., lower Combined Objective Value as defined above) than the previous set of ride-sharing itineraries. The "current best" or "master" set of ride-sharing itineraries may be updated with the newly created set of ride-sharing itineraries.

At 732, pre-travel optimizer module 212 may be configured to determine whether if it can perform any more removal/insertion cycles (for example, if there are cycles remaining). If it can, then it returns to 708 in order to attempt a cycle on this new master set of ride-sharing itineraries.

Alternatively, if there are no more cycles remaining, pre-travel optimizer module 212 may progress to 736 where the pre-travel optimizer module 212 transmits the results and master ride-sharing itineraries to the itineraries manager module 202.

There may be variations of the steps described in FIGS. 7A and 7B.

In an embodiment, 724 may include a dynamic component, whereby even if a new itinerary set has a worse objective value than the previous best set, the pre-travel optimizer module 212 may be configured to store the results as an intermediate ride-sharing itineraries set and move to 728. In doing so, pre-travel optimizer module 212 accepts a worse set of ride-sharing itineraries. The criteria for accepting the worse set of ride-sharing itineraries may, for example, be dynamic by using simulated annealing.

By making 724 more dynamic (by using simulated annealing for example), the method can explore more vehicle itinerary states and can avoid getting stuck in a "local minima".

In an embodiment, the optimization process may be designed to first optimize the ride-sharing itineraries so as to optimize a first variable, such as total passengers served or total vehicle operating cost, while ensuring that a second variable is within a threshold (e.g., the average relative delay is within 0.5). After the first stage of optimization, a second stage of optimization is run where the process tries to minimize the second variable (e.g., relative delay) while ensuring that the first variable (e.g., total vehicle operating cost) remains equal to or below the previously optimized value. A multi-stage optimization process may produce better results than a single stage optimization process.

In one embodiment of the invention, the optimization process maintains a list of itinerary "states" that have already been visited. Cycling through the same states (state loop) can be a problem and the process can prevent this by ensuring that previously visited states are not used to begin a new cycle from. A hash function and hash table can be utilized to maintain the list of previously visited ride-sharing itineraries states and by avoiding returning back to a previously visited ride-sharing itineraries state, the process can explore new itinerary configurations and discover potentially better objective value ride-sharing itineraries.

Figures 8A, 8B:
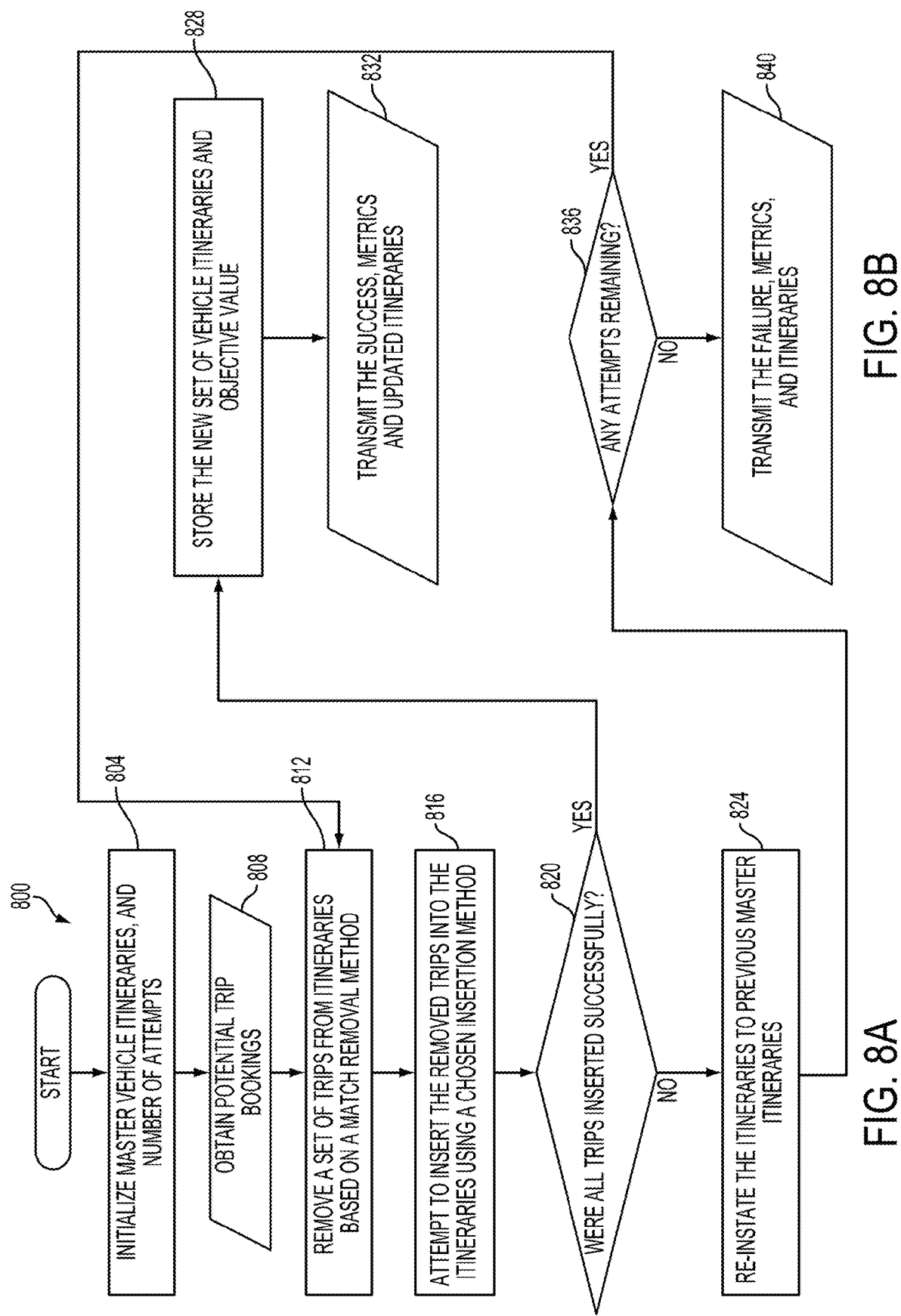
FIGS. 8A and 8B is a flowchart illustrating an example method that may be performed by the trip insertion optimizer module of FIG. 2, according to an embodiment.

FIGS. 8A and 8B is a flowchart illustrating an example method that may be performed by trip insertion optimizer module 210, exemplary of an embodiment. Other, different, additional, fewer steps may be performed in other embodiments. Further, some steps may be combined.

Trip insertion optimizer module 210 may be configured to receive a given set of existing ride-sharing itineraries, and a desired set of trips (potentially to be booked) that may be assigned to ride-sharing itineraries. Trip insertion optimizer module 210 may then be configured to perform a preliminary determination as to whether the desired trips can be assigned to (inserted into) the existing vehicle ride-sharing itineraries.

For example, trip insertion optimizer module 210 may be configured to perform only a subset of the optimization activities conducted by pre-travel optimizer module 212. The success or failure of the insertion attempt may be communicated to various other modules, such as capacity calculator module 206.

Trip insertion optimizer module 210 may require a relatively faster response time than pre-travel optimizer module 212 as it may be utilized in situations that may be time-sensitive and/or time constrained. For example, trip insertion optimizer module 210 may be invoked by the dynamic pricing manager module 208 in response to a booking inquiry by a passenger.

Trip insertion optimizer module 210 may be required to return results responsively to the dynamic pricing manager module 208 and to the potential passenger making the booking enquiry. In an embodiment, there is a trade-off between the depth of analysis, and in response times. These trade-offs may, for example, be manifested in potentially reduced cycles and reduced application of heuristics. For example, in an embodiment, an insertion heuristic may be attempted without performing a removal heuristic so as to achieve faster response times.

In an embodiment, a match removal may be utilized as the removal heuristic. In an embodiment, the insertion heuristic may be dynamically chosen between a greedy insertion and regret insertion.

At 804, trip insertion optimizer module 210 may be provided and/or initializes the most current set (or subset) of vehicle ride-sharing itineraries, a number of cycles to attempt (5 cycles in this example) and the current objective value (e.g., vehicle kilometers) for the ride-sharing itineraries (e.g., 300 km). The maximum number of trips to be placed in the removed trips list may also be provided/initialized. For example, the maximum number of trips may be chosen to be 30% of all trips in the given ride-sharing itineraries.

At 808, any new trips that may need to be inserted into an itinerary may be obtained (for example, from the capacity calculator module 206). These new trips (one or more) can be termed the "seed trip(s)".

At 812, a match removal heuristic may be utilized to remove trips from the ride-sharing itineraries that are similar to the seed trip(s).

At 816, trip insertion optimizer module 210 may attempt to insert trips from the removed trips list into the ride-sharing itineraries using a dynamically chosen insertion heuristic (e.g., a greedy insertion or a regret insertion).

At 820, trip insertion optimizer module 210 may evaluate whether all trips from the removed trips list were successfully inserted back into the ride-sharing itineraries.

If one or more trips were left behind and/or is unable to be inserted, then the trip insertion optimizer module 210 may be configured to re-instate the previous state of ride-sharing itineraries and moves on to 836, where trip insertion optimizer module 210 determines if another cycle can be run. If another cycle may be run, the trip insertion optimizer module 210 may return to 812 in order to attempt another cycle.

It may be possible for the insertions to fail during one cycle and succeed during another cycle, and there may be benefits to attempting multiple cycles. In some embodiments, if no more cycles remain then no further attempts will be made and the failure of the method to insert all the trips into the ride-sharing itineraries is recorded. At 840, the failed results may then be transmitted to the other modules. In addition to the failure, it transmits metrics such as the number of new trip requests successfully inserted, the number of trip requests that are yet to be inserted, and the objective value achieved (e.g, Combined Objective Value, Vehicle kilometers, Vehicle utilization etc.). These additional metrics may be used by the dynamic pricing manager 208.

At 820, if all the trips were successfully inserted back into the ride-sharing itineraries, the trip insertion optimizer module 210 may then at 828 record the results and at 832 transmits the successful insertion results to the other modules. In addition to the success, it transmits metrics such as the number of new trip requests successfully inserted and the objective value achieved (e.g., Combined Objective Value, Vehicle kilometers, Vehicle utilization etc.). These additional metrics may be used by the dynamic pricing manager 208.

In some embodiments, 808 may include an additional task where a subset of ride-sharing itineraries may be chosen based on the seed trip(s). For example, if the seed trip(s) are during the period of 10:00 AM-2:00 PM on Wednesday, in the city of Waterloo, then only ride-sharing itineraries that have some overlap with those parameters may be chosen and placed into a subset. This subset of ride-sharing itineraries may then be used in the rest of the method. The choosing of a subset of ride-sharing itineraries may help improve the speed of the optimization methods (e.g., removal/insertion heuristics).

FIGS. 9A and 9B is a flowchart illustrating an example method that may be performed by real-time optimizer module 214, exemplary of an embodiment. Other, different, additional, fewer steps may be performed in other embodiments. Further, some steps may be combined.

At 904, real-time optimizer module 214 may be configured to receive a given set (or sets) of vehicle ride-sharing itineraries that are currently in-transit, a number of cycles to attempt (100 cycles in this example), real-time status data (e.g. current vehicle location, newly cancelled trips etc.), and/or any currently unassigned (unscheduled or newly booked) trips that need to be assigned to itineraries. Any new vehicles (virtual or physical) assigned to the vehicle supply can be added as an empty/blank itinerary to the set of vehicle ride-sharing itineraries.

At 906, real-time optimizer module 214 locks certain legs of the itineraries as not-adjustable, performs a forward looking validation of the in-transit itineraries, removes certain trips that cannot be completed as initially scheduled, and places the removed trips into a list of unassigned trips. When a vehicle is actively performing an itinerary, many factors can make certain scheduled legs (location and time for pick-ups and drop-offs) of the itinerary non-feasible. For example, traffic conditions could render vehicle behind schedule and may not be able to make the scheduled legs on-time. As another example, a passenger no-show or last minute cancellation could make certain scheduled steps (drop-off the no-show/cancelled passenger) obsolete.

At 906, real-time optimizer module 214 starts by evaluating the current vehicle location (from the status data), the completed legs, the leg currently being performed by the vehicle, and the legs yet to be performed by the vehicle driver. For example, real-time optimizer module 214 may process the status data to classify legs, e.g., as a completed leg, a leg currently being performed, or a leg yet to be performed.

The method then locks certain legs as non-adjustable. In one embodiment, the completed legs of each itinerary, any legs that are estimated to be performed in the next 15 minutes, and any drop-off legs for passengers currently in the vehicle, are all locked as non-adjustable. The remaining legs of the itinerary are left as adjustable. In an embodiment, certain legs may be locked in advance (by the pre-travel optimizer or upon booking) as non-adjustable and this cannot be changed by the real-time optimizer.

After leg locking has been completed at 906, real-time optimizer module 214 performs a validation of the adjustable legs (not locked) of the current in-transit itineraries. Based on each vehicle's current location, and estimated transit times (based on current traffic/road conditions), the method "validates" each adjustable step of the itineraries, looking forward to ensure that the estimated times for each leg match the scheduled times for each leg. If it is determined that a certain leg cannot be completed by/before the scheduled time or if some constraints are violated (e.g., relative delay, vehicle constraint), the trip associated with that leg is removed from the itinerary and placed into a list of unassigned trips. In this manner, any trips/legs that fail the validation are removed from the itineraries, so that all remaining adjustable trips/legs in the itinerary can be serviced as per the scheduled times (pick-up window or arrive-by time). Non-adjustable legs are not removed from the itinerary.

In an embodiment, at 906 real-time optimizer module 214 leaves in place (without removing) the identified trips that cannot be completed as scheduled, and records the delays between the estimated itinerary times (based on processed status data) and the scheduled itinerary times. This delay for each trip may be referred to as a "Schedule Delay". In this manner, the Schedule Delay for each trip is stored and the sum of Schedule Delays for all trips is aggregated and stored as "Aggregate Schedule Delay". This metric of Aggregate Schedule Delay may then be utilized in the objective value in order to minimize the Aggregate Schedule Delay, as described below. Aggregate Schedule Delay may be minimized as a non-primary minimization criterion.

In an embodiment, at 906 real-time optimizer module 214 introduces "break" legs if there is significant idle time between two legs. For example, a vehicle may complete its drop-offs and may have 45 minutes of idle/excess time before its next scheduled pick-up. In this example, a series of 10 minute break legs may be inserted in order to assist with leg locking. Include such break legs may be advantageous because it "breaks-up" the idle time into smaller chunks so that some chunks can be locked and other chunks left free for the real-time optimizer module 214 to utilize for performing modifications to the itineraries.

At 908, real-time optimizer module 214 may be configured to select a trip removal heuristic (e.g., match removal) to apply for the cycle. The choice of the specific heuristic to use for each cycle may be determined dynamically, or randomly. The trip removal heuristic may be applied, placing removed trips in the unassigned trips list.

At 912, real-time optimizer module 214 may be configured to choose a trip insertion heuristic (e.g., a greedy insertion) and may attempt to insert all trips in the unassigned trips list using the insertion heuristic.

At 914, real-time optimizer module 214 may be configured to evaluate whether all trips from the unassigned trips list were successfully inserted back into the ride-sharing itineraries. If one or more trips were not inserted successfully then the real-time optimizer module 214 may be configured to re-instate the previous state of validated ride-sharing itineraries at 916, record any interim itineraries state data, and assess whether relative delay thresholds for the passengers associated with the adjustable legs/trips must be modified. In some situations (e.g. significant traffic delays, several vehicles behind schedule, vehicle failure etc.) it may be impossible to complete all the scheduled legs of the itineraries on time, thus necessitating the violation of the scheduled time windows (for pick-up or drop-offs), in order to service more passengers. At 916, if an evaluation determines that several cycles (e.g. 30 cycles) have been attempted and no state has been found with all trips inserted successfully, the real-time optimizer module 214 may modify the relative delay thresholds of the trips. In an embodiment, each adjustable trip's relative delay threshold may be increased by a certain percentage (e.g. 20%). In an alternate embodiment, each adjustable trip's relative delay threshold may be increased by a minimum travel delay amount (e.g. 10 minutes). In an embodiment, a subset of adjustable trips' relative delay threshold may be increased. In an alternate embodiment, all adjustable trips scheduled for the next few hours (e.g. 2 hours) undergo an increase in their relative delay threshold. In an embodiment, the extent to which each passenger's relative delay threshold can be increased has a maximum amount in order to maintain an adequate level of passenger satisfaction. For example, relative delay threshold cannot be increased by more the smaller 0.75 (ratio) or 30 minutes. In an embodiment, adjustable trips that cannot be completed as scheduled are left in the itineraries, and delays between the estimated itinerary times and the scheduled itinerary times are recorded as Schedule Delays and Aggregate Schedule Delay.

At 932, real-time optimizer module 214 determines if another cycle can be run. For example, if 50 cycles have been attempted and the maximum number of cycles is 100, then real-time optimizer module 214 may be configured to provide an affirmative response in relation to 932, and then returns to 908 in order to attempt another cycle.

Attempting multiple cycles may be advantageous as it may be possible for an insertion to fail during one cycle and succeed during a subsequent cycle.

At 914, if all the trips were successfully inserted back into the ride-sharing itineraries, then at 920 the objective value may be calculated (e.g., total number of passengers serviced, Aggregate Schedule Delay, etc.). At 924, real-time optimizer module 214 may be configured to determine if the new objective value may be better than the objective value from the last complete and best ride-sharing itineraries set. If it is not better, real-time optimizer module 214 may return to 916. If the new objective value is better from the previous one, then real-time optimizer module 214 may move on to 928.

At 928, real-time optimizer module 214 may have determined a set of ride-sharing itineraries that have a better objective value (e.g., Aggregate Schedule Delay) than the previous set of ride-sharing itineraries. The "current best" or "validated" set of ride-sharing itineraries may be updated with the newly created set of ride-sharing itineraries.

At 932, real-time optimizer module 214 may be configured to determine whether if it can perform any more removal/insertion cycles (for example, if there are cycles remaining). If it can, then it returns to 908 in order to attempt a cycle on this new validated set of ride-sharing itineraries.

Alternatively, if there are no more cycles remaining, real-time optimizer module 214 may progress to 936 where the real-time optimizer module 214 transmits the results and best validated ride-sharing itineraries and list of unassigned trips to the itineraries manager module 202.

There may be variations of the steps and objective value criteria described in FIGS. 9A and 9B, similar to those described in the pre-travel optimizer module 212.

As noted, capacity calculator module 206 may be configured to receive a desired trip (called "seed trip") and determine the remaining available capacity in the group of existing vehicle ride-sharing itineraries, for that trip and/or variations of that trip. The seed trip may be a trip booking request provided by the dynamic pricing module 208. The capacity calculator module 206 may be invoked by the dynamic pricing module 208 or by the vehicle supply manager module 204.

Capacity lookups may be non-trivial due to the numerous variables in the ride-sharing itineraries (time, location, route, seats available etc.). As an example, a specific vehicle with a capacity of 3 seats can have only one passenger at a given moment, but still may be unable to service an incoming ride request because servicing the ride request could result in breaking constraints, such as, pick-up/drop-off time for the existing passenger, maximum relative delay/delay for the existing passenger, maximum vehicle operating time.

Conversely, another vehicle may be highly occupied and have room for only one passenger, but still may be able to service an incoming ride request because servicing the ride request does not break any constraints for the existing passengers, operator and/or vehicle. In view of these complexities, commonly used methods in other applications may have deficiencies when determining available capacity in a dynamic transportation system.

Figure 10:
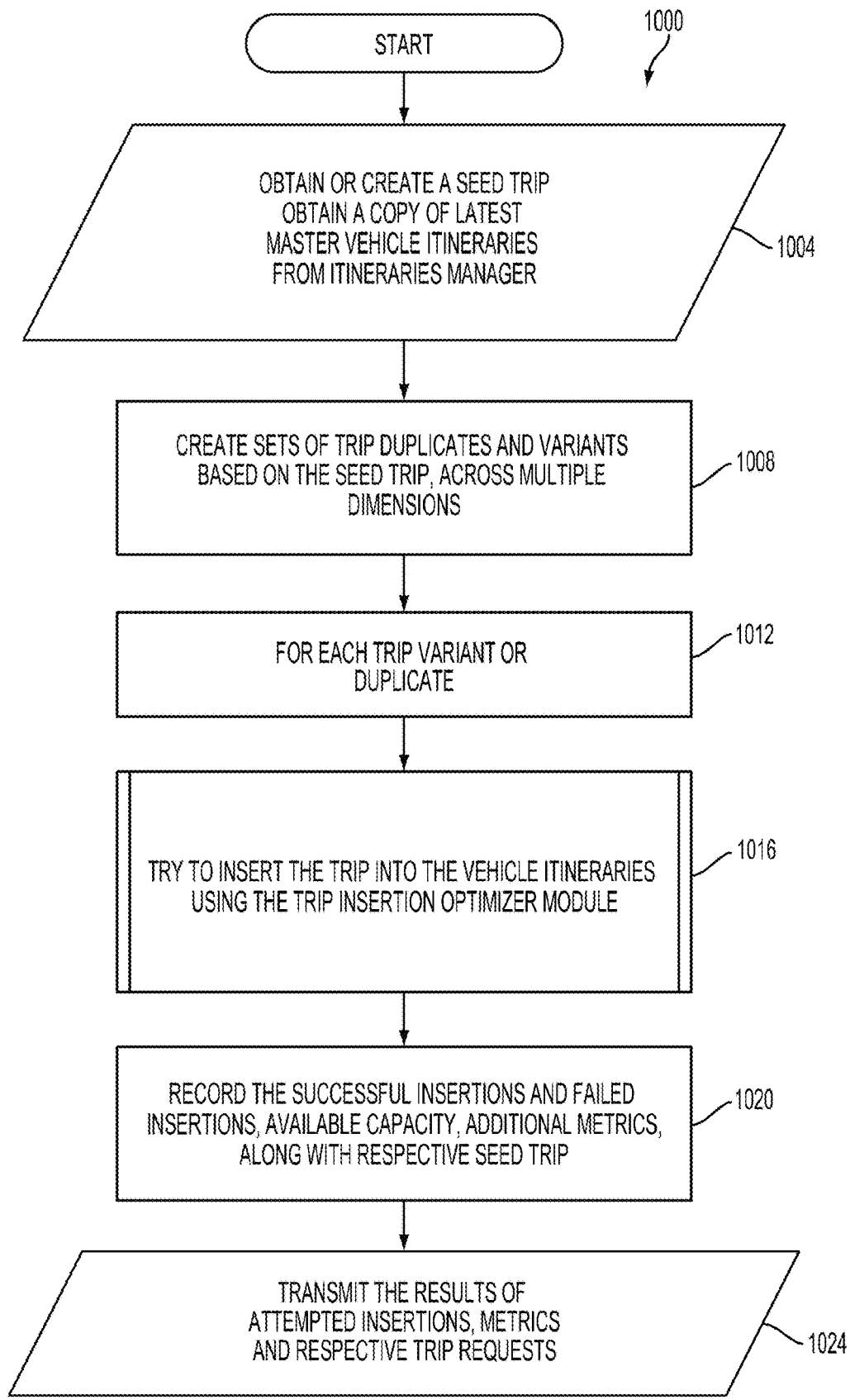
FIG. 10 is a flowchart illustrating an example method that be performed by the capacity calculator module of FIG. 2, according to an embodiment.

FIG. 10 is a flowchart illustrating an example method that may be performed by capacity calculator module 206, exemplary of an embodiment. Other, different, additional, fewer steps may be performed in other embodiments. Further, some steps may be combined.

At 1004, capacity calculator module 206 may be configured to obtain and/or receive a current copy of the latest vehicle ride-sharing itineraries (or subset thereof) from the itineraries manager module 202. It also obtains a seed trip to be used for the capacity calculation. The seed trip may be communicated from dynamic pricing module 206 (e.g., a trip request/inquiry) or from vehicle supply manager module 204. In some embodiments, in the absence of an incoming seed trip, 1004 may involve creating a seed trip either randomly, or by picking a seed trip from historical data of booking/trip requests.

At 1008, the seed trip may be used to create alternate versions across multiple dimensions, with some including duplicates.

In some embodiments, duplicates and variations may be created along the dimensions of pick-up time, drop-off time, travel time window, origin location, destination location, trip duration and quantity of duplicates. In some embodiments, there may be relative-delay shifting, wherein various relative delays may be used as variants (e.g., for a 45-minute direct trip, the standard relative delay may be 15 minutes, and variants may be generated having 20 minutes, 30 minutes). The generation and/or processing of duplicates and variants may be performed using various parallel processing techniques, which may help improve computational efficiency.

For example, there may be a seed trip having the following characteristics: 1 passenger. Pick-up at Point A and drop-off at Point B. Arriving by 10:00 am at Point B. Maximum trip duration of 1 hour.

For example, 1008 may generate the following sets of trip duplicates and variants based on the seed trip. Each line below represents an example individual trip set:

SEED TRIP: 1 passenger, Point A to Point B, arrive by 10:00 am, Maximum trip duration of 1 hour

DUPLICATES AND VARIANTS ARE BELOW:

1 passenger, Point A to Point B, arrive by 10:00 am, Maximum trip duration of 1 hour, 6 duplicates 1 passenger, Point A to Point B, arrive by 9:30 am, Maximum trip duration of 1 hour, 6 duplicates 1 passenger, Point A to Point B, arrive by 10:30 am, Maximum trip duration of 1 hour, 6 duplicates 1 passenger, Point A to Point B, arrive by 9:00 am, Maximum trip duration of 1 hour, 6 duplicates 1 passenger, Point A to Point B, arrive by 11:00 am, Maximum trip duration of 1 hour, 6 duplicates 1 passenger, Point A to Point B, arrive by 10:00 am, Maximum trip duration of 1 hour 15 min, 6 duplicates 1 passenger, Point A1 to Point B, arrive by 10:00 am, Maximum trip duration of 1 hour, 6 duplicates 1 passenger, Point A to Point B1, arrive by 10:00 am, Maximum trip duration of 1 hour, 6 duplicates 1 passenger, Point A1 to Point B1, arrive by 10:00 am, Maximum trip duration of 1 hour, 6 duplicates In some examples, point A1 may be a location close to Point A, namely, within a predetermined distance, e.g., 3 miles, or within a predetermined travel time (e.g., 5 minutes), and Point B1 may be a location close to Point B.

The foregoing trip sets that include duplicates variants are not meant to be limiting in any manner, and it is understood that additional variations of trip sets can be created that vary across the dimensions of time, location, number of trip duplicates and trip duration.

Referring back to 1008, after creating the trip sets, at 1012 each trip set may be treated as a separate group of trips and in subsequent steps will be tested for feasible insertion into the ride-sharing itineraries.

At 1016, an attempt for insertion of an individual trip set (for example, as illustrated by examples far above) into the vehicle ride-sharing itineraries may be caused by invoking trip insertion optimizer module 210. For example, the trip set may be communicated to the module for insertion into the ride-sharing itineraries.

If trip insertion optimizer module 210 communicates a success, the success may be noted and the number of trips in the trip set is the minimum capacity available in the system for that specific set of dimensions (e.g., pick-up location, drop-off location, arrival time, travel time). 1016 may be repeated for each trip set, on separate copies of the latest master ride-sharing itineraries, and the results (success/failure) recorded. 1016 may be performed in a parallel fashion for each trip set in order to improve processing speed and responsiveness.

At 1020 the results of the attempted insertions may be analyzed and the respective capacity and related metrics for each scenario may be recorded. For example, if the following insertions result in successes/failures as shown below:

1 passenger, Point A to Point B, arrive by 11:00 am, Maximum trip duration of 1 hour, 6 duplicates: SUCCESSFUL INSERTION OF 4 TRIPS, FAILED INSERTION OF 2 TRIPS. OBJECTIVE VALUE SCORE OF 49.5, +5.4 INCREASE IN OBJECTIVE VALUE SCORE.

The capacity and a related metric in the ride-sharing itineraries for this specific set of dimensions are 4, 49.50, and +5.4, and the result may be as follows:

Point A to Point B, arrive by 11:00 am, Maximum trip duration of 1 hour: Remaining capacity of 4. Objective value score of 49.50. +5.4 increase in objective value.

At 1024, the capacity results for the seed trip and its variations may be communicated to the other modules. As an example, if the desired trip ("seed trip") is for pick-up at Point A and drop-off at Point B, arriving by 10:00 AM at Point B, and maximum trip duration of 1 hour, then capacity calculator module 206 can, for example, return an output as follows:

Point A to Point B, arrive by 10:00 AM, duration of 1 hour: Remaining capacity of 0.

Point A to Point B, arrive by 10:20 AM, duration of 1 hour: Remaining capacity of 2. Objective value score of 52, +5.0 change in objective value.

Point A to Point B, arrive by 10:45 AM, duration of 1 hour & 10 minutes: Remaining capacity of 4. Objective value score of 62, +15.0 change in objective value.

Point A to Point B, arrive by 9:30 AM, duration of 50 minutes: Remaining capacity of 6. Objective value score of 54.50, +7.50 change in objective value.

Point A1 to Point B, arrive by 10:00 AM, duration of 1 hour: Remaining capacity of 1. Objective value score of 50, +3.0 change in objective value.

Where A1 is a location within 5 miles of A

Point A to Point B1, arrive by 10:00 AM, duration of 1 hour: Remaining capacity of 3. Objective value score of 48, +1.0 change in objective value.

Where B1 is a location within 3 miles of B

Point A2 to Point B1, arrive by 10:00 AM, duration of 1 hour: Remaining capacity of 8. Objective value score of 65.5, +18.50 change in objective value.

Where B1 is a location within 3 miles of B and A2 is within 4 miles of A

In an embodiment, the most recent results of the capacity tests may be stored in a 3-dimensional matrix for each week of the year. The first dimension may be geographic origin, the second dimension may be geographic destination, and the third dimension may be the departure (or arrival) time. Other dimensions, more dimensions, and/or fewer dimensions may be contemplated.

The geographic origin can be based on certain latitude/longitude co-ordinates or groups/circles/boundaries of co-ordinates. For example, a 5 km×5 km range for each segment along the geographic axis may be used.

The departure time may be recorded based on a 168 hour week basis (24×7). Therefore 62:15 means Wednesday 2:15 pm. A potential advantage of storing the most recent results in the form of a multi-dimensional matrix may be that subsequent capacity inquiries for the same type of trip are more easily retrieved from this look-up table instead of re-computing the information.

In an embodiment, there may be an expiry time stored with each output, after which a new capacity calculations needs to be performed again (e.g., to keep the information current).

Figures 11A, 11B:
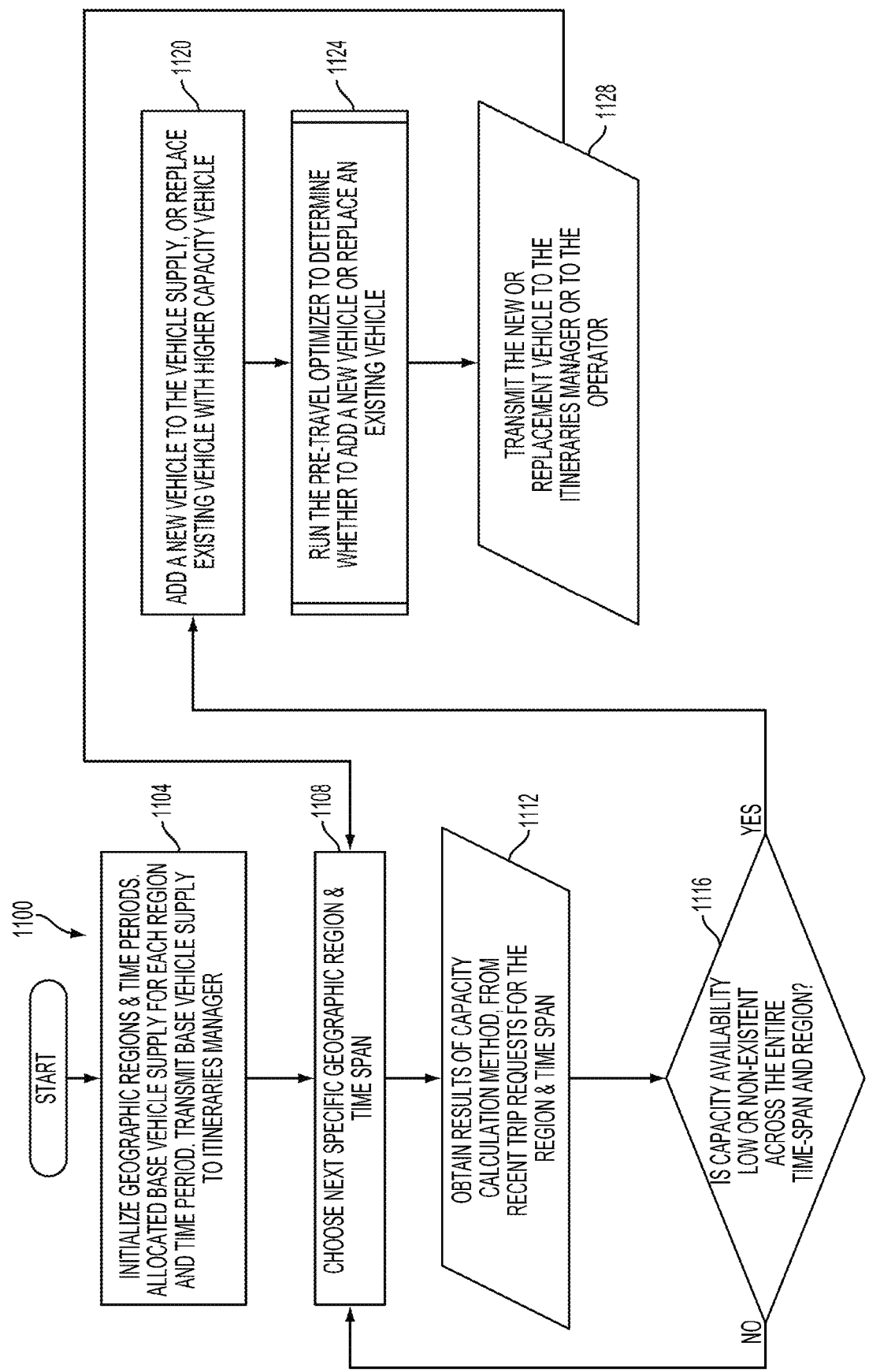
FIGS. 11A and 11B is a flowchart illustrating an example method that may be performed by the vehicle supply management module of FIG. 2, according to an embodiment.

FIGS. 11A and 11B is a flowchart illustrating an example method that may be performed by vehicle supply manager module 204, exemplary of an embodiment. Other, different, additional, fewer steps may be performed in other embodiments. Further, some steps may be combined.

Assigned and/or allocated vehicles may be virtual, and may be defined in various ways, such as based on expected availability from fleet operators. In some embodiments, the mapping of itineraries to specific vehicles and/or operators may be conducted at a time proximate to the time of travel, such as the day of travel itself or a few days beforehand.

Vehicle supply manager module 204 may be configured to determine the optimal supply (number and type) of vehicles required to service a given set of ride requests from passengers.

In an embodiment, the supply of vehicles may be virtual, and may be mapped to various types of vehicles available. In some embodiments, physical vehicles may be mapped to ride-sharing itineraries on-demand or on the day of travel. For example, allocation system 100 may be configured such that during planning, various virtual vehicles may be associated with one or more ride-sharing itineraries. Nearer to (or upon) the day of travel, one or more physical vehicles may be provisioned for carrying passengers along the one or more ride-sharing itineraries.

A potential advantage to a virtual vehicle/physical vehicle mapping (e.g., just-in-time or close to the day of travel) may be the ability to maintain flexibility in planning and a lack of need to maintain a physical inventory of vehicles available. In some further embodiments, allocation system 100 may be configured to interact with one or more external fleet management systems in communicating fleet vehicle availability, operator availability and/or vehicle condition.

Vehicle supply manager module 204 may be configured to receive vehicle supply and itinerary data from itineraries manager module 202 at various frequencies and based on various triggers (e.g., on a scheduled basis, on a regular basis, on an on-demand basis, on a push basis, on a pull basis). Vehicle supply manager module 204 may be configured to evaluate the data and available capacity on a regular basis and the calculated vehicle supply information and/or changes to supplies may be communicated to the itineraries manager module 202.

At 1104, vehicle supply manager module 204 initializes the geographic areas of service and allocates a minimum or base number of vehicles (base vehicle supply) for each region, route or route group (if they exist), and time period.

Initially, this base vehicle supply may not have any rides/trips scheduled in and will simply be empty ride-sharing itineraries. This base vehicle supply may be transmitted to the itineraries manager module 202, which may start adding trips to the ride-sharing itineraries. This base supply may be input manually by an operator or be a default setting.

At 1108, specific geographic region & time periods (e.g.: 7:00 AM-11:00 AM) may be chosen, from a list or matrix of potential regions/time periods. In some embodiments, 1108 may include a pair of geographic regions (representing origin and destination).

At 1112, the available capacity for the chosen region/time period may be obtained from the capacity calculation module. The capacity calculation module may be configured to retrieve the results for the specific region/time period from recent trip requests, or the capacity calculation module can create a "seed trip(s)" for that specific region/time period in order to determine the capacity.

In another embodiment, at 1112, the utilization level (occupancy) of the existing vehicles may be computed and used instead of data from capacity calculation module 206. For example, it may be determined that between 8:00 AM to 11:00 AM, 80% of available seats are occupied by passengers/rides, and this data may be used to approximate capacity availability.

At 1116, a check may occur to determine whether capacity availability is low/non-existent for the specific region and time period. In some embodiments, capacity availability may be considered to be low if fewer than 4 trip duplicates can be inserted into the itinerary, medium if 4-7 trip duplicates can be inserted into the itinerary, and high if 8 or more trip duplicates can be inserted. In some embodiments, these thresholds may be determined dynamically based on the volume of trip requests and booking rate. In some embodiments, capacity availability may be considered low if more than 80% of available seats in the vehicles/itineraries are occupied, medium of seat utilization is between 40% and 80%, and low if seat utilization is less than 40%. 1116 may return "YES" or "NO" depending on the available capacity.

For 1116 to return "YES", the capacity availability is low or non-existent across the entire time span. For example:

Point A to Point B, arrive by 7:00 am, duration of 1 hour:
Remaining capacity of 0.
Or, average vehicle seat utilization of 100%
Point A to Point B, arrive by 7:30 am, duration of 1 hour:
Remaining capacity of 1.
Or, average vehicle seat utilization of 81%
Point A to Point B, arrive by 8:00 am, duration of 1 hour:
Remaining capacity of 2.
Or, average vehicle seat utilization of 90%
Point A to Point B, arrive by 8:30 am, duration of 1 hour:
Remaining capacity of 1.
Or, average vehicle seat utilization of 86%
Point A to Point B, arrive by 9:00 am, duration of 1 hour:
Remaining capacity of 0.
Or, average vehicle seat utilization of 82%
Point A to Point B, arrive by 9:30 am, duration of 1 hour:
Remaining capacity of 2.
Or, average vehicle seat utilization of 84%
Point A to Point B, arrive by 10:00 am, duration of 1 hour:
Remaining capacity of 3.
Or, average vehicle seat utilization of 86%
Point A to Point B, arrive by 10:30 am, duration of 1 hour:
Remaining capacity of 0.
Or, average vehicle seat utilization of 95%
Point A to Point B, arrive by 11:00 am, duration of 1 hour:
Remaining capacity of 1.
Or, average vehicle seat utilization of 90%

As another example, capacity calculator module 206 may return a "NO" as the outcome of this step 1116, for the following capacity availability:

Point A to Point B, arrive by 7:00 am, duration of 1 hour:
Remaining capacity of 5.
Or, average vehicle seat utilization of 35%
Point A to Point B, arrive by 7:30 am, duration of 1 hour:
Remaining capacity of 6.
Or, average vehicle seat utilization of 30%
Point A to Point B, arrive by 8:00 am, duration of 1 hour:
Remaining capacity of 5.
Or, average vehicle seat utilization of 20%
Point A to Point B, arrive by 8:30 am, duration of 1 hour:
Remaining capacity of 1.
Or, average vehicle seat utilization of 80%
Point A to Point B, arrive by 9:00 am, duration of 1 hour:
Remaining capacity of 0.
Or, average vehicle seat utilization of 100%
Point A to Point B, arrive by 9:30 am, duration of 1 hour:
Remaining capacity of 1.
Or, average vehicle seat utilization of 85%
Point A to Point B, arrive by 10:00 am, duration of 1 hour:
Remaining capacity of 6.
Or, average vehicle seat utilization of 35%
Point A to Point B, arrive by 10:30 am, duration of 1 hour:
Remaining capacity of 7.
Or, average vehicle seat utilization of 15%
Point A to Point B, arrive by 11:00 am, duration of 1 hour:
Remaining capacity of 9.
Or, average vehicle seat utilization of 12%

In the examples provided, there may be a distinction between the two output scenarios presented.

In the first example output, the capacity availability is low across the entire time period, and therefore a new vehicle that is added to the set of ride-sharing itineraries will likely be well utilized throughout the period, which may result in the operating cost per passenger serviced being more economical.

In the second output example, the capacity availability is low/nonexistent only for the period of 8:30 am-9:30 am, whereas there is medium or high capacity availability between 7 am-8 am and 10 am-11 am.

In an embodiment, at 1116 vehicle supply manager module 204 may output a "YES" in the first example output, and a "NO" in the second output example.

The actual time period of evaluation (4 hours in this example) can be varied, and chosen dynamically.

In an embodiment, vehicle supply manager module 204 may be configured to determine whether there is low capacity availability across the entire chosen time period, as opposed to just a portion of the chosen time period.

In an embodiment, in addition to a determination of low capacity availability across an entire time span, a capacity evaluation may be conducted across nearby regions. For example, A1 and B1 may be locations close (e.g., within 5 kilometers) to the Points A & B respectively in the example provided above. Capacity calculator module 206 may be configured to determine capacity for trips from the nearby locations as well. In an embodiment, vehicle supply manager module 204 may be configured to evaluate whether there is low/nonexistent capacity availability across the entire time span, and also across nearby regions/locations.

It may be desirable to add new vehicle(s) to the vehicle supply if the new vehicle(s) can be utilized over its entire period of service (e.g., 3 hours). Some vehicle providers and/or operators may require a minimum period of operation in order to provide service, and this minimum period usually ranges from 1 hour to 8 hours.

Therefore, if the newly added vehicle (to the supply) cannot be well utilized across its period of service, the cost of operation may be high and consequently the cost to the passengers using the vehicle for the brief period may also be high. In order to balance the requirement of cost efficiency and capacity availability, 1116 may include performing a capacity availability determination across a time-period and/or region(s).

If the outcome of 1116 is "NO", the next step is 1008 where it evaluates the next region and/or time span.

If the outcome of step 1116 is "YES", a new vehicle is added, if available, to the vehicle supply or an existing vehicle (e.g., a 3 passenger sedan) is replaced with higher capacity vehicle (e.g., an 8 passenger van).

At 1120, two scenarios are tested (subject to vehicle availability) to determine which one results in a better objective value. In the first scenario, a new vehicle is added to the vehicle supply and at 1124 the pre-travel optimizer module 212 is invoked and new objective value computed. In the second scenario, an existing vehicle is swapped out with a higher capacity vehicle and at 1124 the pre-travel optimizer module 212 is invoked and objective value computed. The scenario that produced a successful outcome and superior objective value score is chosen. The actual availability of new vehicles (type and number) at the desired location/region and time-span may also influence the outcome of this step.

At 1128, information regarding the new or replacement vehicle may be communicated to the itineraries manager module 202 to perform vehicle route/schedule optimization activities or the operator to assist with his/her decision making. Following 1128, the next step may be to return to 1108 for the next region/time span.

In an embodiment, multiple threads may be configured to operate in parallel, in to evaluate various geographic regions, or geographic region pairs, and/or time-spans.

In an embodiment, instead of choosing a time span in a pre-determined fashion, 1108 and 1112 may involve the use of clustering algorithm(s) to dynamically determine the time-span where there is low or nonexistent capacity availability. There may be various clustering algorithms that may be suitable to be applied to dynamically segment the time periods into periods of high availability, medium availability, and low/non availability. The clustering algorithms can be applied across both geographic regions as well as time-spans (multi-dimensional clustering) to determine segments (involving geography & time) of high availability, medium availability, and low/non availability.

In an embodiment, additional steps may be included where vehicle supply manager module 204 may broadcast (for example, through a website or to a smart device) the desired (new) vehicle type/location/time-span to one or more vehicle operators along with a specific maximum response time period. A vehicle provider(s) that may be interested in offering the vehicle may need to confirm their interest/availability within the specified response time.

For example, if the vehicle supply module determines that it requires 2 vans, for 4 hours, starting 9:00 AM, at point A, then the information may be transmitted to two preferred vehicle providers via an interface, such as a website. They may be given a time period (e.g., 1 hour) to respond and confirm that they can provide the vehicles. If no one responds within the 1 hour, then the request may be transmitted to an additional three vehicle providers. The first provider to respond and confirm may be assigned that allotment.

Vehicle supply manager module 204 may have various modes of operation, for example, planning and real-time. The "planning mode" may be active when scheduling vehicles/ride-sharing itineraries for the future (usually days in the future), while the "real-time" mode may be active when ride-sharing itineraries are in progress and adjustments need to be made to the vehicle supply to account for disruptions such as traffic or vehicle failure.

In an embodiment, vehicle supply manager module 204 has a manual mode of operation. In this mode, an operator may manually add vehicles to the vehicle supply, and may use capacity or utilization metrics in combination with historical data as indicators to monitor and help in the operator's decision making. The operator may utilize the output (i.e., recommended vehicle capacity) of the method described with reference to FIG. 11 in combination with other dashboards (as described in FIG. 15 below) to assist with decision making.

Figure 12:
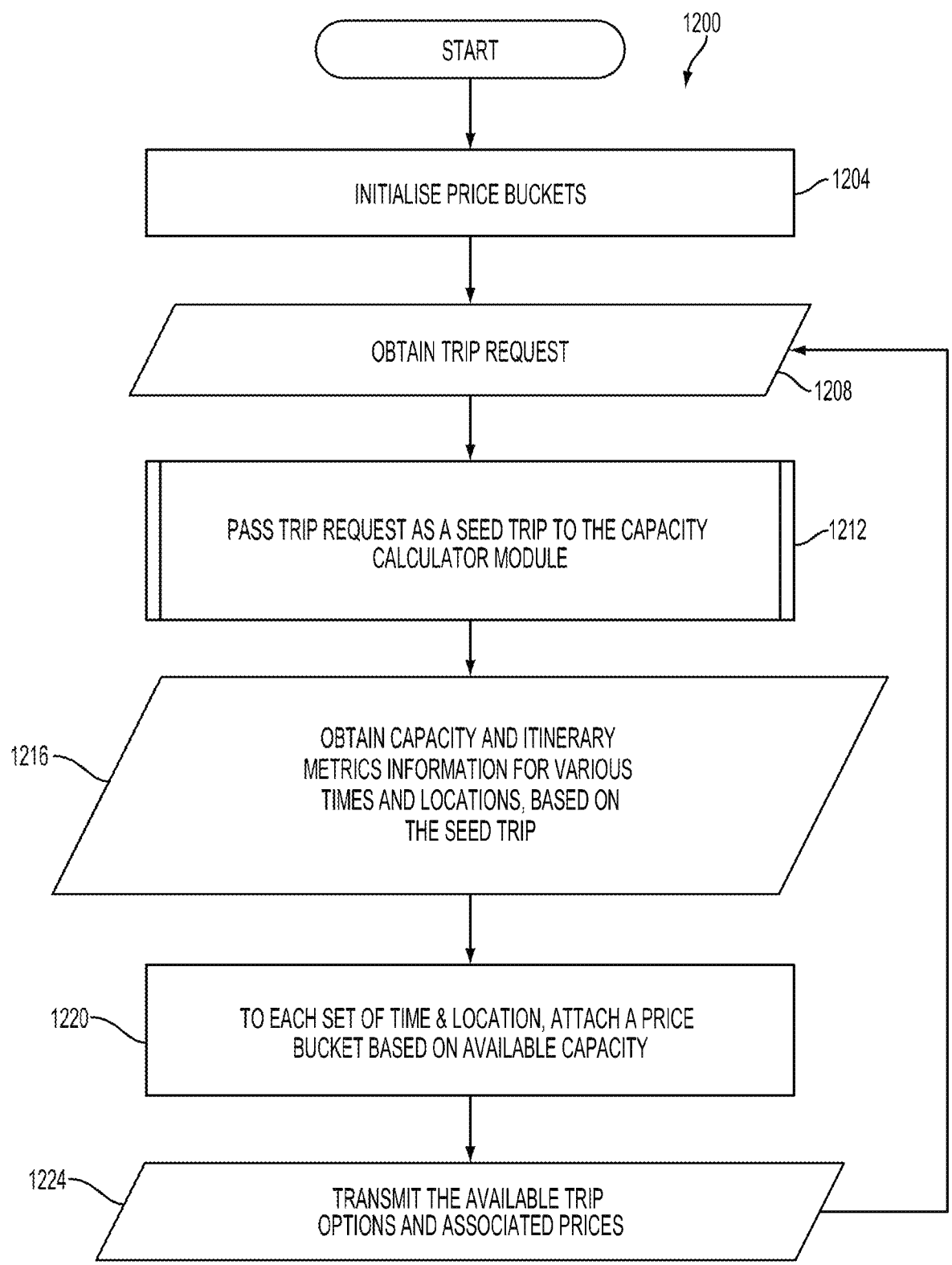
FIG. 12 is a flowchart illustrating an example method that may be performed by the dynamic pricing manager module of FIG. 2, according to an embodiment.

FIG. 12 is a flowchart illustrating a method that may be performed by dynamic pricing manager module 208, exemplary of an embodiment. Other, different, additional, less steps may be performed in other embodiments. Further, some steps may be combined.

At 1204, price buckets may be provided and/or initialized based on configured parameters and historical data.

At 1208, dynamic pricing manager module 208 may be configured to receive a trip booking request or "seed trip" from an interface, such as the passenger facing website.

At 1212, the seed trip may be passed to capacity calculator module 206, which in turn, may communicate the available capacity and additional metrics (e.g., objective value score or change in objective value score) for the various options (different times, locations and/or trip duration) based on the seed trip. The information from capacity calculator module 206 may be obtained at 1216.

At 1220, dynamic pricing manager module 208 may be configured to match the attributes of the seed trip along with the outputs of the capacity calculator module 206 to determine one or more relevant price buckets to attach to each option.

While one seed trip may be provided as the trip request, the capacity calculator module 206 may be configured to provide several trip options based on the seed trip. The trip options may include the seed trip, and also variations of the seed trip, e.g., variations by time, location, trip duration, and relative delay tolerance. Dynamic pricing module 208 may be configured to compile the available trip options and the associated price buckets.

At 1224, the available options and/or associated price buckets may be communicated to the potential passenger. The passenger may then choose to book one or more of the available trips, at his or her discretion.

Dynamic pricing module 208 may then return to 1208 to respond to the next incoming trip request.

In an embodiment, the price may be determined in part based on predetermined price buckets and partially using a dynamic pricing formula. In an embodiment, the inputs to the dynamic pricing formula may be various parameters such as, e.g., available capacity, objective value score, number of hours left to the trip, trip distance and type, pick-up location, drop off location, pick-up location type, drop off location type, etc.

A trip options frequency and efficiency channeling sub-module 220 receives as inputs (i) trip booking request (ii) the trip booking options from the capacity calculator module 206, that satisfy the trip booking request, and for each trip booking option (iii) an estimated change in objective value that would be caused by accepting a trip option into a vehicle's itinerary. From the various trip booking options, the frequency and efficiency channeling sub-module 220 analyzes the changes in objective values, and their temporal proximity to each other and to the trip booking request. The frequency and efficiency channeling sub-module 220 removes specific trip booking options that are less efficient (e.g. based on the efficiency score) and sends the retained list of trip booking options to trip options ranking sub-module 218 and/or to interface module 216. The results of said method are that an end user's choice of trip options are (i) channeled in order to improve the efficiency of a ride-share itinerary, and (ii) presented in a certain time frequency (e.g. every 15 minutes) that facilitates better planning for the end user. That is, a user is presented with trip options that include a pickup location for a first pick-up time, a second pick-up time, a third pick-up time, and so on. Each pick-up time may separated by time frequency window or range, such as 10 minutes or 30 minutes, to provide a range of pick-up time options for the user.

The objective value may include the estimated change in level of ride share or route deviation or additional vehicle distance/time travelled that would be incurred in order to incorporate the trip option into a ride-share itinerary. The objective value may include the estimated additional vehicle "in-transit" operating cost that would be incurred in order to incorporate the trip option into a ride-share itinerary. The estimated additional vehicle "in-transit" operating cost may be determined based on the incremental distance and/or time that a vehicle would have to be in transit in order to fulfill the trip option. In the examples provided below, a bigger increase in objective value indicates lower efficiency. Whereas a smaller increase in objective value indicates more efficiency.

In an exemplary embodiment, a customer provides a trip booking request at interface application to be picked up at 60 Bronte St. around 5:30 pm, and dropped-off at Union Station. The requested trip booking has a direct trip distance of 35 miles and direct trip time of 60 minutes. Allocation system 100 transmits the ride-share trip booking request to the Capacity calculator module 206, which in turn determines the following feasible trip booking options:

Trip booking request: Pickup at 60 Bronte St at 5:30 pm. Drop-off at Union Station.

Option 1: Pickup at 60 Bronte St around 5:00 pm. Drop-off at Union Station by 6:20 pm. Change in objective value +20.0

Option 2: Pickup at 60 Bronte St around 5:10 pm. Drop-off at Union Station by 6:30 pm. Change in objective value +13.0

Option 3: Pickup at 60 Bronte St around 5:20 pm. Drop-off at Union Station by 6:40 pm. Change in objective value +22.0

Option 4: Pickup at 60 Bronte St around 5:30 pm. Drop-off at Union Station by 6:50 pm. Change in objective value +21.0

Option 5: Pickup at 60 Bronte St around 5:40 pm. Drop-off at Union Station by 7:00 pm. Change in objective value +12.0

Option 6: Pickup at 60 Bronte St around 5:50 pm. Drop-off at Union Station by 7:10 pm. Change in objective value +24.0

Option 7: Pickup at 60 Bronte St around 6:00 pm. Drop-off at Union Station by 7:20 pm. Change in objective value +10.0

Presenting all of these trip options to the end user can be overwhelming. The end user may select an option that is inefficient. For example, Option 6 has the highest increase in objective value, which means that it is the least efficient one for the rideshare itinerary. In the event that a customer places a request at around 5:25 pm for an on-demand trip, Option 4 involves a pickup time within 5 minutes but it is an inefficient trip option compared to Option 5. Option 5 involves pickup up of the customer in 15 minutes, but it is more efficient as determined by the change in objective value.

It is desirable to channel users to select more efficient trip options in order to increase ride-sharing, minimize vehicle travel/time, and offer cost effective service. Furthermore, it is desirable to present the user with a fewer options organized in a frequency format that is similar to transit service. For example, a rider may wish to see a trip option every 15 minutes. This type of presentation or channeling assists the rider in planning her travel. The interface may present a visual representation of the change in objective value, in some embodiments, to facilitate selection of options.

Figure 12A:
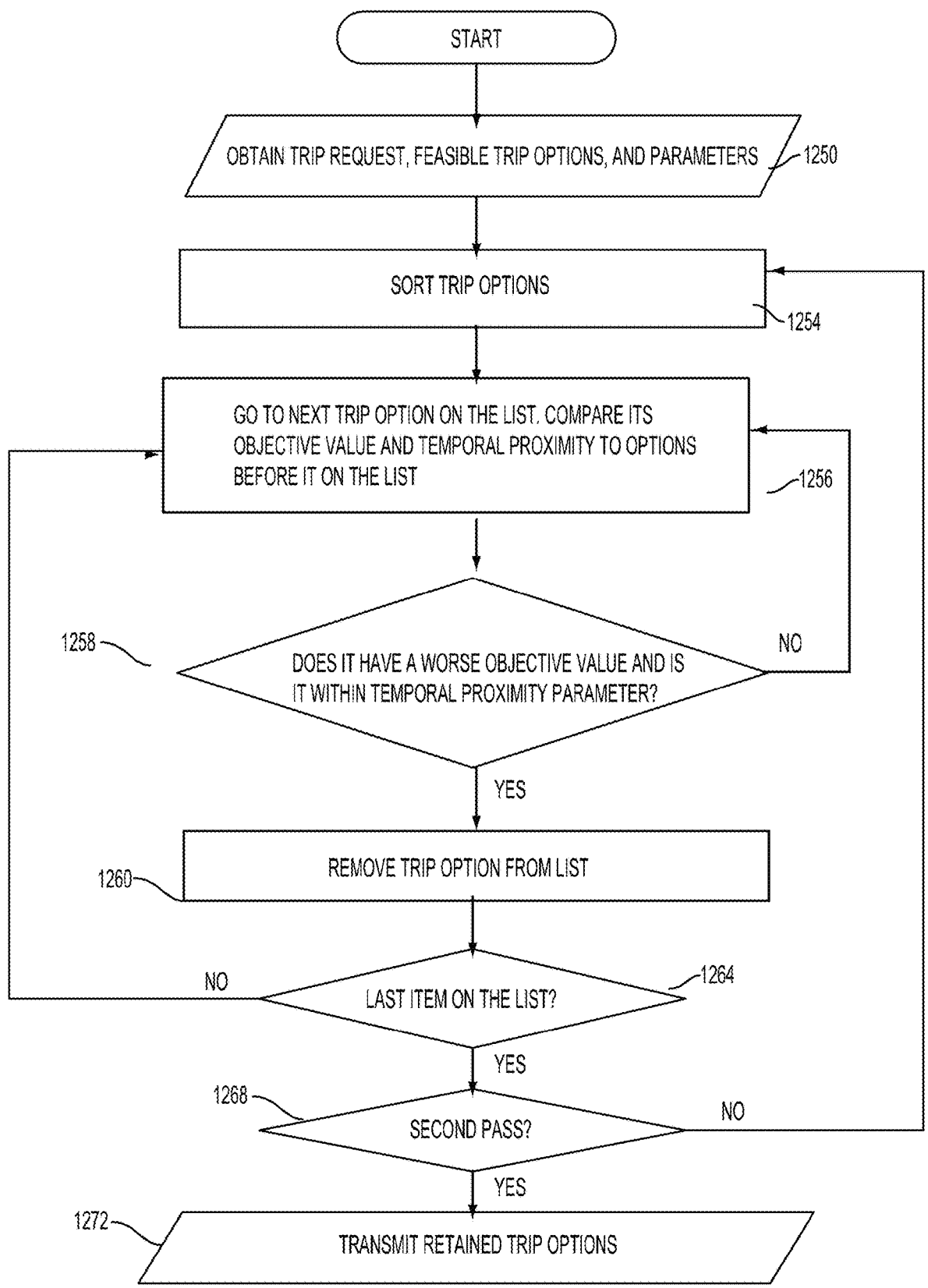
FIG. 12A is a flowchart illustrating an example method that may be performed by a processor configured for the trip options frequency and efficiency channeling sub-module, according to an embodiment.

FIG. 12A is a flowchart illustrating an example method that may be performed by trip options frequency and efficiency channeling sub-module 220, exemplary of an embodiment. This is an illustrative example and in other examples, different, additional, fewer steps may be performed in other embodiments. Further, some steps may be combined in other examples.

At 1250, trip options frequency and efficiency channeling sub-module may obtain as inputs a ride-share trip booking request, feasible trip booking options, and parameters to be used for the channeling. For example, a temporal proximity of 15 minutes and a sorting order of 'nearest to farthest' may be passed as parameters.

At 1254, the feasible trip booking options are sorted according to the sorting order parameter. In one embodiment, a 'nearest to farthest' order is first utilized. The trip option that is nearest in pickup time to the trip booking request is at the top of the list. The output of step 1254 may look like this based on the exemplary trip booking request and feasible trip options shown above.

Trip booking request: Pickup at 60 Bronte St at 5:30 pm. Drop-off at Union Station.

LIST START

Option 4: Pickup at 60 Bronte St around 5:30 pm. Drop-off at Union Station by 6:50 pm. Change in objective value +21.0

Option 3: Pickup at 60 Bronte St around 5:20 pm. Drop-off at Union Station by 6:40 pm. Change in objective value +22.0

Option 5: Pickup at 60 Bronte St around 5:40 pm. Drop-off at Union Station by 7:00 pm. Change in objective value +12.0

Option 2: Pickup at 60 Bronte St around 5:10 pm. Drop-off at Union Station by 6:30 pm. Change in objective value +13.0

Option 6: Pickup at 60 Bronte St around 5:50 pm. Drop-off at Union Station by 7:10 pm. Change in objective value +24.0

Option 1: Pickup at 60 Bronte St around 5:00 pm. Drop-off at Union Station by 6:20 pm. Change in objective value +20.0

Option 7: Pickup at 60 Bronte St around 6:00 pm. Drop-off at Union Station by 7:20 pm. Change in objective value +10.0

LIST END

From steps 1256 through 1264, the method loops, analyzing each trip option in the sorted list, starting from the first item on the list. Each trip option on the list is compared to all of the items before it on the list. Analysis is performed to determine if the trip option is to be removed from the list. In an exemplary embodiment, the trip option is compared against all trips before it that are within the temporal proximity parameter (eg: 15 minutes). The trip being analyzed is removed if it has a larger increase in objective value (ie. worse efficiency score) than a trip that is within 15 minutes and before it on the list. For example, if the method has looped once and it is analyzing Option 3 at step 1258. Option 3 is compared against Option 4 (because it is earlier in the list). Their pickup times are within 15 minutes and Option 3 has a larger increase in objective value (ie. lower efficiency) compared to Option 4. Therefore, Option 3 is removed from the list. The output of steps 1256 to 1264 may look like the following based on the above sorted list.

Trip booking request: Pickup at 60 Bronte St at 5:30 pm. Drop-off at Union Station.

LIST START

Option 4: Pickup at 60 Bronte St around 5:30 pm. Drop-off at Union Station by 6:50 pm. Change in objective value +21.0

Option 5: Pickup at 60 Bronte St around 5:40 pm. Drop-off at Union Station by 7:00 pm. Change in objective value +12.0

Option 2: Pickup at 60 Bronte St around 5:10 pm. Drop-off at Union Station by 6:30 pm. Change in objective value +13.0

Option 7: Pickup at 60 Bronte St around 6:00 pm. Drop-off at Union Station by 7:20 pm. Change in objective value +10.0

LIST END

After completing a first loop/pass through the trip options, at 1268 we check if we have completed two passes through the list. If only one pass has been completed, we return back to step 1254 for a second pass through the trip options list. In an exemplary embodiment, for the second pass the sorting order parameter is set as 'farthest to nearest'. In the second pass, with the 'farthest to nearest' sorting order, the remaining trip options list is sorted at step 1254. The output of 1254 may now look like the following:

Trip booking request: Pickup at 60 Bronte St at 5:30 pm. Drop-off at Union Station.

LIST START

Option 7: Pickup at 60 Bronte St around 6:00 pm. Drop-off at Union Station by 7:20 pm. Change in objective value +10.0

Option 2: Pickup at 60 Bronte St around 5:10 pm. Drop-off at Union Station by 6:30 pm. Change in objective value +13.0

Option 5: Pickup at 60 Bronte St around 5:40 pm. Drop-off at Union Station by 7:00 pm. Change in objective value +12.0

Option 4: Pickup at 60 Bronte St around 5:30 pm. Drop-off at Union Station by 6:50 pm. Change in objective value +21.0

LIST END

During this second pass, from steps 1256 through 1264, the method loops, analyzing each trip option in the sorted list, starting from the first item on the list. In this second pass, the output of steps 1256 to 1264 may look like the following:

Trip booking request: Pickup at 60 Bronte St at 5:30 pm. Drop-off at Union Station.

LIST START

Option 7: Pickup at 60 Bronte St around 6:00 pm. Drop-off at Union Station by 7:20 pm. Change in objective value +10.0

Option 2: Pickup at 60 Bronte St around 5:10 pm. Drop-off at Union Station by 6:30 pm. Change in objective value +13.0

Option 5: Pickup at 60 Bronte St around 5:40 pm. Drop-off at Union Station by 7:00 pm. Change in objective value +12.0

LIST END

At step 1268, the step determines that a second pass has been completed. The retained trip options are transmitted to trip options ranking sub-module 218 and/or to interface module 216. In the example, the retained trip options are more efficient for the ride-share itinerary, and they present fewer trip options organized at a frequency of approximately 20 minutes. The results of said method are that an end user's choice of trip options are (i) channeled in order to improve the efficiency of a ride-share itinerary, and (ii) presented in a certain time frequency (eg: approximately every 20 minutes) that facilitates better planning for the end user.

In an example, where a customer places a trip request on-demand, at 5:25 pm. The method may include an additional final step of retaining only one option that is closest to the trip request time. Going through the method with this additional final step may produce the following trip option, as an efficient ride-share trip that is 'nearly' on-demand:

Trip booking request: Pickup at 60 Bronte St at 5:30 pm. Drop-off at Union Station.

LIST START

Option 5: Pickup at 60 Bronte St around 5:40 pm. Drop-off at Union Station by 7:00 pm. Change in objective value +12.0

LIST END

In a situation where a customer places a trip request on-demand, and feasible trip booking options have similar objective values, an additional step may be performed that involves removing options that are immediately available in order to increase the probability of sharing a ride or being allocated to a more efficient itinerary. For example, if Capacity calculator module 206 determines the following feasible trip booking options to an on-demand trip request that is made at 5:25 pm:

Trip booking request: Pickup at 60 Bronte St at 5:25 pm. Drop-off at Union Station.

Option 1: Pickup at 60 Bronte St around 5:25 pm. Drop-off at Union Station by 6:20 pm. Change in objective value +20.0

Option 2: Pickup at 60 Bronte St around 5:30 pm. Drop-off at Union Station by 6:20 pm. Change in objective value +20.0

Option 3: Pickup at 60 Bronte St around 5:35 pm. Drop-off at Union Station by 6:20 pm. Change in objective value +20.0 trip options frequency and efficiency channeling sub-module may apply the aforementioned additional step and produce the following trip option:

Trip booking request: Pickup at 60 Bronte St at 5:25 pm. Drop-off at Union Station.

Option 3: Pickup at 60 Bronte St around 5:35 pm. Drop-off at Union Station by 6:20 pm. Change in objective value +20.0

By retaining a trip option that is at a later time and equivalent in efficiency than sooner options, it increases the probability that the efficiency of the itinerary will improve by channeling new trip requests to the booked trip request.

Figure 4B:
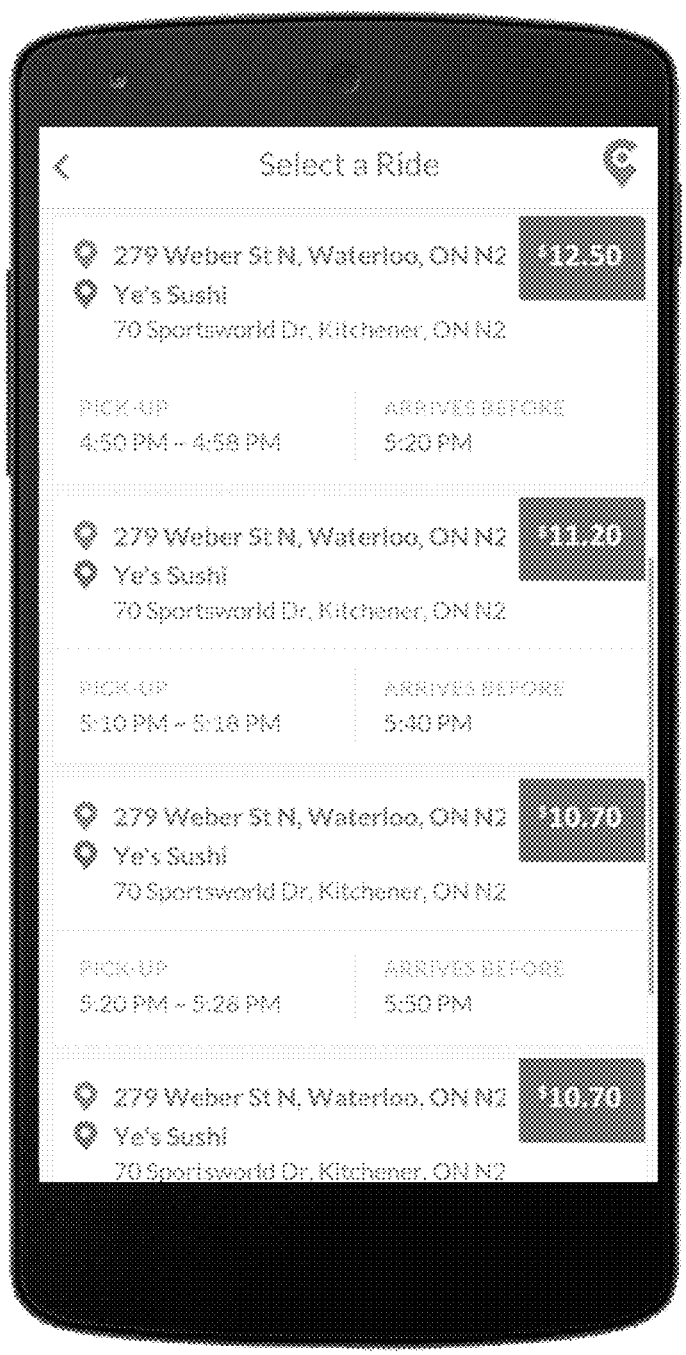
FIG. 4B is a screenshot of an example passenger facing mobile interface application screen showing a prioritized list of trip booking options, exemplary of an embodiment.

A trip options ranking sub-module 218 receives as inputs the trip booking options from the capacity calculator module 206, and the prices associated with each trip option as calculated by the dynamic pricing module 208. From the various trip booking options, it determines a priority order in which the trip booking options are to be presented to the user (as shown in FIG. 4B) via interface module 216. An interface application (in communication with interface module 216) residing on an electronic device may display trip booking options to user for selection.

Figure 13:
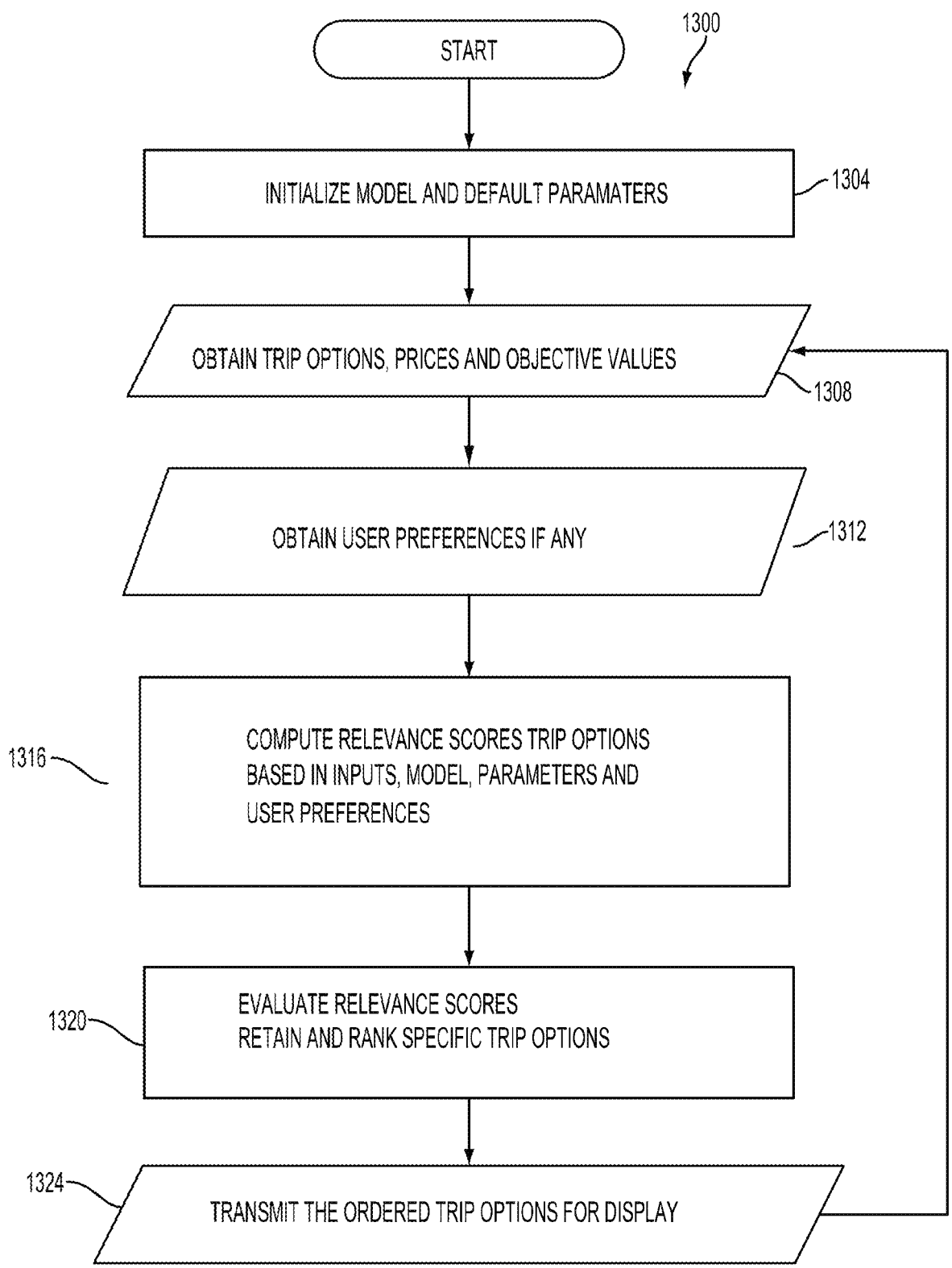
FIG. 13 is a flowchart illustrating an example method that may be performed by a processor configured for the trip options ranking sub-module, according to an embodiment.

FIG. 13 is a flowchart illustrating an example method that may be performed by trip options ranking sub-module, exemplary of an embodiment. This is an illustrative example and in other examples, different, additional, fewer steps may be performed in other embodiments. Further, some steps may be combined in other examples.

At 1304, trip options ranking sub-module 218 may initialize a model and default parameters to utilize in computing scores for and ranking trip options. For example, by default a highest weight may be given departure location, a second highest weight to price, and third highest weight to departure time. At 1306, trip options ranking sub-module 218 receives feasible trip options generated by capacity calculator module 206 and dynamic pricing module 208 in response to a passenger trip booking request. Each option may include metrics such as change in objective value, dynamically calculated trip price, change in vehicle itinerary, and change in vehicle operating cost. At 312, trip options ranking sub-module 218 receives user preferences if available. For instance, a user may have indicated via the mobile App or web interface that departure time is most important, or that price is most important. In the absence of a user indicated preference the method uses the default settings.

At 1316, trip options ranking sub-module 218 computes relevance scores are calculated for trip options. An exemplary formula for calculating relevance score for a specific trip option is presented below:

Relevance Score=0.2×(origin location closeness)+ 0.2×(destination location closeness)+0.2×(departure time closeness)+0.2×(price)+0.2×(relative delay)

where origin location closeness is a measure of the difference in distance between the origins in the user's trip booking request and the trip option (lower is better); destinations locations closeness is a measure of the difference in distance between the destinations in the user's trip booking request and the trip option (lower is better); departure time closeness is a measure of the difference in time between the pickup times in the user's trip booking request and the trip option (lower is better); price is the dynamically calculated price associated with the trip option (lower is better); relative delay is a measure of relative delay (as defined earlier) for the trip option.

In an embodiment, a measure of change in objective value is utilized in determining relevance score. In another embodiment, a measure of change in vehicle itinerary is utilized in determining relevance score. In yet another embodiment, a measure of change in at least one of vehicle operating cost, distance travelled, time travelled, is utilized in determining relevance score.

In an embodiment, multiple relevance scores are calculated for each trip option, based on different priorities. For example, a first relevance score with more importance given to departure time may be calculated for each trip option, a second relevance score with more importance given to price may be calculated, and a third relevance score with more importance given to the origin/destination locations may be calculated. These calculated relevance scores are then attached to each trip option At step 1320, each trip option's relevance score(s) are evaluated and certain trip options are retained and ordered for presentation based on relevance scores. In one embodiment, the top 3 trip options based on a measure of relevance score are ordered. In another embodiment, the three difference measures of relevance score are used and the best option according to each relevance score measure is retained and ordered. For instance, the first retained/ordered option may be the trip option that scores the best on a measure of relevance score that places the most importance on pickup time. The second retained/ordered option may be the trip option that scores the best on a measure of relevance score that places the most importance on a measure of change in objective value.

In reference to the aforementioned example with 5 trip options generated, the trip options ranking sub-module 218 may at step 1320 determine that Option 1, Option 2, and Option 3 are to be presented to the user in this specific order (as illustrated in FIG. 4B), as they present the best balance of convenience and price.

At step 1324, the retained and ordered list of trip options are transmitted to interface module 216 for display by interface application (as illustrated in FIG. 4B).

Allocation system 100 may interact with various users (e.g., passengers, drivers, vehicle providers, system administrators, etc.) by way of various web interfaces (e.g., provided by interface module 216) and mobile applications (e.g., accessible at devices 12 and devices 18). These interfaces and applications are further described below with reference to FIGS. 13 through 15.

Figure 13A:
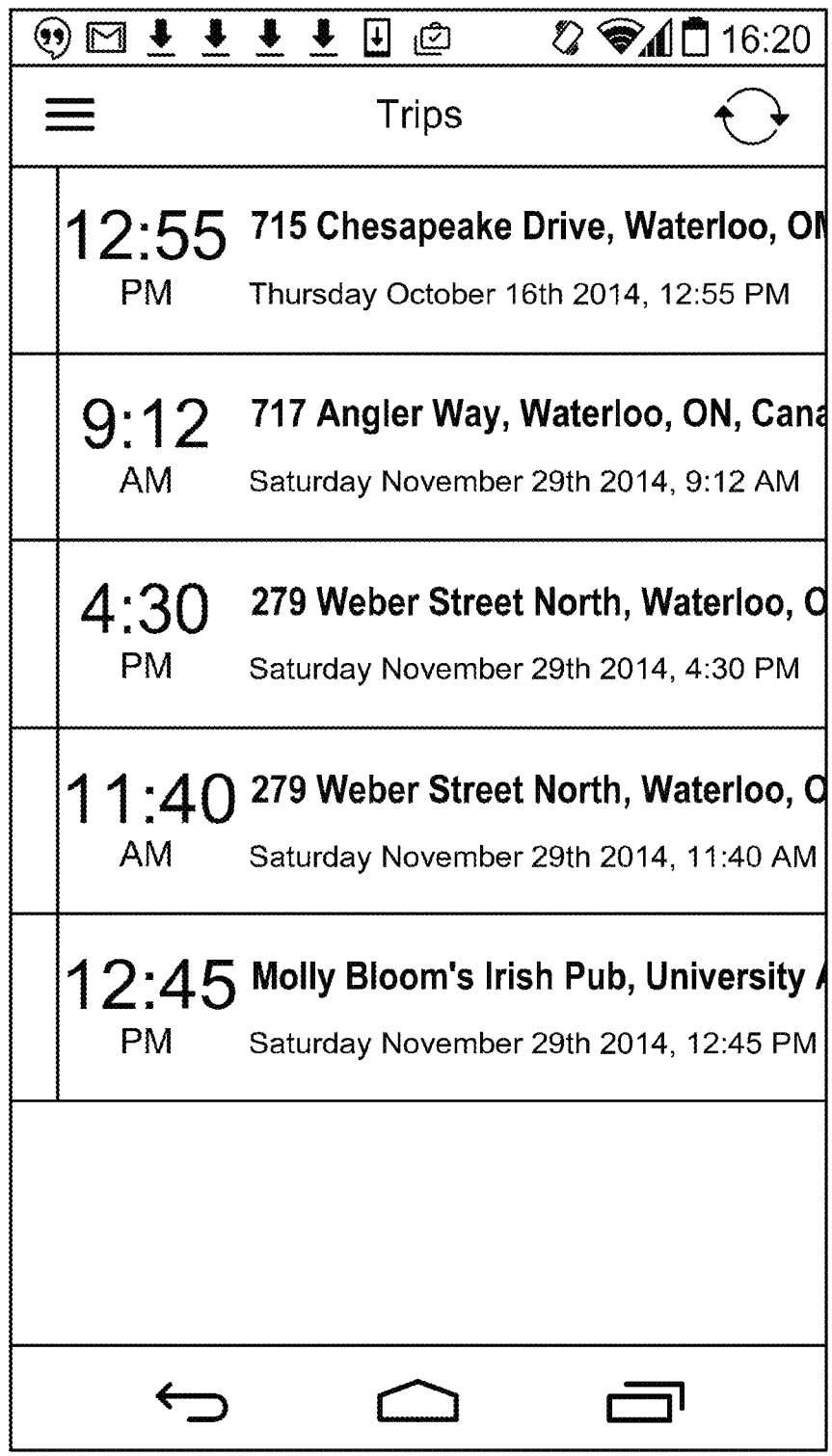
FIGS. 13A and 13B are screenshots depicting an example passenger mobile application, according to an embodiment.
Figure 13B:
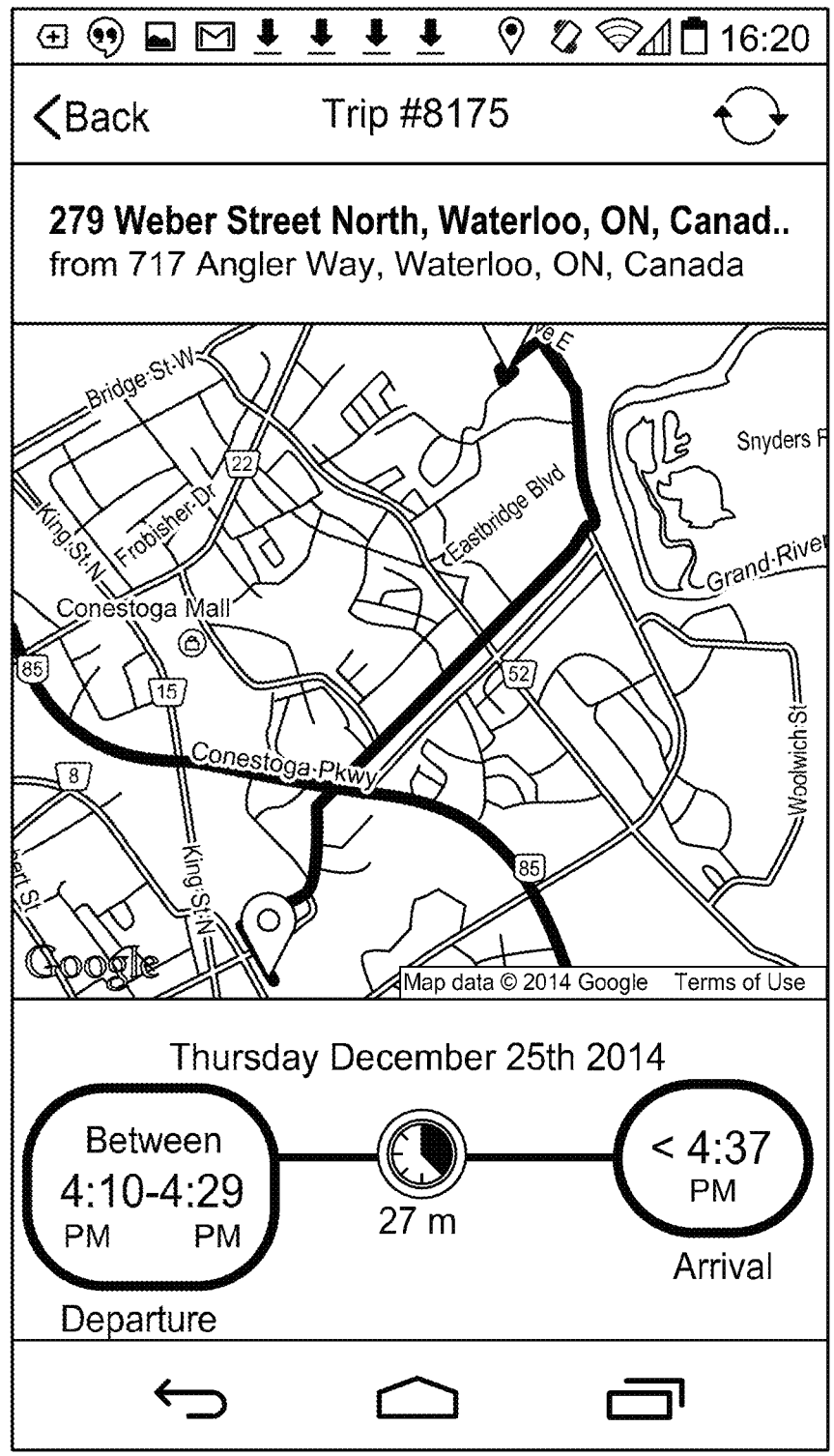

FIGS. 13A and 13B are screenshots depicting an example passenger mobile application, exemplary of an embodiment. In particular, FIG. 13A shows a screen displayed to a passenger listing a passenger's upcoming trips, including locations and travel times. FIG. 13B shows a screen displayed to a passenger depict a particular trip (e.g., the next scheduled trip). As depicted, the passenger is provided travel time information that includes a pick-up window, namely, between 4:10 pm and 4:29 pm, and a arrive-before time of 4:37 pm (corresponding to the passenger's booking request). A worst-case estimated travel time of 27 minutes is also shown. The passenger is also provided a map indicating the pick-up and drop-off locations.

In an embodiment, allocation system 100 may be configured to provide itinerary and/or routing information to a driver. The information may be provided through a smart device (e.g. smart phone or tablet computer) which may be wireless connected to the Internet. For example, the information can include the specific passenger pick-ups/drop-offs, times and locations. The information can include real-time notifications indicating whether the driver is ahead of schedule or behind schedule.

In some embodiments, as the vehicle travels along a route, alternate transit routes may be indicated in the ride-sharing itinerary so that an operator may have various options that may be used, for example, when there is an unusual event (e.g., an accident) that prevents the vehicle from taking the designated most optimal route for the ride-sharing itinerary.

In some embodiments, allocation system 100 may be configured to make various adjustments and/or updates to a vehicle's itinerary as required (e.g., in real-time. For example, a real-time itinerary change may be required if a vehicle is ahead of schedule or behind schedule. This information can be transmitted to a device that may be present in the vehicle. Other information may also be communicated, such as such as vehicle seat utilization, current location, speed, specific passengers picked up or dropped off etc. to allocation system 100.

FIGS. 14A, 14B, 14C, and 14D are screenshots depicting an example driver mobile application, exemplary of an embodiment.

Figure 14A:
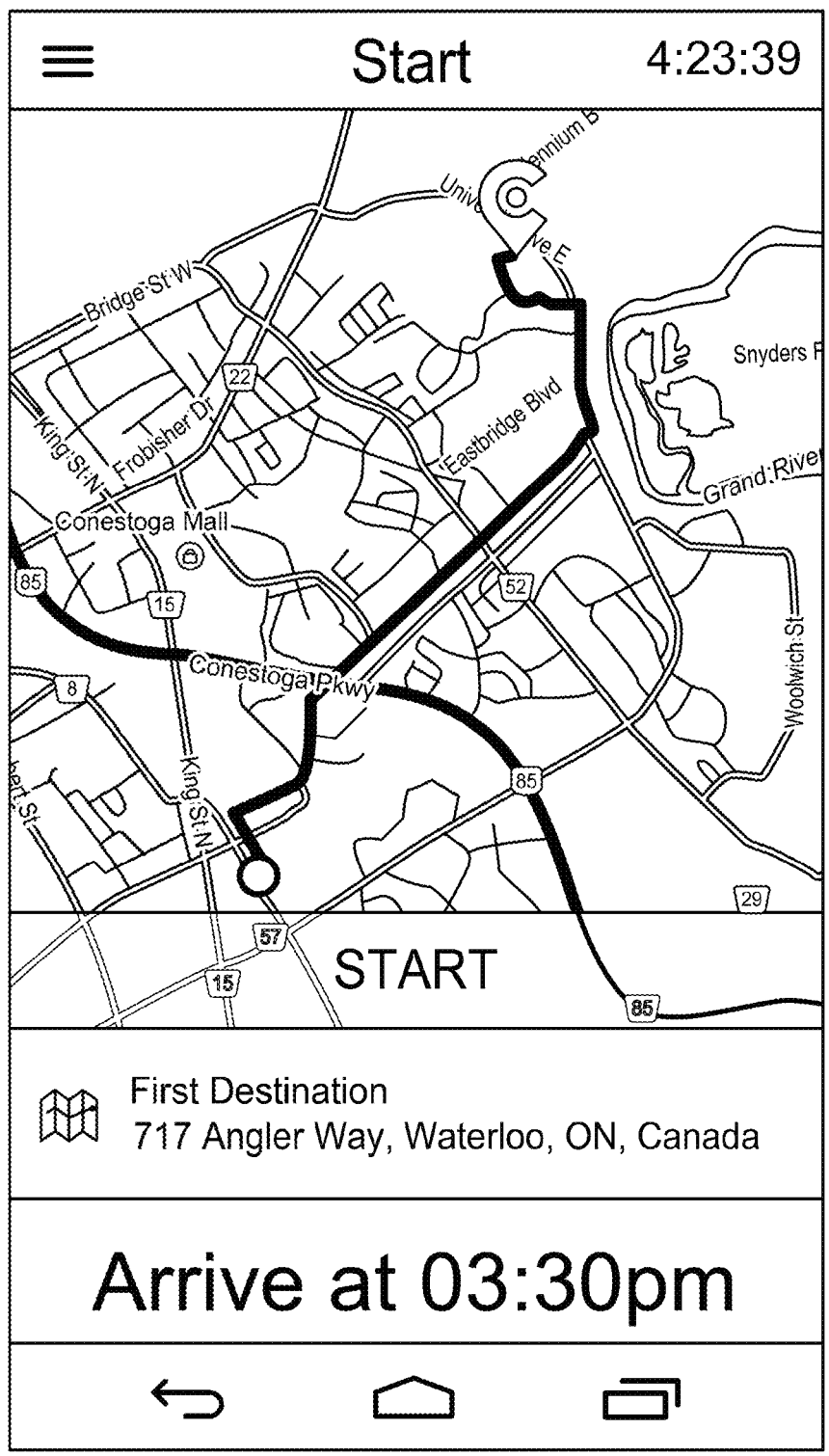
FIGS. 14A, 14B, 14C, and 14D are screenshots depicting an example driver mobile application, according to an embodiment.

FIG. 14A shows a screen displayed to a driver indicating a next location for a leg of an itinerary, and an arrive-before time for that location. As shown, a map is provided indicating a route from the driver's current location to the next location. In an embodiment, the mobile application may provide the driver with turn-by-turn driving instructions to the next location.

Figure 14B:
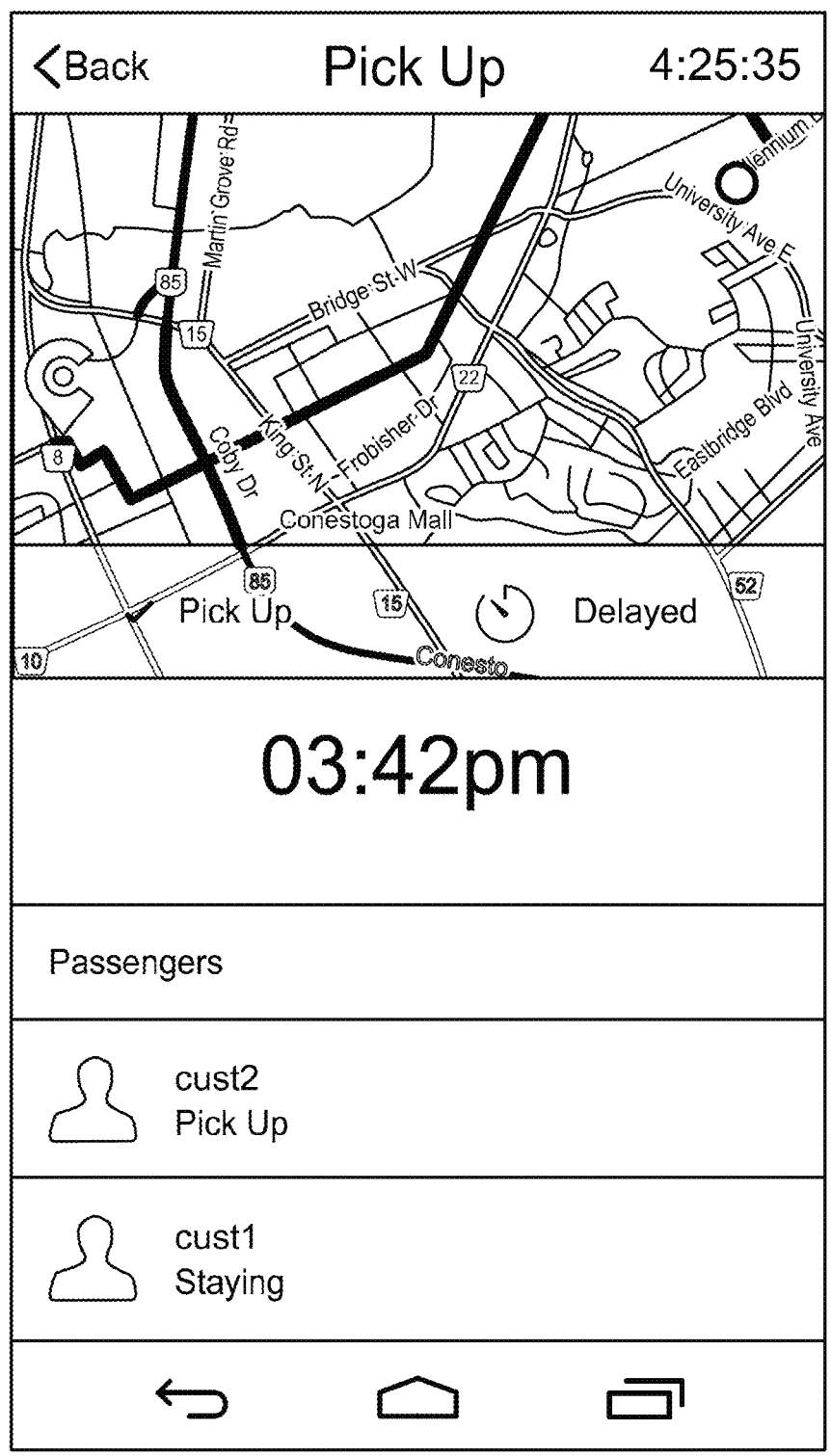

FIG. 14B shows a screen displayed to a driver indicating specific instructions relating to particular passengers to be picked up at the next location. This screen may also show passengers that are to be dropped off at that location, and passengers that will remain onboard at that location.

Figure 14C:
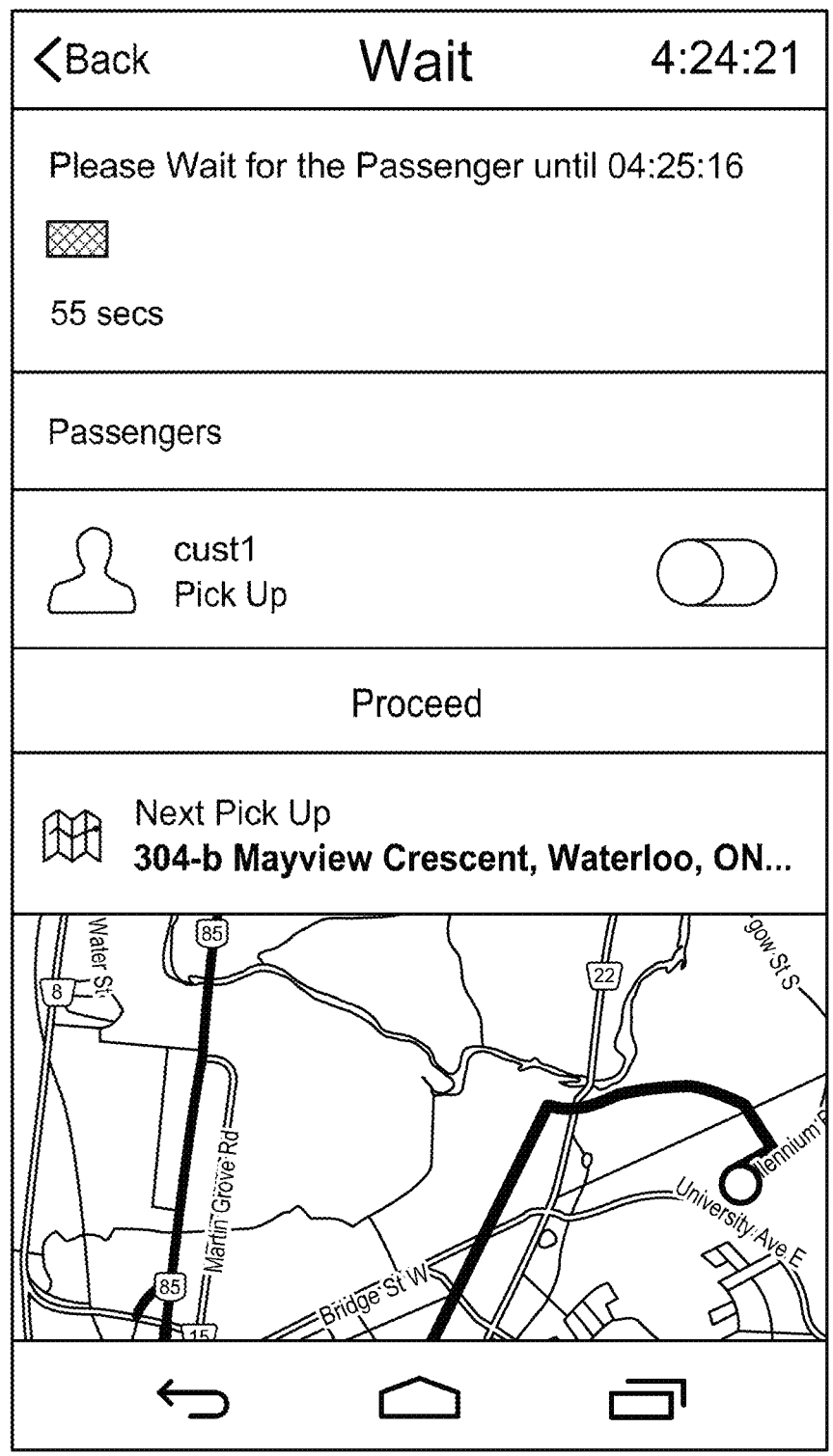

FIG. 14C shows a screen displayed to a driver which allows the driver to send a notification to allocation system 100 when a particular passenger has been picked up (e.g., by activating a button beside the name of the particular passenger. As shown, the driver is requested to wait a specific amount of time for pick-up.

The driver may activate the "Proceed" button to proceed to the next location. Upon activating this button, the driver may be provided with instructions for the next location in the itinerary. In an embodiment, the Proceed button may be greyed out until: (i) all customers have been marked as picked-up, or (ii) a timer has expired. This prevents the driver from proceeding before awaiting for the required time.

Figure 14D:
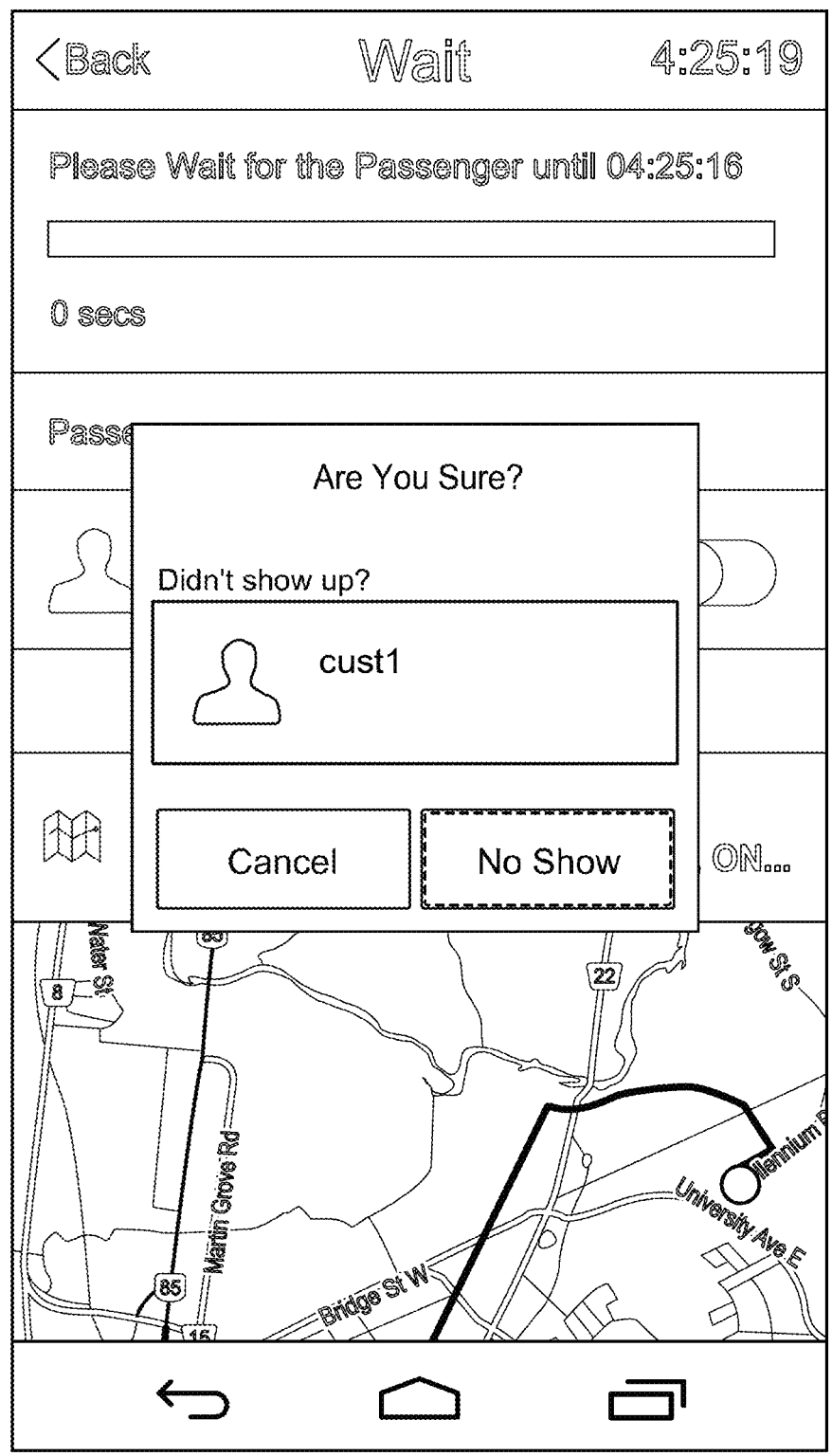

FIG. 14D shows a screen displayed to a driver when the driver activates the Proceed button after the timer has expired. The driver application may prompt the driver to confirm that particular passengers did not show up, and therefore have not been picked-up.

Allocation system 100 may dynamically re-adjust itineraries in response to information that a passenger has not been picked-up, as provided through the driver application. For example, the vehicle's itinerary may be modified to remove the drop-off location for the missing passenger. The vehicle's itinerary may also be modified to pick up another passenger in place of the missing passenger, so long as travel constraints of other passengers and travel constraints of the vehicle may be met.

Figure 15:
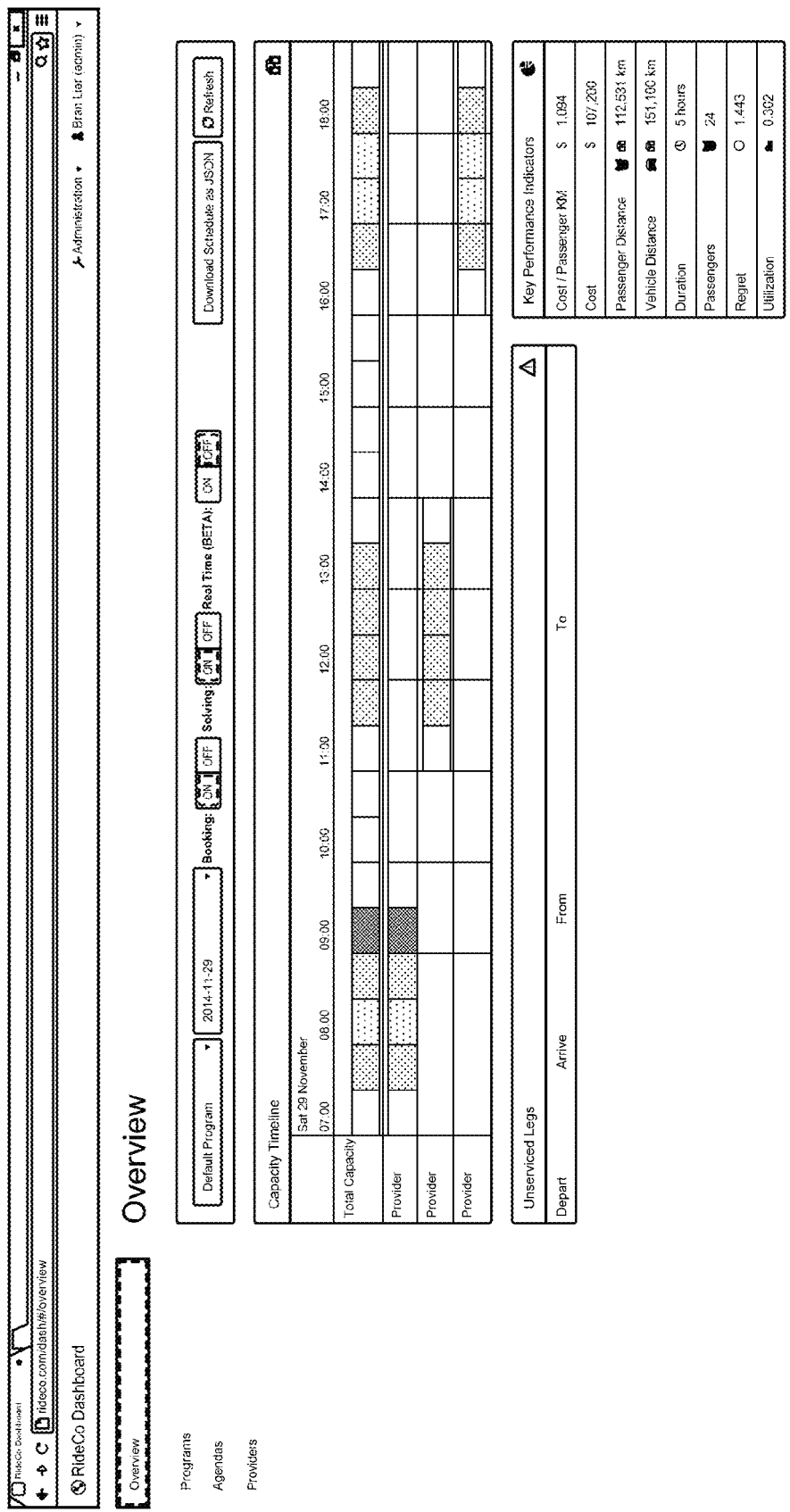
FIG. 15 is a screenshot of an example administrator web interface, according to an embodiment.

In an embodiment, allocation system 100 may be configured to provide information to system administrators by way of a web interface. Such information may include, for example, capacity information, passenger information, status information relating to optimizations, etc. FIG. 15 shows a screen displayed to an administrator that shows the seat utilization levels of virtual vehicle itineraries. In this screen, capacity and seat utilization in three itineraries is shown as well as an aggregate capacity and seat utilization, for particular time periods. As shown, the interface may present utilization in the form of a heat map, thereby allowing an administrator to quickly scan available capacity and identify particular bottlenecks.

In an embodiment, allocation system 100 may be configured to provide a marketplace for the purchase and sale of vehicle capacity. So, allocation system 100 may store records of vehicle capacity required for a plurality of trips booked by passengers. System 100 may process these records to divide the required vehicle capacity into a plurality of vehicle capacity time blocks. System 100 may then solicit bids from vehicle providers for each of these time blocks. System 100 may receive bids from the vehicle providers, each bid for providing a vehicle for at least one of the vehicle capacity time blocks. The bid includes a bid price, and may also include additional details about the vehicle (e.g., capacity, make, class, etc.) System 100 may select a winning bid for at least one of the vehicle capacity time blocks. System 100 may allocate the vehicle corresponding to the winning bid for implementing at least part of an itinerary corresponding to a vehicle capacity time block. In an embodiment, system 100 may include a settlement system for automatically providing payment to vehicle providers. In an embodiment, system 100 may act as an intermediary that settlements payment from passengers to vehicle providers.

Although embodiments have been described in the foregoing with reference to transportation of people, in other embodiments, the systems, devices, and methods described herein may also be applied to the transportation of goods. For example, itineraries for vehicles may be generated, optimized, and/or adjusted in real-time in manners disclosed herein for the delivery of goods.

Elements of the invention may also be provided as a machine-readable medium for storing the machine executable instructions. The machine-readable medium may include, but is not limited to flash drivers, CD-ROMs, ROMs, RAMs or other type of media/machine-readable medium suitable for storing electronic instructions.

For example, the present invention may be downloaded as a computer program which may be transferred from a remote computer (e.g., a server) to a requesting computer or smart phone (e.g., a client) by way of data signals embodied in a carrier wave or other propagation medium via a communication link (e.g., a network connection).

Throughout the foregoing description, for the purposes of explanation, numerous specific details were set forth in order to provide a thorough understanding of the invention. It will be apparent, however, to one skilled in the art that the invention may be practiced without some of these specific details.

In other instances, well known structures and devices are shown in block diagram form to avoid obscuring the underlying principles of these embodiments.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may [note to draftsperson: consider describing example technical effects and solutions e.g. better memory usage, improved processing, improved bandwidth usage]

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. For instance, there may be further computer system products, computer-readable media, devices, systems, methods, and/or architectures. The scope is indicated by the appended claims.

The invention claimed is:

1. A computer implemented system for optimizing electronically booked ride share trips, the system comprising:
  a data storage device storing ride sharing records with itineraries including a plurality of legs and maintaining a data structure storing additional variant trip booking options, each variant trip booking option automatically generated based on a seed trip;
  a processor configured to:
   receive a trip booking request for a passenger, the trip booking request defining passenger constraints;
   parse the trip booking request to determine the seed trip and generate the additional variant trip booking options to expand a search domain associated with the trip booking request;
   populate the data structure representing the expanded search domain with the automatically generated additional trip booking options, at least one trip booking option representing a different variant trip generated by varying at least one of pickup time, arrival time, pickup location, and drop off location based on at least one of the passenger constraints;
   segregate, the additional trip booking options of the expanded search domain into a plurality of sub-search domains for parallel processing using separate processes, threads, or cores of one or more additional processors or the processor,
   compute, using the separate processes, threads, or cores for at least two sub-search domains of the plurality of sub-search domains of the additional trip booking options to reduce an overall impact on system resources, objective values for the trip booking options, each trip booking option temporarily assigned to a vehicle to compute a corresponding objective value, the objective value being a metric output by an objective function of parameters, the parameters representing one or more of a level of ride share or efficiency, violation of passenger(s) targeted pickup time, violation of passenger(s) targeted arrive-before time, route deviation, vehicle operating cost, in-transit operating cost, vehicle itinerary and vehicle distance travelled, and time travelled;
   responsive to the objective values computed using the separate processes, threads, or cores, heuristically transform the expanded search domain to generate a constrained data set of one or more retained trip booking options by removing at least one trip booking option from the generated trip booking options; and
   transmit the one or more retained trip booking options for display on an interface application of an electronic device.

2. The system of claim 1, wherein the processor is further configured to:
  determine that the requested pickup time of the trip booking request is for the present time;
  compare objective values of at least two trip options having a pickup time within a time window of the present time;
  retain the trip option that is at a later time in order to increase the likelihood of improving the objective value through an improvement in one or more of level of ride share or efficiency, route deviation, vehicle operating cost, vehicle distance travelled, and time travelled.

3. The system of claim 1, wherein the processor is further configured to:
  compare objective values of at least two trip options that are within a time window of each other; and
  determine that one trip option's objective value is worse than another trip booking option's objective value; and
  remove the said trip option with a worse objective value.

4. The system of claim 1, wherein each trip booking option indicates a pickup time based on a time interval or time frequency, wherein the trip booking options provide different pick up times that differ based on the time interval or the time frequency, wherein the trip booking options provide the different pick up times across a time range.

5. The system of claim 4, wherein each trip booking option has a corresponding trip length duration, wherein the processor is further configured to vary the time interval or the time frequency as a factor of the trip length of duration, a shorter trip length of duration indicating a shorter time interval or time frequency, a longer trip length of duration indicating a longer time interval or time frequency.

6. The system of claim 1, wherein the processor is configured to compute and aggregate a set of metrics to compute a combined objective value.

7. The system of claim 1, wherein the level of ride share or efficiency indicates multiple unrelated passengers in the vehicle assigned to the trip booking option for at least part of the trip.

8. The system of claim 1, wherein the passenger constraints include a desired pickup time, wherein the violation of passenger(s) desired pickup time is a difference between an estimated pickup time for a given trip booking option and the desired pickup time.

9. The system of claim 1, where in the passenger constraints included desired arrive before time, wherein the violation of passenger(s) desired arrive-before time is a difference between an estimated arrival time for a given trip booking option and the desired arrive before time.

10. The system of claim 1, wherein the vehicle operating cost includes a cost of operation of one or more vehicles that are impacted by a given trip booking option, the cost of operation based on an operating fee that includes at least one of mileage and an operating time and by the one or more vehicles that are impacted by a given trip booking option.

11. The system of claim 1, wherein the in-transit operating cost includes an estimated cost for one or more vehicles that are impacted by a given trip booking option to complete pickups and drop-offs for the trip booking option and excluding any idle time of one or more vehicles that are impacted by a given trip booking option.

12. The system of claim 1, wherein the objective value is computed based on a metric of relative delay caused by ride-sharing, the relative delay being based on a travel delay that is a difference between an estimated travel time for a given trip booking option and an estimated travel time between a pick up location and a drop off location based on a more direct route.

13. The system of claim 1, wherein the processor is further configured to compute an objective value for the confirmed trip booking option based on a temporary assignment to a first vehicle, re-compute an objective value for the confirmed trip booking option based on a second vehicle; assign the second vehicle to fulfill the confirmed trip booking option based on the re-computed objective value, and trigger transmission of a notification of the confirmed trip booking option to a device linked to the second vehicle, wherein the second vehicle may be different than the first vehicle.

14. A computer implemented method for optimizing electronically booking ride share trips, the method comprising:
storing ride sharing records with itineraries including a plurality of legs on a data storage device;
maintaining a data structure storing additional variant trip booking options, each variant trip booking option automatically generated based on a seed trip;
receiving a trip booking request for a passenger at a processor;
parse the trip booking request to determine the seed trip and generate the additional variant trip booking options to expand a search domain associated with the trip booking request;
populating the data structure representing the expanded search domain with the automatically generated trip booking options, at least one trip booking option representing a different variant trip generated by varying at least one of pickup time, arrival time, pickup location, and drop off location of the trip booking request;
segregating, the additional trip booking options of the expanded search domain into a plurality of sub-search domains for parallel processing using separate processes, threads, or cores of one or more additional processors or the processor;
computing, using the separate processes, threads, or cores for at least two of the plurality of sub-search domains of the additional trip booking options to reduce an overall impact on system resources, objective values for the trip booking options, each trip booking option temporarily assigned to a vehicle to compute a corresponding objective value, the objective value being a metric output by an objective function of parameters, the parameters representing one or more of a level of ride share or efficiency, violation of passenger(s) targeted pickup time, violation of passenger(s) targeted arrive-before time, route deviation, vehicle operating cost, in-transit operating cost, vehicle itinerary and vehicle distance/time travelled; and
responsive to the objective values computed using the separate processes, threads, or cores, generating a heuristically optimized data set of one or more retained trip booking options, heuristically transforming the expanded search domain to generate the constrained data set of the one or more retained trip booking options by removing at least one trip booking option from the generated trip booking options;
transmitting the one or more retained trip booking options for display on an interface application of an electronic device.

15. The method of claim 14, wherein the trip booking request includes a desired pickup time includes:
determining that the desired pickup time of the trip booking request is for a present time;
comparing objective values of at least two trip options within a time window of the present time;
retaining the trip option that is at a later time in order to increase the likelihood of improving the objective value.

16. The method of claim 14, further comprising:
comparing objective values of at least two trip options that are within a specific time of each other;
determining that one trip option's objective value is worse than another; and
removing the said trip option with a worse objective value.

17. A computer implemented system for heuristically optimizing electronically booked ride share trips, the system comprising:
a data storage device storing ride sharing records with itineraries including a plurality of legs and maintaining a data structure storing additional variant trip booking options, each variant trip booking option automatically generated based on a seed trip;
a processor configured to:
receive a trip booking request for a passenger, the trip booking request defining passenger constraints including a desired pickup time or drop off time;
parse the trip booking request to determine the seed trip and generate the additional variant trip booking options to expand a search domain associated with the trip booking request;
populate the data structure representing the expanded search domain with the automatically generated additional trip booking options, at least one trip booking option temporarily assigned to a vehicle, the additional trip booking options providing a set of pick up times that differ by a time frequency to cover a time range based on the desired pickup time or drop off time;

segregate, the additional trip booking options of the expanded search domain into a plurality of sub-search domains for parallel processing using separate processes, threads, or cores of one or more additional processors or the processor;

compute, using the separate processes, threads, or cores for at least two sub-search domains of the plurality of sub-search domains of the additional trip booking options to reduce an overall impact on system resources, objective values for the trip booking options, each trip booking option temporarily assigned to the vehicle to compute a corresponding objective value, the objective value being a metric output by an objective function of parameters, the parameters representing one or more of a level of ride share or efficiency, violation of passenger(s) targeted pickup time, violation of passenger(s) targeted arrive-before time, route deviation, vehicle operating cost, in-transit operating cost, vehicle itinerary and vehicle distance travelled, and time travelled;

responsive to the computed objective values, heuristically transform the expanded search domain by removing at least one trip booking option;

transmit the one or more retained trip booking options for display on an interface application of an electronic device to confirm a trip booking option from the one or more retained trip booking options;

re-compute the objective function for the confirmed trip booking option;

assign a vehicle to fulfill the confirmed trip booking option based on the re-computed objective function;

dynamically update an itinerary for the vehicle assigned to fulfill the confirmed trip booking option to add the confirmed trip booking option to the itinerary; and trigger transmission of a notification of the confirmed trip booking option and a portion of the itinerary to a device linked to the vehicle assigned to fulfill the confirmed trip booking option.

18. The system of claim 17, wherein the processor is further configured to receive a cancellation of the confirmed trip booking option, dynamically update the itinerary to remove the confirmed trip booking option from the itinerary, trigger transmission of a notification of the cancellation and a portion of the itinerary to the device.

19. The system of claim 17, wherein the processor is further configured to compare objective values of at least two trip options that are within a specific time of each other; determine that one trip option's objective value is worse than another; and; remove the said trip option with a worse objective value.

20. The system of claim 1, wherein the electronic communication of the legs of the trip booking option to the assigned vehicles causes dynamic adjustment of one or more ride-sharing itineraries that are currently in-transit, causing one or more insertions or one or more removals of each leg into the one or more ride-sharing itineraries that are currently in-transit.

21. The system of claim 1, wherein a sub-objective function is computed independently for each vehicle of the plurality of vehicles, and the objective function is an aggregate of the sub-objective functions.

22. The system of claim 1, wherein a sub-objective function is computed independently for each parameter of the parameters, and the objective function is an aggregate of the sub-objective functions.

23. The system of claim 20, wherein the processor is further configured to, responsive to the dynamic adjustment of the one or more ride-sharing itineraries that are currently in-transit, re-compute the objective functions.

24. The system of claim 1, wherein the trip booking options include at least two trip booking options having corresponding pickup locations or drop off locations proximate within a pre-defined distance from one another, and the retained trip booking options includes at least one of the two trip booking options having corresponding pickup locations or drop off locations proximate within a pre-defined distance from one another.

25. The system of claim 1, wherein the temporarily assignment of each trip booking option to the vehicle includes segregating two or more vehicle itineraries into one or more subgroups based on a level of a similarity match between each of the vehicle itineraries, and the objective functions for each subgroup is computed using separate processes, threads, or cores.

26. The system of claim 1, wherein the objective function comprises weights and the parameters:

$$Weight1*Parameter1+Weight2*Parameter2+ \ldots WeightN*ParameterN$$

wherein WeightM corresponds to an Mth weight of the weights and ParameterM corresponds to Mth parameters of the parameters, M being an integer between 1 and N, N being an integer greater than 2.

* * * * *